United States Patent
Nicol et al.

(10) Patent No.: US 10,944,999 B2
(45) Date of Patent: Mar. 9, 2021

(54) NETWORK-BASED PROCESSING AND DISTRIBUTION OF MULTIMEDIA CONTENT OF A LIVE MUSICAL PERFORMANCE

(71) Applicants: DOLBY LABORATORIES LICENSING CORPORATION, San Francisco, CA (US); DOLBY INTERNATIONAL AB, Amsterdam Zuidoost (NL)

(72) Inventors: Philip Nicol, San Anselmo, CA (US); Antonio Mateos Sole, Barcelona (ES); Giulio Cengarle, Barcelona (ES); Cristina Michel Vasco, San Francisco, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/311,982

(22) PCT Filed: Jul. 20, 2017

(86) PCT No.: PCT/US2017/043152
§ 371 (c)(1),
(2) Date: Dec. 20, 2018

(87) PCT Pub. No.: WO2018/017878
PCT Pub. Date: Jan. 25, 2018

(65) Prior Publication Data
US 2019/0215540 A1    Jul. 11, 2019

Related U.S. Application Data

(60) Provisional application No. 62/398,835, filed on Sep. 23, 2016, provisional application No. 62/501,344, filed on May 4, 2017.

(30) Foreign Application Priority Data

Jul. 22, 2016  (ES) ................................ ES201631002
Mar. 2, 2017  (ES) ................................ ES201730282

(51) Int. Cl.
*H04H 60/45*    (2008.01)
*H04N 21/232*    (2011.01)
(Continued)

(52) U.S. Cl.
CPC ............. *H04N 21/232* (2013.01); *G10H 1/00* (2013.01); *G10H 1/0058* (2013.01);
(Continued)

(58) Field of Classification Search
CPC ........ H04H 60/04; H04H 60/27; G10H 1/361; G10H 2210/091; H04S 3/008; H04S 2400/15
See application file for complete search history.

(56) References Cited

U.S. PATENT DOCUMENTS 5,790,124 A    8/1998 Fischer
7,665,113 B1    2/2010 Abrams
(Continued)

FOREIGN PATENT DOCUMENTS

CA    2973703    1/2013
JP    2001-169309    6/2001
(Continued)

OTHER PUBLICATIONS

Park Taejin et al: "Background music separation for multichannel audio based on Inter-channel Level Vector Sum", The 18th IEEE International Symposium on Consumer Electronics (ISCE 2014), IEEE, Jun. 22, 2014 (Jun. 22, 2014), pp. 1-2, XP032630954, DOI: 10.1109/ISCE.2014.6884340 [retrieved on Aug. 26, 2014].
(Continued)

*Primary Examiner* — Jason Salce

(57) ABSTRACT

Methods, systems, and computer program products for network-based processing and distribution of multimedia con-
(Continued)

tent of a live performance are disclosed. In some implementations, recording devices can be configured to record a multimedia event (e.g., a musical performance). The recording devices can provide the recordings to a server while the event is ongoing. The server automatically synchronizes, mixes and masters the recordings. The server performs the automatic mixing and mastering using reference audio data previously captured during a rehearsal. The server streams the mastered recording to multiple end users through the Internet or other public or private network. The streaming can be live streaming.

20 Claims, 25 Drawing Sheets

(51) Int. Cl.
    *H04H 60/04*       (2008.01)
    *G10H 7/00*        (2006.01)
    *G10H 1/46*        (2006.01)
    *G10H 1/36*        (2006.01)
    *G10H 1/44*        (2006.01)
    *G10H 1/00*        (2006.01)
    *H04N 21/2343*    (2011.01)
    *H04N 21/2187*    (2011.01)
    *H04N 21/233*     (2011.01)
    *H04N 21/234*     (2011.01)
    *H04N 21/433*     (2011.01)

(52) U.S. Cl.
    CPC .............. *G10H 1/368* (2013.01); *G10H 1/44* (2013.01); *G10H 1/46* (2013.01); *G10H 7/00* (2013.01); *H04H 60/04* (2013.01); *H04N 21/2187* (2013.01); *H04N 21/233* (2013.01); *H04N 21/234* (2013.01); *H04N 21/234345* (2013.01); *H04N 21/4334* (2013.01); *G10H 2210/305* (2013.01); *G10H 2220/455* (2013.01); *G10H 2240/325* (2013.01)

(56) References Cited

U.S. PATENT DOCUMENTS

| | | | |
|---|---|---|---|
| 7,756,595 B2 | 7/2010 | Asada | |
| 8,136,133 B2 | 3/2012 | Walker | |
| 8,773,589 B2 | 7/2014 | Lord | |
| 9,031,243 B2 | 5/2015 | Leboeuf | |
| 9,031,262 B2 | 5/2015 | Silfvast | |
| 9,100,734 B2 | 8/2015 | Visser | |
| 9,131,016 B2 | 9/2015 | Glueckman | |
| 9,141,860 B2 | 9/2015 | Vunic | |
| 9,185,440 B2 | 11/2015 | Sako | |
| 9,226,038 B2 | 12/2015 | McNamee | |
| 9,693,137 B1* | 6/2017 | Qureshi | G11B 27/031 |
| 10,001,968 B1* | 6/2018 | Slick | G06F 3/165 |
| 2002/0106986 A1* | 8/2002 | Asada | H04H 60/04 |
| | | | 455/3.01 |
| 2003/0235316 A1* | 12/2003 | Chambers | G11B 7/28 |
| | | | 381/119 |
| 2006/0251382 A1 | 11/2006 | Vronay | |
| 2007/0044137 A1 | 2/2007 | Bennett | |
| 2008/0047414 A1 | 2/2008 | Friedman | |
| 2009/0086998 A1 | 4/2009 | Jeong | |
| 2010/0095829 A1 | 4/2010 | Edwards | |
| 2010/0111313 A1 | 5/2010 | Namba | |
| 2010/0303261 A1* | 12/2010 | Stieler Von Heydekampf | |
| | | | H04H 60/04 |
| | | | 381/119 |
| 2011/0112913 A1* | 5/2011 | Murray | G06Q 30/00 |
| | | | 705/14.73 |
| 2011/0285854 A1 | 11/2011 | Laduke | |
| 2012/0014673 A1 | 1/2012 | O'Dwyer | |
| 2012/0243546 A1* | 9/2012 | Kamijo | H04L 65/605 |
| | | | 370/400 |
| 2013/0033605 A1 | 2/2013 | Davies | |
| 2013/0202133 A1* | 8/2013 | Fujita | H04R 3/00 |
| | | | 381/119 |
| 2013/0272548 A1 | 10/2013 | Visser | |
| 2013/0297298 A1 | 11/2013 | Yoo | |
| 2015/0117685 A1* | 4/2015 | Reiss | G11B 27/031 |
| | | | 381/300 |
| 2015/0146878 A1 | 5/2015 | Meredith | |
| 2015/0147049 A1 | 5/2015 | Eronen | |
| 2015/0194185 A1 | 7/2015 | Eronen | |
| 2015/0264505 A1 | 9/2015 | Tsilfidis | |
| 2016/0358107 A1* | 12/2016 | Kokkinis | G06N 20/00 |

FOREIGN PATENT DOCUMENTS

| | | |
|---|---|---|
| JP | 4513274 | 7/2010 |
| WO | 2000-014961 | 3/2000 |
| WO | 2000/028434 | 5/2000 |

OTHER PUBLICATIONS

Foote, "Automatic Audio Segmentation Using a Measure of Audio Novelty," IEEE, dated Jul. 30-Aug. 2, 2000, 4 pages.

\* cited by examiner

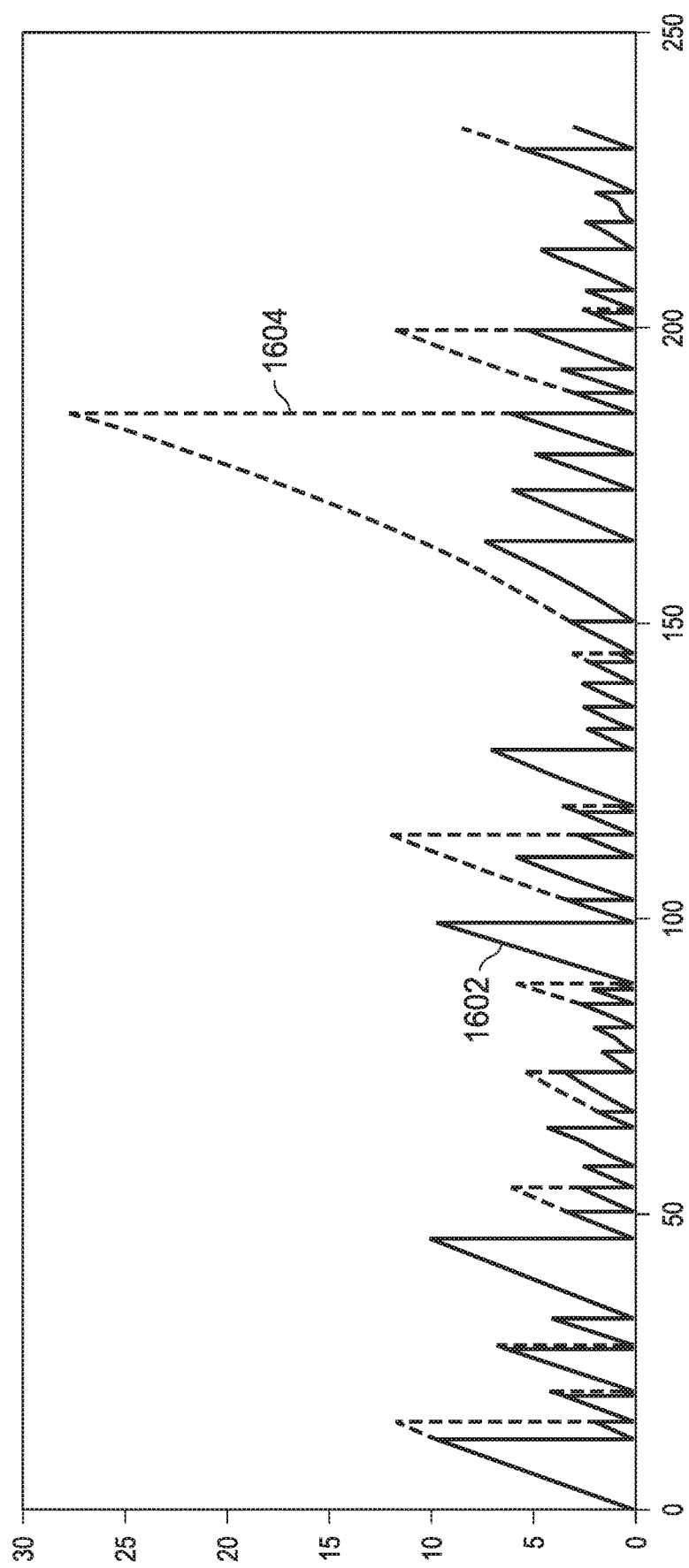

NETWORK-BASED PROCESSING AND DISTRIBUTION OF MULTIMEDIA CONTENT OF A LIVE MUSICAL PERFORMANCE

TECHNICAL FIELD

This disclosure relates generally to the capturing, processing and distribution of multimedia content of a live musical performance.

BACKGROUND

Distributing high-quality audio and video of a live performance over the Internet can be challenging. Many amateur-produced video recordings uploaded to the Internet have poor video and sound quality. When a band plays in a venue that is not treated acoustically, sound quality can be poor if a recording is directly uploaded without further processing. For example, if a drum set is used, the drum set can be played so loud that other instruments of the band cannot be heard clearly. Additionally, a recording of the performance can have low sound quality if the band does not properly set up their recording equipment including, e.g., multiple microphones, preamplifiers and a mixing console. Even if the recording equipment is properly set up, the band may lack technical expertise to use the recording equipment effectively. Likewise, professional-quality video recording and editing of the performance may require technical expertise that is beyond the skills of the performers.

SUMMARY

Systems, program products, and methods for video editing based on rehearsal and live data are disclosed. A system receives rehearsal data on a rehearsal of a performance from one or more microphones and one or more video cameras. The system matches sound and performers based on the rehearsal data. During live performance, the system receives live audio and video data of the performance. Based on an analysis of the rehearsal data, the system derives the level at which performers play relative to rehearsal, as well as a representative location of the performers during rehearsal in the one or more video cameras. The system then edits the video data based on rules that make use of the derived levels and locations, for example, to emphasize the prominent performers; the system optionally uses an analysis of their performance to improve the editing, the analysis generating, for example, tempo or beat data, and performers movement tracking data. The system then associates the audio data with the edited video data for storage and streaming to one or more user devices.

Systems, program products, and methods for video handling under limited network bandwidth are disclosed. A video camera can capture high-definition video (e.g., 4K video) of a performance. The video may be difficult to stream live (or even upload offline) over a communications network. The video camera can submit one or more frames of the video, optionally in lower resolution and optionally compressed using a lossy video codec, to a server system. Based on the one or more frames and audio data, as described in the previous paragraph, the server system can produce editing decisions on the video data. The server system can instruct the video camera to crop a portion of the high-definition video that corresponds to the performer or group of performers, and submit that portion of the video to the server system as medium or low definition video (e.g., 720p video), optionally compressed using a lossy video codec. The video camera devices can continuously store a long buffer (e.g. tens of seconds) of the high-definition video (e.g., 4K) corresponding to the last captured frames, so that the received instructions from the server system can be implemented on frames captured a few seconds ago. The server system can then store the medium or low definition video or stream the medium or low definition video to a user device.

Implementations are disclosed for network-based processing and distribution of multimedia content of a live performance. In some implementations, recording devices can be configured to record an event (e.g., a live musical performance). The recording devices provide the recordings to a server during the performance. The server automatically synchronizes, mixes and masters the recordings. In an implementation, the server performs the automated mixing and mastering using reference audio data captured during a rehearsal, in which the recording devices and sound sources are placed in a same acoustic (and in the case of video recording devices, visual) arrangement as in the event. The server provides the mastered recording to multiple end user devices, e.g., by live streaming.

In some implementations, the server streams video signals of the live event to multiple users. Using the reference audio data (also referred to as rehearsal data) recorded during a rehearsal session, the server determines the locations of the various instruments and vocalists (hereinafter also referred to as "sound sources") as well as locations of performers at the recording location. During a live performance, the server determines one or more dominant sound sources based on one or more parameters (e.g., volume). An image capture device (e.g., a video camera) can capture live video of the performance and send it to the server. Using the locations of the dominant sound sources, the server determines a portion in the video to apply video editing operations (e.g., zoom, transitions, visual effects). Applying the video editing operations can occur real time on live video, or on previously recorded video data. The server streams the portion of the video that corresponds to the dominant sound source (e.g., a close up of a lead vocalist or lead guitar player) to the end user devices. In an implementation, the audio and video streaming can be interactive. For example, the server can provide a video overlay or graphical user interface on an end user device that allows the end user to control audio mixing (e.g., raising the volume of the vocalist or a soloing instrument) and video editing (e.g., zooming in on a particular performer). In some implementations, the server can issue command to the audio or video recording devices to adjust one or more recording parameters, e.g., a recording level adjustment on a microphone preamplifier, a zoom level of a video recorder, turning on or turning off a particular microphone or video recorder, or any combination of the above.

The features described in this specification can achieve one or more advantages over conventional audio and video technology. The features improve upon conventional manual audio and video processing technology by automated mixing and mastering of audio tracks based at least in part on reference audio data obtained from reference audio data. Accordingly, a band need not have audio recording or mixing expertise to produce a good-sounding recording of their live performance. Using the automated mixing and mastering disclosed herein, a band can produce well-balanced sound without resorting to using professional recording, mixing and mastering engineers. If a band desires a mixing style from a particular expert, the band can use the network-based platform disclosed herein to retain the expert to mix and master their recording remotely.

Likewise, the disclosed implementations improve upon conventional video processing technology by replacing manual camera operations (e.g., panning and zooming) with automated camera operations based at least in part on audio and video rehearsal data. The video can zoom in or focus on individual performers or instruments automatically. A band can produce and edit professional quality video of their live performance without retaining a professional videographer.

The band can provide high-quality audio and video to multiple end user devices using various technologies (e.g., live streaming). To enhance the end user experience, the streaming can be made interactive, allowing the end user to control various aspects of the audio mixing and video editing. In this specification, for convenience, the term band can refer to a music band of one or more performers and instruments. The term can also refer to a group of one or more participants in a non-musical environment (e.g., performers in a drama, speakers at a conference, or loudspeakers in a public addressing system).

The features and processes disclosed herein improve upon conventional server computers by configuring the server computers to perform automated synchronization, mixing and mastering of audio tracks of a live performance and editing of video data. The server computers can stream the processed audio and video to end user devices and provide controls that allow end users to further mix or edit the audio and video. In various implementations, the server computers can store raw data of a live performance for offline use, mix, master, re-purpose, segment, curation. The server computers can store processed data for later distribution. The server computers can store data that has been put through various stages of processing, anywhere between raw data and completely processed data, inclusive. The server can store the data on a storage device (e.g., a hard disk, a compact disc (CD), a remote storage site (e.g., a cloud-based audio and video service), or a memory stick).

The features and processes disclosed herein improve upon conventional server computers by allowing the server computers to automatically edit video data based on various rules. The server computers implementing the disclosed techniques can direct a recording device, e.g., a video camera, to automatically focus on a performer, e.g., a soloist, when the performer is playing differently (e.g., louder) than other performers, or when the performer moves or when the performer is playing without accompaniment (e.g., acapella). The server computers can cut and change scenes according to tempo and the beat of the music. The server computers direct the recording device to track movement of sound sources, including, for example, switching from a first performer to a second performer, whereby the switching can be a hard cut, or a slow panning, from the first to second performer. The tracking can be performed on recorded data, without physically moving the recording device. Accordingly, based on audio data analysis, the server computers can mimic what a human cinematographer can do. The disclosed techniques thus have the technical advantage of moving a view of an event without physically moving a recording device.

The features and processes disclosed herein improve upon conventional server computers by reducing the bandwidth requirement for transmitting high-definition video data. High-definition video data, e.g., 4K video, may require high bandwidth for transmission. The disclosed features can select highlights of a video, e.g., the portion corresponding to a position of a soloist, to be transmitted, and focus on the position. The system can transmit the portion of the video data in lower resolution, e.g., 720p video. Thus, when the audience is only viewing the soloist, the system need not transmit video of the entire stage in 4K video. The system can still preserve perceived definition and clarity on the soloist. Accordingly, the system achieves the technical advantage of transmitting high quality video at reduced bandwidth.

In another embodiment, the one or more camera devices capture high resolution (e.g. 4K) video, and the methods described here are used to stream an intermediate edited lower-resolution video (e.g. 1080), so that the server system can further make decisions to edit within the 1080 frames and serve 720p to the audience.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

FIG. 16 is a diagram illustrating example novelty buildup processing.

Like reference symbols in the various drawings indicate like elements.

DETAILED DESCRIPTION

Example Upstream Architecture

Figure 1:
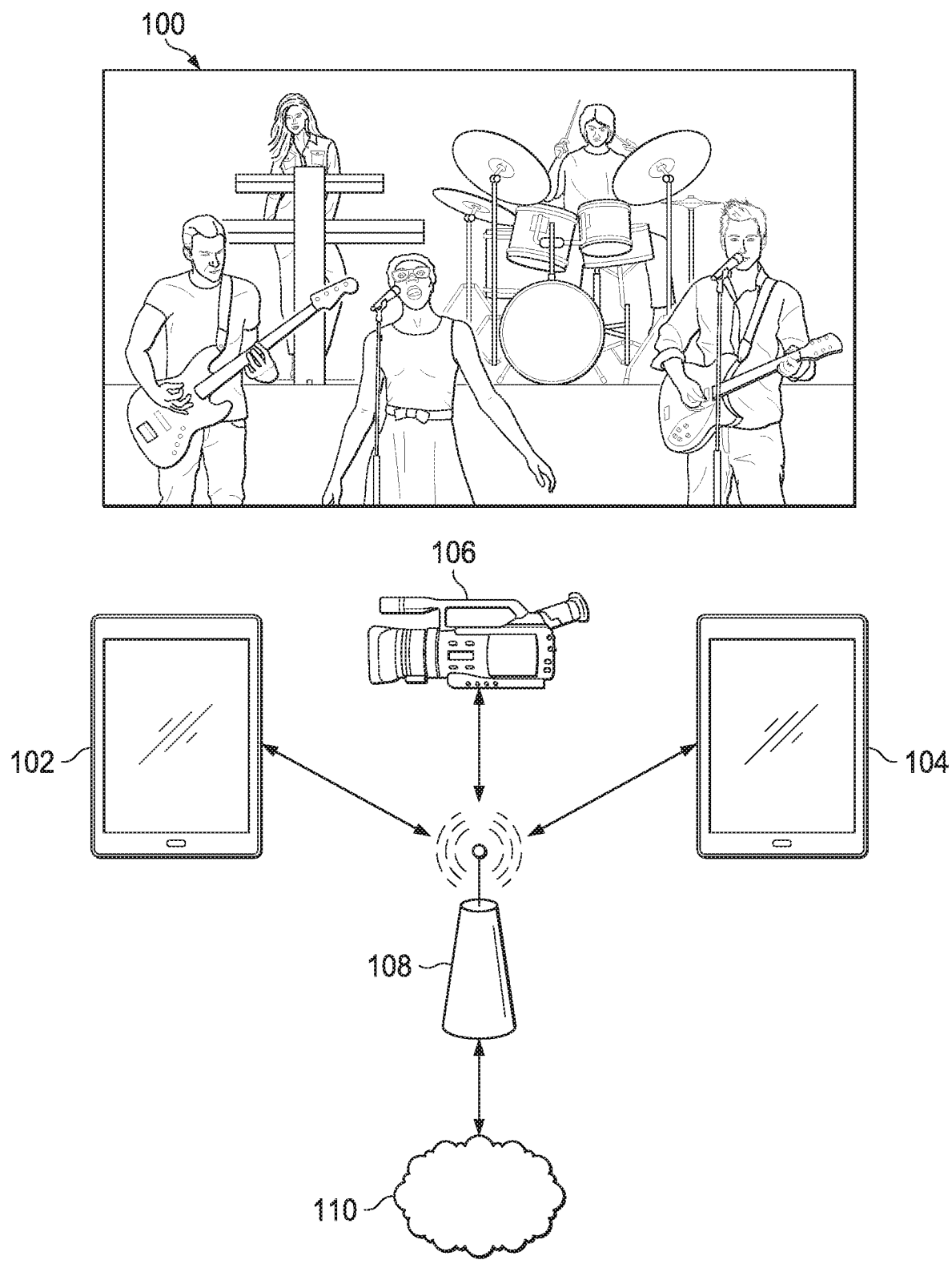
FIG. 1 is a diagram illustrating a first example arrangement of recording devices at an event.

FIG. 1 is a diagram illustrating a first example arrangement of recording devices at live performance event 100. Event 100 can be any event where audio content (e.g., speech, vocal music or instrumental music) and optionally, video content, is produced. In particular, event 100 can be a live concert in which one or more musical instruments and/or one or more vocalists perform. One or more sound sources can be present at event 100. Each sound source can be an instrument, a vocalist, a loudspeaker, or any item that produces sound. For simplicity, sound sources including non-instrument sound sources are collectively referred to as instruments in various portions of this specification.

In some implementations, devices 102, 104 and 106 can be configured to record audio and video of event 100. Devices 102 and 104 can be mobile devices (e.g., smart phones, wearable devices, or portable audio and video recorders). Devices 102 and 104 can include internal microphones, be coupled to external microphones, or both. If external microphones are used, the external microphones may be coupled to one or more microphone preamplifiers. The external microphones can be coupled to devices 102 and 104 using wired or wireless connections. In some implementations, each of devices 102 and 104 can be coupled to one or more external sound generating devices, where the sound generating devices generate audio signals directly in terms of analogue electric signals (e.g., keyboards outputs) or digital signals (e.g., laptop computer generated digital sounds). Such signals can be fed directly to devices 102 and 104 via corresponding adapters.

Each of devices 102 and 104 can execute an application program for recording audio content of event 100. The application program can send the recorded audio tracks to a remote server computer through a communications network 110. Communications network 110 can be a personal area network (PAN, e.g., a Bluetooth™ network), a local area network (LAN), a cellular network (e.g., a 4G or 5G data network) a wide area network (WAN, e.g., the Internet), or ad hoc network. The communication can be through a gateway (e.g., wireless device 108) or individually. In some implementations, the server computer can be local to event 100. For example, the server computer can be any one of devices 102 and 104.

In some implementations, each of device 102 and 104 can include a client application linked to an online user account for audio processing. The client application can perform user authentication and authorization prior to sending audio tracks to the online user account. The client application can include audio processing functions that respond to commands from the remote server, for example, a command to adjust a filter (e.g., a low pass filter, high pass filter, shelf filters), a gain or frequency band of a microphone preamplifier built into or coupled to device 102 or 104. Additionally, or alternatively, the command can control a bit depth and sample rate of the recordings (e.g., 16 bits @ 44.1 Hz).

Each of devices 102 and 104 can submit the recorded audio tracks to the server through a wired device (e.g., a wired or wireless router) or other wired or wireless device 108. Wireless device 108 can be a wireless access point (AP) for a wireless local area network (WLAN), or a cellular tower. Wireless device 108 can connect to communications network 110. Devices 102 and 104 can send recorded live audio tracks to the server through communications network 110. The submission of data can occur real time, e.g., while the performance is ongoing, or offline, e.g., concurrently or sequentially by devices 102 and 104 after the performance is partially or completely finished. Devices 102 and 104 can store the recorded audio tracks for the offline submission.

In some implementations, device 106 is an image capture device configured to capture images as well as audio of event 100. For example, device 106 can be configured to capture high-definition video (e.g., 4K resolution video). Device 106 can capture still images and video of event 100. Device 106 can send the captured still images or video to the server through wireless device 108 and communications network 110. Device 106 can send the still images or video real time or offline. In some implementations, device 106 can perform operations of a server computer.

In some implementations, one or two microphones of devices 102, 104 and 106 are designated as one or more main microphones (e.g., "room" microphones) that capture audio from all the instruments and vocalists. Signals output from the one or two main microphones can be designated as main signals (e.g., main mono or main stereo signals) or main channel signals. Other microphones, sometimes placed at respective individual sound sources (e.g., a vocal microphone) or individual sound source groups (e.g., drum microphones) are designated as spot microphones, also referred to as satellite microphones. Spot microphones can augment the main microphones by providing a more localized capture of a sound source (e.g., kick drum mics, snare drum mics, high hat mics, overhead mics to capture cymbals, guitar and bass amplifier mics, etc.).

In some implementations, each of devices 102, 104 and 106 can be configured to perform operations of a server by executing one or more computer programs. In such implementations, processing of the audio signals can be performed on-site at event 100. The device performing the operations (e.g., device 106) can then upload the processed signals to a storage device or to end user devices through communications network 110.

Figure 2:
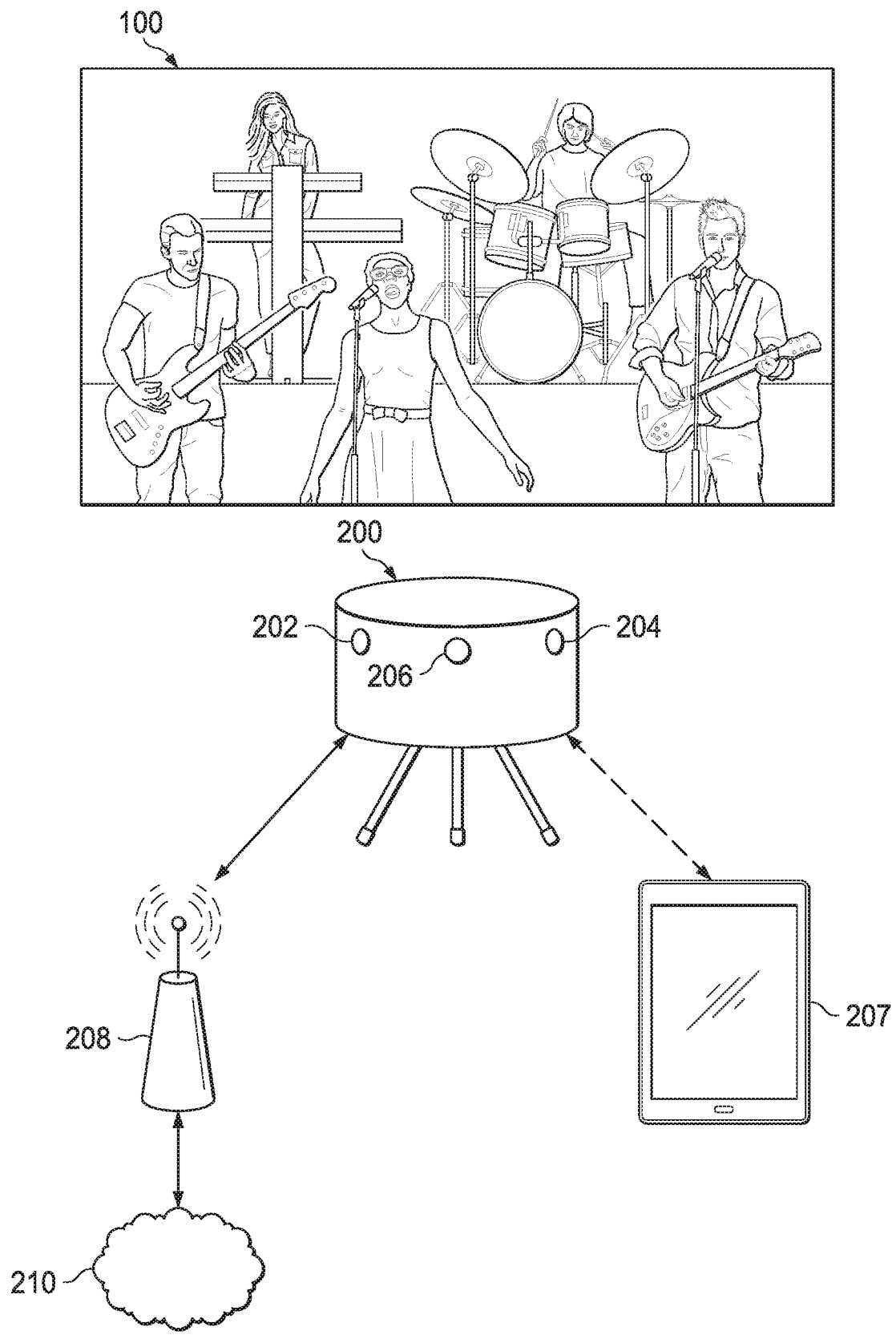
FIG. 2 is diagram illustrating a second example arrangement of recording devices at an event.

FIG. 2 is diagram illustrating a second example arrangement of recording devices at event 100. Integrated recorder 200 can be configured to record audio and video signals of event 100. Integrated recorder 200 can include microphones 202 and 204. Each of microphones 202 and 204 can be an omnidirectional, a directional, or bidirectional microphone, or a microphone with any directional pattern. Each of microphones 202 and 204 can be arranged to point to a given direction. Microphones 202 and 204 can be designated as main microphones. In various implementations, integrated recorder 200 can be coupled to one or more spot microphones for additional audio input.

Integrated recorder 200 can include image capture device 206 for capturing still images or video of event 100. Integrated recorder 200 can include, or be coupled to, a user interface for specifying one or more attributes (e.g., target loudness levels) of sound sources in event 100. For example, integrated recorder 200 can be associated with a mobile application by a device identifier. The mobile application can have a graphical user interface (GUI) for display on a touch-sensitive surface of mobile device 207. The GUI can include one or more user interface items configured to accept user input for specifying the attributes of sound sources (e.g., target volume or gain levels of guitar, lead vocalist, bass or drum). The attributes can include, for example, how many decibels (dB) should separate two sound sources (e.g., between the lead vocalist and other sound sources), which sound source should be dominant (e.g., by playing above volume levels of other sound sources), and by how much (e.g., by X dB). The one or more user interface items can accept user input for specifying a rehearsal session, in which reference audio data from the sound sources is collected for automated mixing.

Integrated recorder 200 can optionally perform one or more operations including, for example, synchronization of signals from the main and spot microphones, separation of sound sources from recorded signals, mixing signals of the different sound sources based on reference audio data, and mastering the mixed signals. Integrated recorder 200 can submit mastered signals as stereo or multi-channel signals to a server through wireless device 208 that is connected to communications network 210. Likewise, integrated recorder 200 can provide video signals to the server. The server can then distribute the stereo or multi-channel signal and video signals to end user devices in substantially real time during event 100. Communications network 210 can be a PAN, a LAN, a cellular data network (e.g., a 4G network or 5G network), a WAN, or an ad hoc network.

Figure 3:
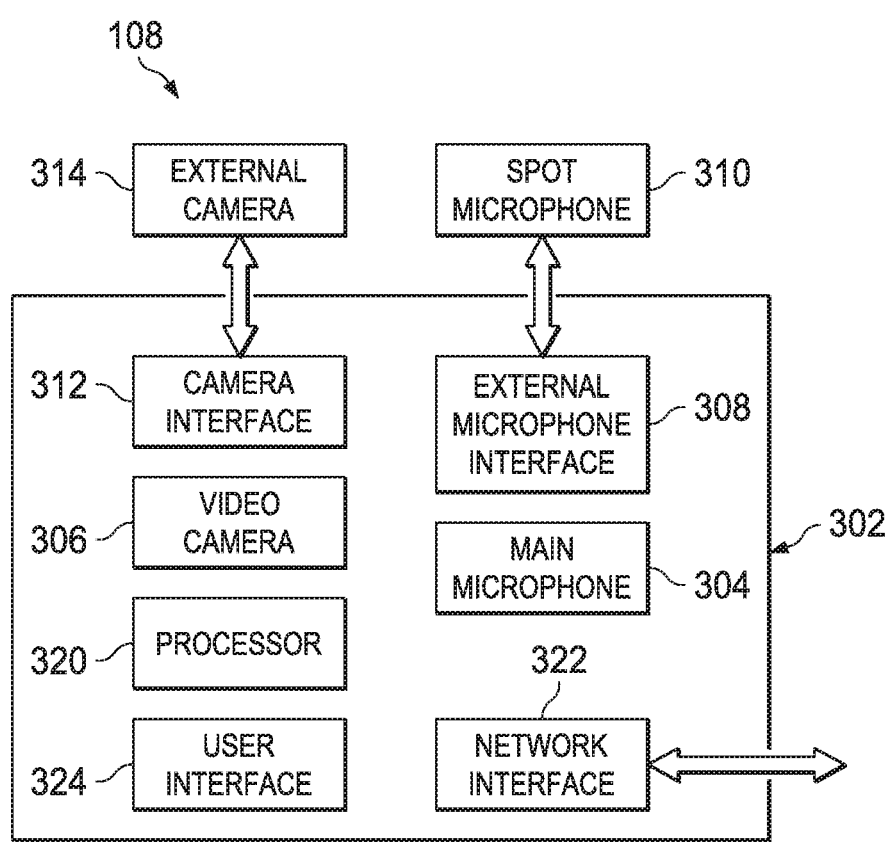
FIG. 3 is a block diagram illustrating an example architecture of a recording device.

FIG. 3 is a block diagram illustrating an example architecture of a recording device 302. The recording device 302 can be device 102 or 104 of FIG. 1, or integrated recorder 200 of FIG. 2.

Recording device 302 can include, or be coupled to, main microphones 304 and video camera 306. Main microphones 304 can be built-in microphones, or dedicated microphones coupled to recording device 302. Main microphones 304 can provide a baseline (also referred to as a bed) for audio signal processing, as described below in additional detail. Video camera 306 can be a built-in camera, or dedicated camera coupled to recording device 302. Video camera 306 can be a Digital Cinema Initiative (DCI) 4K, DCI 2K, or Full HD video camera that is configured to capture video in sufficiently high resolution such that a portion of the captured video, if zoomed in, can still utilize full capacity of conventional monitors having medium (e.g., 1080p, 1080i, 720p or 720i) resolution.

Recording device 302 can include external microphone interface 308 for connecting to one or more spot microphones 310. External microphone interface 308 is configured to receive signals from the one or more spot microphones 310. In some implementations, external microphone interface 308 is configured to provide control signals to the one or more spot microphones 310. Recording device 302 can include external camera interface 312 for connecting to one or more external cameras 314. External camera interface 314 is configured to receive signals from the one or more external cameras 314, and to provide control signals to the one or more external cameras 314.

Recording device 302 can include one or more processors 320. The one or more processors 320 can be configured to perform analogue-to-digital conversion of audio signals from the microphones, and to perform digital compression of the digital audio signals and video signals from the cameras. In some implementations, the one or more processors 320 are further configured to synchronize audio signals from various channels, separate sound sources from the audio signals, automatically mix the separate sound sources, and master the mixed signals.

Recording device 302 can include network interface 322 for submitting digital audio and visual signals to a server through a network device. In some implementations, network interface 322 can submit mastered digital audio and video signals to the server. Network interface 322 can be configured to receive commands from the server for adjusting one or more parameters of the audio or visual recording. For example, network interface 322 can receive a command for panning a video camera to a specified direction and zoom in (or zoom out), or adjust a recording level for a particular microphone.

Recording device 302 can include user interface 324 for receiving various user inputs controlling attributes of the recording. User interface 324 can include a GUI displayed on a touch-sensitive surface of recording device 302. User interface 324 can be displayed on a device separately from recording device 302, e.g., on a smartphone or tablet computer executing a client application program.

Figure 4:
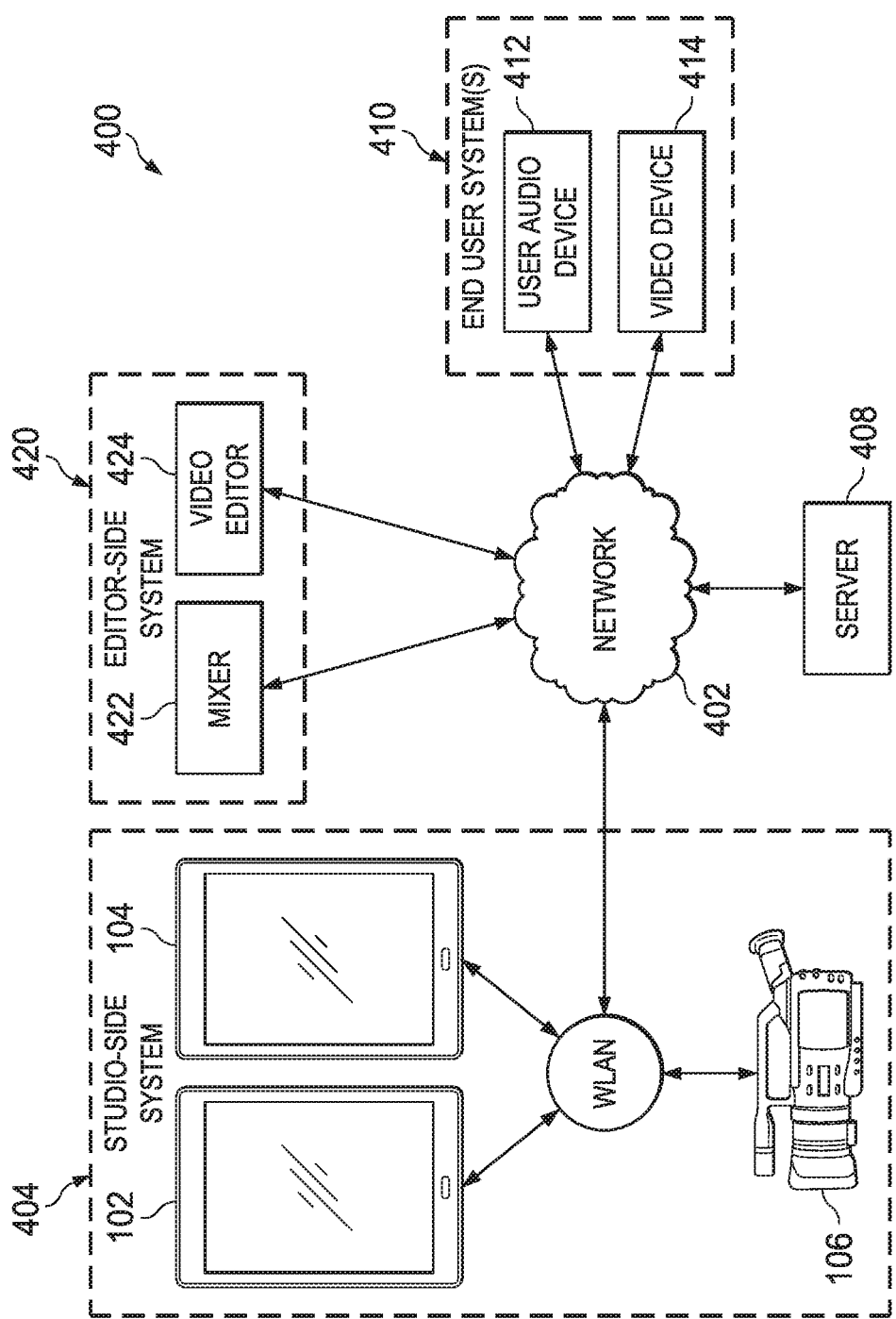
FIG. 4 is a diagram illustrating architecture of an example audio and video system for network-based audio processing.

FIG. 4 is a diagram illustrating an example architecture of audio and video system 400 for network-based audio and video processing. In the network-based audio and video processing, a communications network 402 links an event to end user devices such that the end users of the devices can hear and view a live performance of artists at event 100 (of FIG. 1). Communications network 402 can be a PAN, a LAN, a cellular network, a WAN (e.g., the Internet) or an ad hoc network. Audio and video system 400 can include one or more subsystems, each of which is described below.

Studio-side system 404 is a subsystem of audio system 400 including equipment located and arranged at a location, e.g., in a studio, concert hall, theater, stadium, living room or other venue where an event occurs. Studio-side system 404 can include the architecture discussed in reference to FIG. 1, where multiple general-purpose devices (e.g., smartphones, tablet computers, lap top computers) each executing an audio or video processing application program record and send the recorded signals to server 408. Alternatively, studio-side system 404 can include an example architecture discussed in reference to FIG. 2, where a dedicated integrated recorder records and sends the recorded signals to server 408.

Server 408 is a subsystem of audio system 400 including one or more computers or one or more discrete or integrated electronic circuits (e.g., one or more processors). Server 408 is configured to receive live audio and video content of event 100 through communications network 402, process the audio and video content, and provide the audio and video content to end user devices through communications network 402. Server 408 can include one or more processors programmed to perform the audio processing. In some implementations, server 408 can control various aspects of studio-side system 404. For example, server 408 can increase or decrease a volume level of a microphone when clipping is detected, increase or decrease a sample bitrate or bit depth, or select a compression type, based on detected bandwidth limitations.

In some implementations, server 408 automatically mixes and masters audio signals. Server 408 can also automatically select particular portions from video streams that correspond to playing instruments. Additional details on components and operations of server computer 408 are described below in reference to FIG. 5.

In some implementations, server 408 allows equipment in editor-side system 420 to perform the mixing, mastering and scene selection. Editor-side system 420 is a subsystem of audio system 400 configured to allow third-party editors to edit audio or video content during live content streaming. Editor-side system 420 can include one or more mixer devices 422. Mixer devices 422 can be operated by an end user, a player in a band or orchestra performing the live event, or a professional mixing engineer. Editor-side system 420 can include one or more video editing devices 424. Video editing devices 424 can be operated by an end user, a performer or a professional videographer.

The end users can listen to or view live content of event 100 in various end user system 410. In various end user systems 410, live or stored content can be played on user audio device 412 (e.g., stereo or multi-channel audio systems having multiple loudspeakers), user video device 414 (e.g., one or more computer monitors), or a combination of both (e.g., a television set, a smart phone, a desktop, laptop or tablet computer, or a wearable device).

In some implementations, audio system 400 allows end users to provide feedback on the live content and control various aspects of the live content using their end user devices. For example, audio system 400 can allow real time rating of the live content based on voting, or audio or video panning by certain authorized end users.

Figure 5:
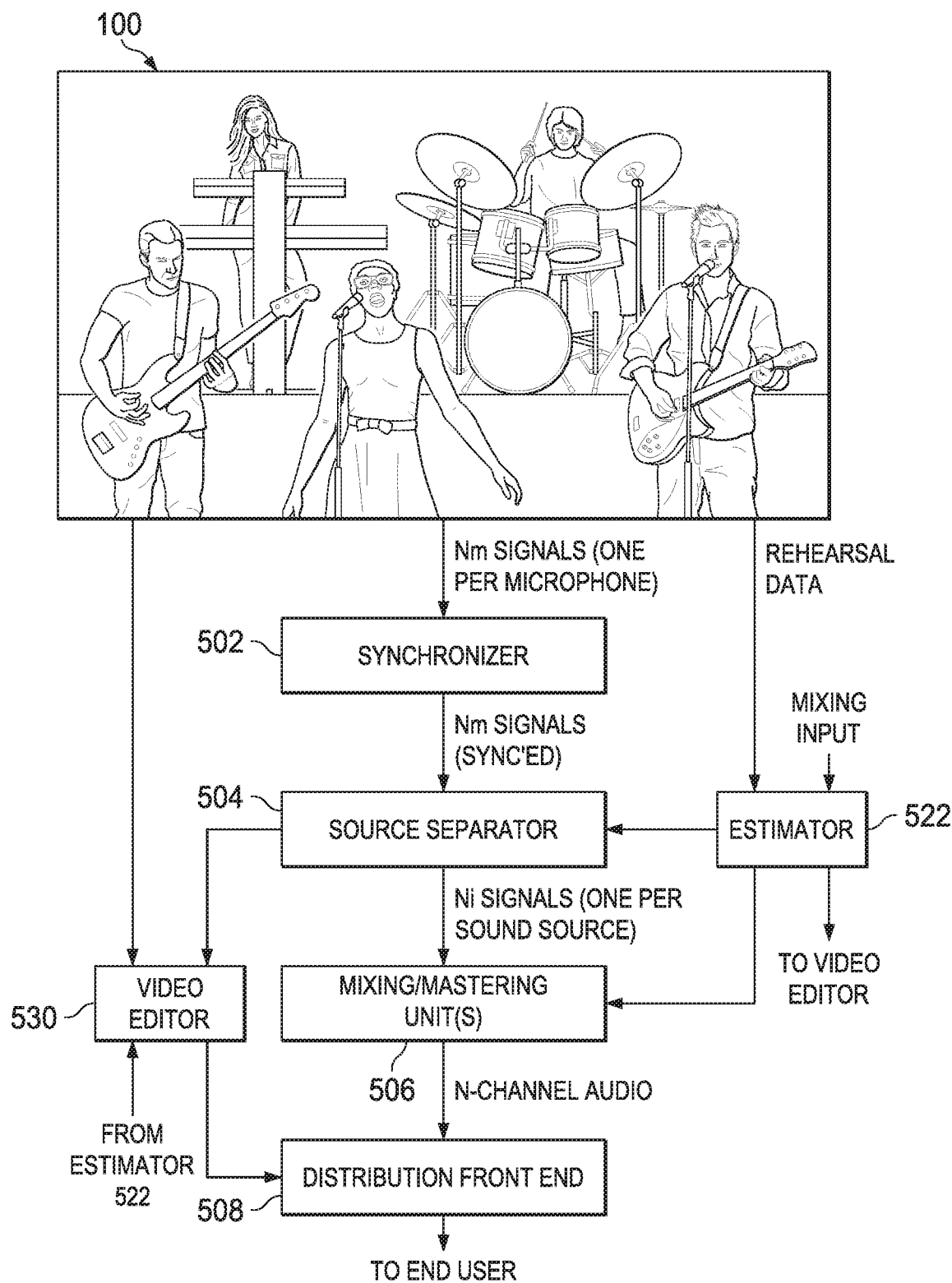
FIG. 5 is a block diagram illustrating an example signal path for audio and video processing.

FIG. 5 is a block diagram illustrating example signal path of audio and video processing. The components of the signal path can be implemented on server 408 (of FIG. 4). The components can include synchronizer 502, source separator 504, mixing and mastering units 506, distribution frontend 508 and estimator 522. In some implementations, some or all of the components can be implemented in software on server computer 408. In other implementations, some or all of the components can include one or more electronic circuits configured to perform various operations. Each electronic circuit can include one or more discrete components (e.g., resistors, transistors or vacuum tubes) or integrated component (e.g., an integrated circuit, a microprocessor or a computer).

Synchronizer 502 can receive digital audio data of event 100 from one or more recording devices. The digital audio data can be, for example, sampled audio data. Each recording device or each microphone coupled to a recording device can correspond to an audio channel or track of the musical performance. Signals from the recording devices are referred to as channel signals. Accordingly, synchronizer 502 can receive Nm channel signals, where Nm is the total number of microphones recording event 100, or more generally, the set of all sound signals being captured in event 100. For example, the Nm channel signals can include one or more channels from a direct output of a keyboard or from a line audio output of a computing device or portable music player. The Nm channel signals can include main channel signals from environment microphones, as well as spot channel signals (also referred to as beams) from spot microphones. The Nm channel signals can be recorded by microphones on the recording devices, sampled by analogue/digital converters locally by the recording devices. The recording devices can send the sampled audio data in an audio format in packets over a network to synchronizer 502. Accordingly, the Nm channel signals can refer to the digitized audio signals rather than analog signals directly from the microphones.

The Nm channel signals may be out of temporal synchronization. For example, the packets of the digital signal may not arrive at the server respecting the time order at which the corresponding captured sound signals were physically produced. Synchronizer 502 can generate an output that includes Nm synchronized channel signals, e.g., based on timestamps associated with the packets. Synchronizer 502 can feed the Nm synchronized channel signals to source separator 504. Additional details of the operations of synchronizer 502 are described below in reference to FIG. 17 and FIG. 18.

Source separator 504 is a component of server 408 configured to separate each sound source from the Nm synchronized signals. Each sound source can correspond to, for example, an instrument, a vocalist, a group of instruments or a group of vocalists. Source separator 504 outputs Ns signals, each corresponding to a sound source. The number of sound sources (Ns) may be the same as, or different from, the number of synchronized signals Nm. In some implementations, source separator 504 can be bypassed.

The output of Ns signals from source separator 504, or the output of Nm synchronized signals from synchronizer 502 (in case source separator 504 is bypassed), can feed into one or more mixing and mastering units 506. Mixing and mastering units 506 can be software and/or hardware components of server 408 configured to perform mixing operations on channels of individual sound sources based at least partially on reference audio data, and perform mastering operations on mixed audio signals to produce final N channel audio signals (e.g., stereo audio, surround sound). Mixing and mastering units 506 can output the N-channel audio signals to distribution frontend 508. In various implementations, mixing and mastering units 506 can perform operations of applying mixing gains, equalizing each signal, performing dynamic range correction (DRC) on each signal, and performing noise reduction on each signal. Mixing and mastering units 506 can perform these operations in various combinations, on each signal individually, or on multiple signals simultaneously.

The reference audio data can include audio content recorded by microphones in a rehearsal and processed by estimator 522. In the rehearsal, the microphones and sound sources are placed in a same acoustic arrangement as in live event 100. The microphones then record audio signals when each sound source is played individually. In addition, the microphones can record noise samples, where no sound source is playing.

Estimator 522 is a component configured to collect and process audio data from a rehearsal session. Estimator 522 can instruct each player of a sound source at the performance location to play their instrument or sing individually. For example, estimator 522 can instruct (e.g., by prompting through a device user interface) each performer to play their instrument X seconds at a low volume, and Y seconds at a high volume. Nm signals from microphones of the rehearsal can be recorded. Estimator 522 can process the Nm signals, determine a loudness matrix, derive sound source characteristics and positions, and provide the instrument characteristics and positions to mixing and mastering units 506 for the mixing operations. Estimator 522 can receive additional input configuring parameters for determining the instrument characteristics and positions. Additional details of components and operations of estimator 522 are described below in reference to FIG. 8, FIG. 9, FIG. 10 and FIG. 13.

Distribution front end 508 can include an interface (e.g., a streaming or Web server) for providing the N-channel audio to a storage device or to end user devices for download, including live streaming (e.g., Hypertext Transfer Protocol (HTTP) live streaming, Real Time Streaming Protocol (RTSP), Real-time Transport Protocol (RTP), RTP Control Protocol (RTCP)). The live streaming can occur in substantially real time during the event 100.

Server 408 can include video editor 530. Video editor 530 is a component of the server configured to receive video signals of event 100 and automatically edit the video signals based at least partially on audio content. Automatically editing the video can include, for example, zooming in onto a particular instrument or player (e.g., a close up shot) when video editor 530 determines that the particular instrument is a dominant sound source. Additional details of the operations of video editor 530 are described below in reference to FIGS. 19A and 19B and FIG. 20.

Figure 6:
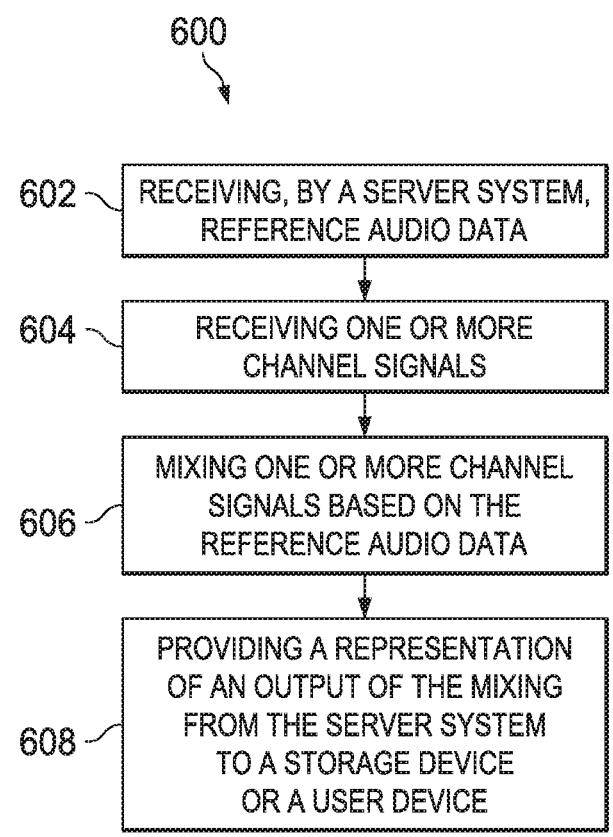
FIG. 6 is a flowchart of an example process of audio processing.

FIG. 6 is a flowchart of example process 600 of audio processing. Process 600 can be performed by, for example, server 408 of FIG. 4. Process 600 improves upon conventional audio processing technology by automating various mixing and mastering operations based at least partially on reference audio data recorded in a rehearsal. In this specification, the term rehearsal refers to a session where Server 408 can receive (602) reference audio data from one or more channel signal sources. The reference audio data can include acoustic information of one or more sound sources playing individually in a rehearsal. The reference audio data can include acoustic information of a noise floor in the rehearsal, e.g., when no sound sources are playing. Each channel signal source can include a microphone or a line output. Each sound source can be, for example, a musical instrument, a vocalist, or a synthesizer. Server 408 can receive the reference audio data through a communications network (e.g., communications network 402 of FIG. 4). A first channel signal can be captured by a first channel signal source (e.g., device 102) recording the rehearsal at a first location (e.g., front stage left, or at a particular instrument). A second channel signal can be captured by a second channel signal source (e.g., device 104) recording the rehearsal at a second location (e.g., front stage right, or at a particular instrument).

Server 408 can receive (604) from the one or more channel signal sources, one or more channel signals of a performance event, e.g., event 100. Each channel signal can be a digital or analogue signal from a respective channel signal source. Each channel signal can include audio signals from the one or more sound sources playing at the performance event. In the performance event, positions of the sound sources and channel signal sources are placed in a same acoustic arrangement (e.g., at the same location). In some implementations, server 408 can automatically synchronize the first channel signal and second channel signal in the time domain. After the synchronizing, server 408 can determine a first sound source and a second sound source from the first channel signal and the second channel signal.

Server 408 can automatically mix (606) the one or more channel signals during event 100 or after event 100 has concluded. The automated mixing operations can include adjusting one or more attributes of acoustic effects of from one or more sound sources of event 100 based on the reference audio data. For example, automated mixing operations can include performing noise reduction on each sound source individually, balancing or leveling each sound source and panning each sound source.

The mixing operations can also include automatically adjusting attributes of signals from one or more sound sources of event 100 based at least partially on reference audio data. Automatically adjusting the attributes of one or more sound sources can include increasing or decreasing gains of the one or more sound sources according to a respective volume level of each sound source. Automatically adjusting the attributes of one or more sound sources can include increasing or decreasing gains of each channel signal, each signal from a respective sound source, or both, resulting in each of the one or more sound sources reaching or approximately reaching a target volume level. Server computer 408 can determine each respective volume level at least partially from the reference audio data using estimator 522. Other mixing operations can include but are not limited to: applying compression, equalization, saturation or distortion, delay, reverberation, modulation, stereo, filtering and riding vocal or instrument volume.

The reference audio data can include audio signals recorded prior to event 100 by the first recording device and the second recording device in a rehearsal session. The reference audio data can be recorded individually for each sound source or a group of sound sources in the rehearsal session. The reference audio data can include, for each sound source, a first sound level signal (e.g., one designated as soft or low volume) and a second sound level signal (e.g., one designated as loud or high volume). The reference audio data can be recorded for the background noise when no sound source is playing. In some implementations, the reference audio data can include a single sound level signal (e.g., when each sound source plays at medium volume).

Server 408 can determine a respective gain for each sound source in event 100 at least partially from the reference audio data. Determining the respective gains can include, for each sound source or group of sound sources (e.g., guitar group, drum group, background vocals), receiving an input specifying a target volume level. Server computer 408 can determine, using estimator 522, a respective volume level of the signals in the reference audio data. Server 408 can determine each respective gain based on a difference between the volume level of the signals in the reference audio data and the target volume level.

In some implementations, the automated mixing (606) operations can include adjusting gains of the signals from the one or more sound sources according to input from a remote human mixing or mastering engineer that is logged on to the server system through the communications network. Accordingly, a remote mixing or mastering engineer not present at event 100 can mix or master the sound sources of event 100 during live streaming.

Server 408 can provide (608) a down mix from the server system to a storage device, or to an end user device as live content of event 100, e.g., by live streaming. The end user device can play the content on one or more loudspeakers integrated in or coupled to the end user device. In some implementations, server 408 can automate video editing for event 100. The video editing can be live editing while event 100 goes on, or offline editing on previously recorded video of event 100. Additional details on automated video editing operations are described in FIGS. 19A, 19B, and 20. In some implementations, a remote human video editor can use the platform to provide video editing during event 100.

In some implementations, server 408 can provide a command to the first and second recording devices, based on the first channel signal or second channel signal. The command can adjust a recording parameter of the recording devices. For example, the command can instruct the recording devices to adjust a gain, a compression type, a compression or a sample rate (e.g., 44.1 Hz) or bit depth (e.g., 16 or 24 bits).

Figure 7:
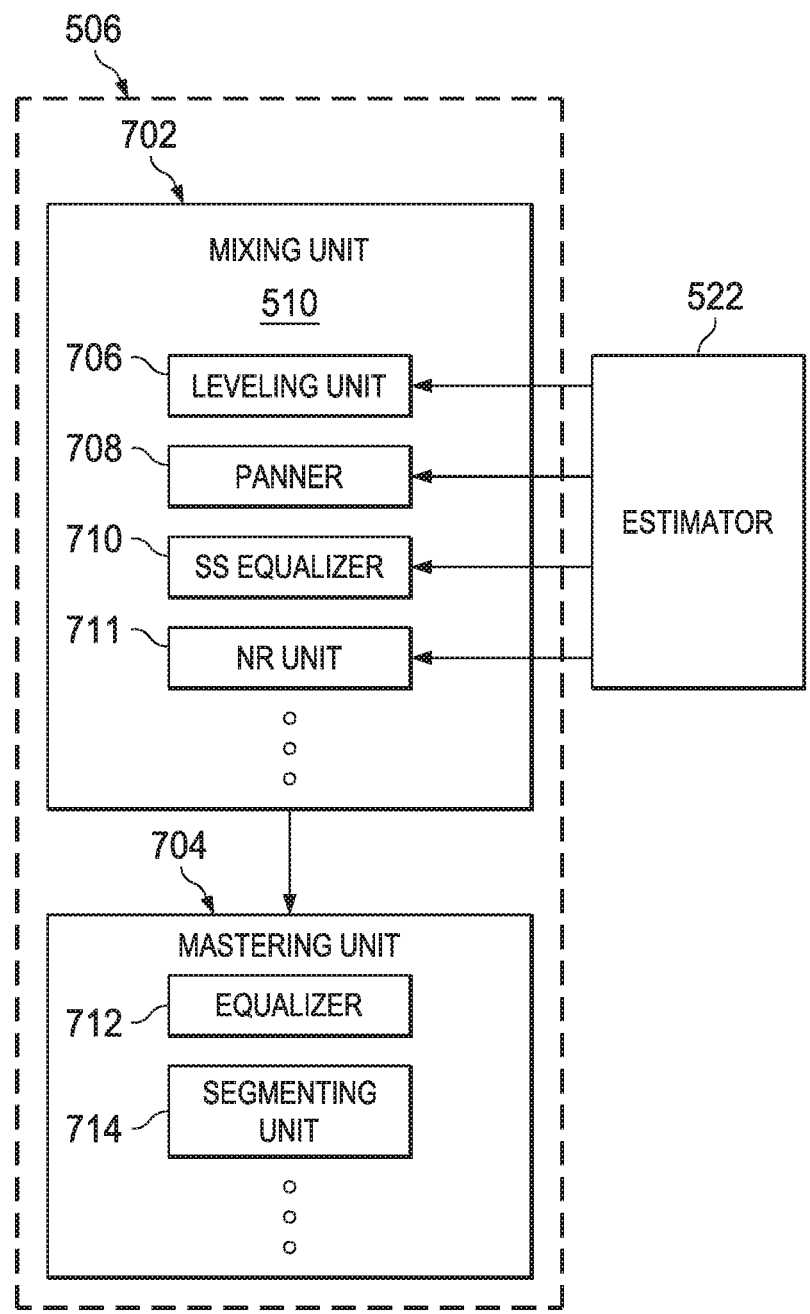
FIG. 7 is a block diagram illustrating example automated mixing and mastering units.

FIG. 7 is a block diagram illustrating components of example mixing and mastering units 506. Mixing and mastering units 506 can include various electronic circuits configured to perform mixing and mastering operations. Mixing and mastering units 506 improves upon conventional mixing and mastering technology by automating signal leveling and panning in the mixing stage, and by automating novelty-based signal segmenting when continuous and long crescendos are present.

Mixing and mastering units 506 can include mixing unit 702 and mastering unit 704. Mixing unit 702 is a component of mixing and mastering units 704 configured to perform mixing operations on the Ns signals from source separator 504 or the Nm synchronized signals from synchronizer 502 automatically using reference audio data and input from one or more remote or local mixing consoles.

Mixing unit 702 can include, among other components, leveling unit 706, panner 708, sound source equalizer 710 and noise reduction unit 711. Leveling unit 706 is a component of mixing unit 702 configured to adjust a respective gain for each sound source or each microphone. The adjustment can be based at least partially on reference audio data, by input from a mixing console, or a combination of both. Additional details of operations of leveling unit 706 are described below in reference to FIG. 8.

Panner 708 is a component of mixing unit 702 configured to spatially place each sound source at a location on a virtual soundstage (e.g., left, right, center). Additional details of the operations of panner 708 are described below in reference to FIG. 9 and FIG. 10.

Sound source equalizer 710 is a component of mixing unit 702 configured to perform equalization (EQ) operations on individual sound sources, rather than on mixed audio signals as a whole. Additional details of the operations of sound source equalizer 710 are described below in reference to FIG. 13, FIG. 14A and FIG. 14B.

Noise reduction unit 711 is a component of mixing unit 702 configured to perform noise reduction (NR) operations on individual signals, rather than across the spectrum of all signals. Additional details of the operations of noise reduction unit 711 are described below in reference to FIG. 24.

Mastering unit 704 can include, among other components, equalizer 712 and segmenting unit 714. Equalizer 712 is a module of mastering unit 704 configured to smooth sound levels across different frequencies, for mixed audio signals as a whole. Segmenting unit 714 is a module of mastering unit 704 configured to divide video signals to multiple segments based on inherent characteristics of audio signals. In some implementations, segmenting unit 714 is a component of, or is coupled to, video editor 530 of FIG. 5. Additional details of the operations of segmenting unit 714 are described below in reference to FIGS. 15 and 16.

Figure 8:
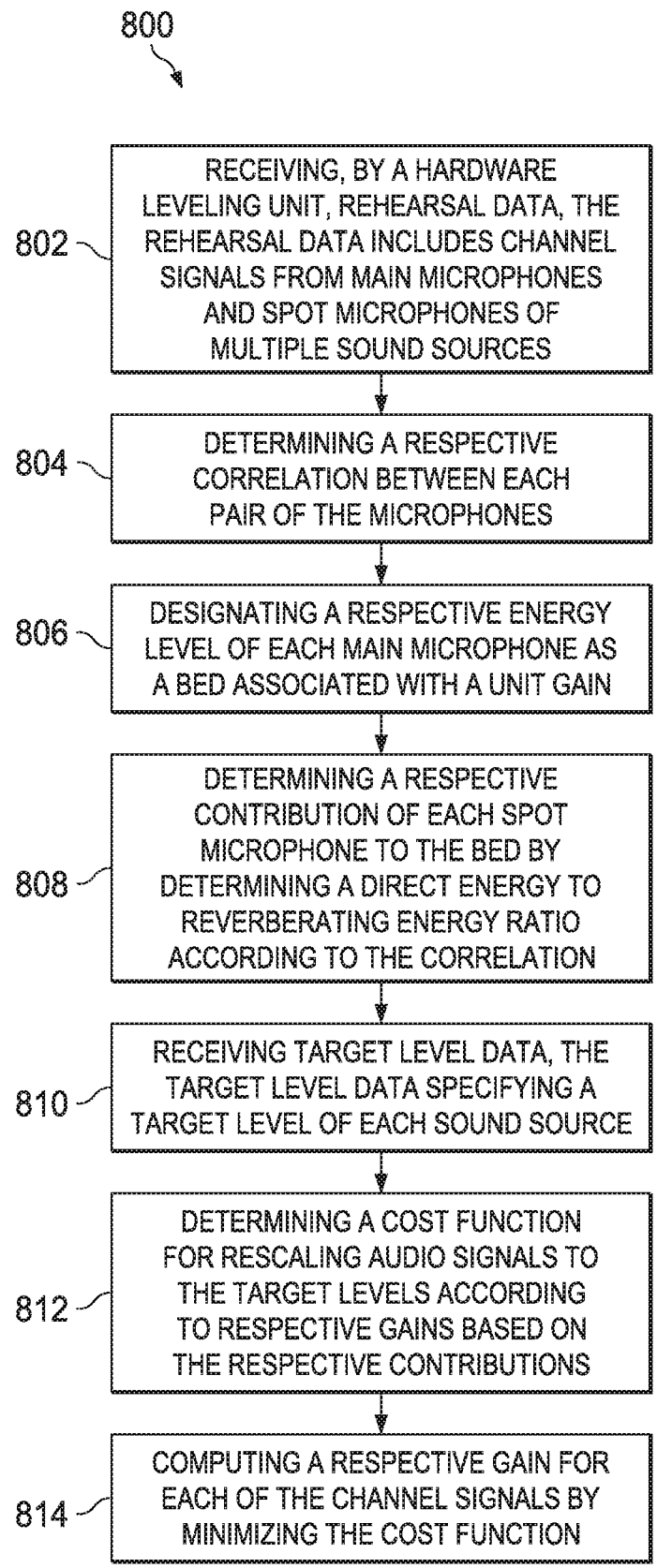
FIG. 8 is a flowchart illustrating an example process of automated leveling.

FIG. 8 is a flowchart illustrating example process 800 of automatically leveling sound sources. Process 800 can be performed by leveling unit 706 (of FIG. 7). In automatic leveling, leveling unit 706 can automatically adjust a respective volume level of a sound source to a target level. Process 800 improves upon conventional mixing technology by performing gain adjustments automatically based at least partially on reference audio data rather than based on manual adjustments by a human. This allows for fast treatment of a vast amount of music content in real time.

Leveling unit 706 can receive (802) reference audio data (also referred to as rehearsal data). The reference audio data can include a representation of channel signals from channel signal sources, e.g., main microphones and spot microphones of multiple sound sources. The representation can be channel signals directly from the channel signal sources, or signals that are partially processed, e.g., equalized or has been through dynamic range correction.

Leveling unit 706 can determine (804) a respective correlation between each pair of the channel signal sources, e.g., microphones. Details of determining the correlations are described below in reference to Equation (3).

Leveling unit 706 can designate (806) a respective energy level of each main microphone as a baseline associated with a unit gain or some other reference level (e.g., −18 dBs).

In some implementations, leveling unit 706 can determine (808) a respective contribution of each spot microphone to the baseline.

Leveling unit 706 can receive (810) target level data, the target level data specifying a target level of each sound source. The target level data can be received from a user interface.

Leveling unit 706 can determine (812) a cost function for rescaling audio signals to the target levels according to respective gains based on the respective contributions. A cost function can be a function of variables (in this case, the gains) that are to be solved such that the function has a minimum value. Solving the variables of the cost function is referred to as minimizing the cost function. Details and examples of solving the variables of the cost function are described below in the section having the heading "Minimizing a Cost Function by Best Guess."

Leveling unit 706 can compute (814) a respective gain for each of the channel signals by minimizing the cost function. Leveling unit 706 can apply the respective gains to the channel signals in live audio data to achieve the target level for each sound source. Leveling unit 706 can provide the resulting signals to other components for additional processing and playback on loudspeakers or headphones of end user devices. Additional details and examples of process 800 are described below.

The set of indices i=1, . . . , $N_i$ can denote sound source number, where $N_i$ is the total number of sound sources at event 100 (of FIG. 1). The set of indices b=1, . . . , $N_b$ can denote beam number, where each beam, as described earlier, is a channel signal from a respective spot microphone. $N_b$ is the total number of spot microphones. The set of indices M=L, R,1, . . . , $N_b$ can denote combined main left microphone (L) and main right microphone (R), plus beam indices. In case where the main microphone is a mono microphone, the set of indices can be M=Mono, 1, . . . , $N_b$, where the term Mono represents the mono microphone. Subsequent processing is similar. Multiple sound sources may be assigned to a same beam. Accordingly, in some scenarios, $N_b$<$N_i$. This is the case, for example, of putting a spot microphone close to a guitar player who also sings. In this example, vocals and guitar are assigned to the same spot microphone. Hence, leveling unit 706 can designate the total number of signals that will be present in the final mix as $N_M$.

One of the inputs to the algorithm executed by leveling unit 706 is loudness matrix $L_{iM}$ that quantifies the loudness level of each instrument i in each beam M (e.g., in dB). Estimator 522 can compute the loudness matrix $L_{iM}$. Leveling unit 706 can use a linear scale for loudness matrix $L_{iM}$, so that leveling unit 706 can represent energies of each instrument in each microphone in an energy matrix $E_{iM}$ as follows:

$$E_{iM} = 10^{L_{iM}/10}. \quad (1)$$

If leveling unit 706 applies a gain $g_M$ to a beam b, the beam's energy can change to $g_M^2 E_{ib}$. In addition, energy matrices can specify how much energy of each sound source is present in the two main stereo channels, designated by $E_{iL}$, $E_{iR}$.

Leveling unit 706 is configured to determine the gains $g_M$, which is a vector representing a respective gain for each channel including main channels and spot channels, where the gains for the two main channels are represented first. Leveling unit 706 can fix an absolute scale so that all energies are referred to the energy in the main stereo channels. Leveling unit 706 can determine not to apply any gains to the energy in the main stereo channels. In this approach, the main stereo channels can be designated as a baseline with unit gain. Leveling unit 706 can compute the contribution of each spot microphone above this baseline. Accordingly, leveling unit 706 can set the first two entries of $g_M$ to unit:

$$g_M = \{1, 1, g_1, \ldots, g_{N_b}\}. \quad (2)$$

To estimate the energy after mixing different signals, leveling unit 706 can first obtain normalized correlation matrices $(C_i)_{M,M'}$ from reference audio data for each sound source i, between beam M and beam M'. Each $C_i$ can be obtained from the rehearsal of sound source i only. Leveling unit 706 can use $s_{iM}$ to denote the signals captured by the M microphones (main stereo plus beams) when instrument i rehearsed. Leveling unit 706 can compute a normalized covariance matrix as follows:

$$(C_i)_{M,M'} = \frac{<s_{iM} s_{iM'}>}{\sqrt{<s_{iM}^2><s_{iM'}^2>}}, \quad (3)$$

where "< >" stands for time average over a time period. The time period can be an entire rehearsal time. Alternatively, leveling unit 706 can take the average over a gated part of the rehearsal, so that leveling unit 706 can remove mostly-silent parts, if any. Hence, leveling unit 706 can retain parts with good signal-to-noise ratio (SNR). The normalised covariance satisfies the following:
- $(C_i)_{M,M}=1$, which is, a microphone is always fully correlated with itself.
- $(C_i)_{M,M'}=0$, if the signals in the two microphones are fully uncorrelated.
- $(C_i)_{M,M'}=1$, if the signals in the two microphones are fully correlated, with positive phase: $s_{iM}=\alpha s_{iM'}$, where $\alpha$ is a value and $\alpha>0$.
- $(C_i)_{M,M'}=-1$, if the signals in the two microphones are fully correlated, with inverse phase: $s_{iM}=\alpha s_{iM'}$, where $\alpha$ is a value and $\alpha<0$.

Using this covariance matrix, leveling unit 706 can express the total energy E of a sound source i as follows:

$$E_i = \sum_M g_M^2 E_{iM} + 2 \sum_{M'>M} (C_i)_{M,M'} g_M g_{M'} E_{iM}^{\frac{1}{2}} E_{iM'}^{\frac{1}{2}}. \quad (4)$$

An equivalent, shorter form (that, however, sums over repeated terms) is:

$$E_i = \sum_{M,M'} (C_i)_{M,M'} g_M g_{M'} E_{iM}^{\frac{1}{2}} E_{iM'}^{\frac{1}{2}}. \quad (5)$$

Another input to leveling unit 706 can be a target loudness level (or target energy $T_i$, in linear scale) of each sound source i in the final mix. In principle, only the relative target levels matter. If leveling unit 706 has already fixed the global volume by fixing to unit the gains of the main stereo channels, this gives a physical meaning to the absolute target volume. Leveling unit 706 can determine one or more criteria to set it to an appropriate level.

To do this, leveling unit 706 can obtain a particular data item to determine, of all possible ways to reach the desired relative target loudness level $T_i$, how leveling unit 706 can specify the absolute scale so that leveling unit 706 can control the fraction of the total energy that ends up coming from the main stereo microphones versus the spot microphones. In some implementations, leveling unit 706 can set this fraction number as a user-input parameter.

In some implementations, leveling unit 706 can infer this fraction by aiming at a given ratio between direct energy and reverberant energy, designated as direct-to-reverb ratio. For example, in an audio environment having strong reverberation (e.g., a church), leveling unit 706 can apply a high level of relative spot microphone energy. By comparison, in an audio environment having low reverberation (e.g., an acoustically-treated room), where the main stereo microphones are in an optimal location, leveling unit 706 can allow most energy to come from the main stereo microphones. Accordingly, leveling unit 706 can obtain an input specifying the spots-to-main energy ratio $R_{spots}$, from a user or by computing automatically. Leveling unit 706 can then determine a term in a cost function using Equation (6) below:

$$R_{spots} = \frac{E_{spots}}{E_{main}}, \quad (6)$$

$$E_{spots} = \sum_i \sum_{b,b'} (C_i)_{b,b'} g_b g_{b'} E_{ib}^{\frac{1}{2}} E_{ib'}^{\frac{1}{2}},$$

$$E_{main} = \sum_i \left[ E_{iL} + E_{iR} + 2(C_i)_{LR} E_{iL}^{\frac{1}{2}} E_{iR}^{\frac{1}{2}} \right],$$

$$E_{total} = \sum_i E_i = \sum_i \sum_{M,M'} (C_i)_{M,M'} g_M g_{M'} E_{iM}^{\frac{1}{2}} E_{iM'}^{\frac{1}{2}}$$

$$= E_{main} + E_{spots} + 2 \sum_i \sum_m \sum_b^{L,R} (C_i)_{m,b} g_m g_b E_{im}^{\frac{1}{2}} E_{ib}^{\frac{1}{2}}.$$

Here, $E_{main}$ is the energy from the main microphones, $E_{spot}$ is the energy from the spot microphones, and $E_{total}$ is the total energy.

Leveling unit 706 can approximate this equation to simplify the processing. Assume that the final sound source energies are correctly reached, so that $E_i \cong T_i$ in the approximation below:

$$E_{total} \approx \sum_i T_i, \qquad (7)$$

$$E_{spots} \approx E_{total} - E_{main} \approx \sum_i T_i - E_{main}.$$

In this approximation, these energies do not depend on $g_M$, and hence, leveling unit 706 can apply the spots-to-all constraint hardly, before minimization. Leveling unit 706 can rescale the target energies, $\hat{T}_i = rT_i$, and solve for scaling factor r:

$$r = \frac{E_{main}}{\sum_i T_i}(1 + R_{spots}), \qquad (8)$$

where $\hat{T}_i$ is $T_i$ scaled by scaling factor r.

Leveling unit 706 can then determine a cost function in terms of the properly rescaled $\hat{T}_i$. Even if leveling unit 706 set $R_{spots}=0$, in which case $E_{total} \approx \Sigma_i T_i = E_{main}$, some spot microphones may be needed to reach target level T for some sound source i. This is against the intuition of setting $R_{spots}=0$, and it is due to the approximation that, after minimization, leveling unit 706 can get close to $E_i \cong T_i$.

Leveling unit 706 can determine that cost function is (using the shorthand: $dB_p[\cdot] = 20 \log_{10}[\cdot]$ and $dB_I[\cdot] = 10 \log_{10}[\cdot]$):

$$F[g_M] = \frac{1}{N_i} \sum_i \left(dB_I[\hat{T}_i] - dB_I[E_i]\right)^2 = \frac{1}{N_i} \sum_i \left(dB_I\left[\frac{\hat{T}_i}{E_i}\right]\right)^2, \qquad (9)$$

where F is a function of the $N_b$ unknowns $g_M$, all dependence arising from the implicit dependence via $E_i$. In Equation (9) and other equations below, the terms for dB are expressed in square, e.g., $(dB)^2$. In various implementations, these terms can be replaced with an absolute value, e.g., $|dB|$.

The $N_i^{-1}$ normalisation factor ensures that the absolute value of the first term can be compared across cases with different numbers of sound sources. Leveling unit 706 can use cost function F to represent the average square-error (e.g., in dBs) that each sound source fails to reach the target. In some implementations, leveling unit 706 can obtain a cost function and avoid the approximation as described above. Leveling unit 706 can put an extra cost term:

$$F[r, g_M] = F_0[r, g_M] + F_1[g_M], \qquad (10)$$

$$F_0[r, g_M] = \frac{1}{N} \sum_i \left(dB_I\left[\frac{r\hat{T}_i}{E_i}\right]\right)^2,$$

$$F_1[g_M] = \alpha\left(dB_I\left[R_{spots}\frac{E_{main}}{E_{spots}[g_M]}\right]\right)^2,$$

where $E_{spots}$, $E_{main}$ are defined, in terms of $g_b$, in equation (6). This allows leveling unit 706 to control how much importance to give to the $R_{spots}$ constraint by increasing α.

Note that in this implementation, leveling unit 706 needs to find the minimum for r too, which can be the global scale of the targets.

In various implementations, leveling unit 706 can use an algorithm that may provide better results if leveling unit 706 obtains information about which sound sources are more important that they should reach the specified loudness targets. For example, input information can specify that the lead vocals should be 3 dB above the other instruments. This information can crucially determine the quality of the mix. Other instruments might not reach their correct targets by a few dBs without the mix being judged as poor as the lead vocals being below target. Leveling unit 706 can determine a set of importance weights, $w_i^{imp}$, for each sound source to capture this aspect. Leveling unit 706 can define the cost function that incorporates the importance weight as follows:

$$F[g_M] = \frac{1}{N_i} \sum_i w_i^{imp}\left(dB_I[\hat{T}_i] - dB_I[E_i]\right)^2 = \frac{1}{N_i} \sum_i w_i^{imp}\left(dB_I\left[\frac{\hat{T}_i}{E_i}\right]\right)^2. \qquad (11)$$

Leveling unit 706 can minimize the cost functions F as described above to solve for $g_M$. In some implementations, leveling unit 706 can set importance weights $w_i^{imp}$ according to whether an instrument is a lead instrument. For example, leveling unit 706 can set importance weight, $w_i^{imp}$ to one for non-lead instruments, and to a value between two to five for lead instruments,

Adding Dedicated Spot Microphones

In some situations, the algorithm tends to use hardly any energy from certain channel signal sources, e.g., dedicated spot microphones, because the level of the corresponding sound sources can also be correctly achieved using other microphones. This can occur in cases with leakage, like those where the spot microphones are omni-directional (e.g., the internal microphones of a smartphone). In general, when dedicated spot microphones are used, leveling unit 706 can be configured to get most of the corresponding instrument's energy from such microphones.

From rehearsal stage, leveling unit 706 can define a degree of dedication that a given spot microphone has for a given sound source. Leveling unit 706 can set the degree of dedication to 1 if the spot microphone has almost no leakage from other sound sources. Leveling unit 706 can set the degree of dedication to 0 if leakage from other sound sources is severe (e.g., beyond a threshold). So for a sound source i, whose beam is b(i), such degree of dedication D(i) shall be:

$$SNR(i) = dB_I\left[\frac{\text{energy from } i \text{ in } b(i)}{\text{energy from others in } b(i)}\right] = dB_I\left[\frac{E_{ib(i)}}{\sum_{i' \neq i} E_{i'b(i)}}\right], \qquad (12)$$

$$D(i) = \text{clamp}\left[\frac{SNR(i) - dBMinRatio}{dBMaxRatio - dBMinRatio}\right],$$

where SNR(i) is the signal to noise ratio for sound source i, dBMaxRatio is a first threshold above which leveling unit 706 sets the degree to 1, and dBMinRatio is a second threshold below which Leveling unit 706 sets the degree 0. The threshold can be pre-defined, or can be from user inputs.

Leveling unit 706 can clamp to $D(i) \in [0,1]$. In some implementations, leveling unit 706 can set numbers for these parameters as follows: dBMaxRatio=3 dB, dBMinRatio=−6 dB. These settings imply that the degree is 1 if the relevant instrument is at least 3 dB above the sum of all others in that mic, and 0 if is at −6 dB or less.

Leveling unit 706 can use D(i) to weight a new term $N_{ded}$ in the cost function:

$$F_2 = \frac{1}{N_{ded}} \sum_i w_i^{imp} D(i) \left( dB_l \left[ \frac{E_{ib(i)}}{E_{i,spots}} \right] \right)^2, \quad (13)$$

where $N_{ded}$ is a measure of how many dedicated microphones there are (a real number), and $E_{i,spots}$ is the total energy in the mix, originating from spot microphones, from instrument i:

$$N_{ded} = \sum_i D(i), \quad (14)$$

$$E_{i,spots} = \sum_{b,b'} (C_i)_{b,b'} g_b g_{b'} E_{ib}^{\frac{1}{2}} E_{ib'}^{\frac{1}{2}}.$$

Leveling unit 706 can compute $g_M$ by minimizing the cost function that includes this new term.

Minimizing a Cost Function by Best Guess

In some implementations, these cost functions can be non-linear. To minimize a non-linear cost function, leveling unit 706 can take a guess approach. Leveling unit 706 can discretise all $g_M$ in steps of 1 dB, in a range of e.g., ±5 dB, and find the combination that minimizes F. Leveling unit 706 can start from a best guess, and find the combination by starting at the best guess and taking steps away from the best guess across the range, until leveling unit 706 finds a minimum value of the cost function.

To do that, leveling unit 706 can perform a first guess. This can be obtained, for example, by neglecting leakage, so that E is diagonal (assuming estimator 522 or leveling unit 706 sorted the rows and columns so that sound sources' corresponding beam is in the diagonal). In that case, only one beam contributes to each i. That beam is labeled b(i). Accordingly:

$$E_i = g_{b(i)}^2 E_{ib(i)} + E_{i,main}, \quad (15)$$

where $E_{i,main}$ is the energy of the instrument i in the main microphones. Assuming that leveling unit 706 reaches the target, $E_i \approx \hat{T}_i$, leveling unit 706 can solve for g:

$$g_{b(i)}^2 = \frac{\hat{T}_i - E_{i,main}}{E_{ib(i)}}. \quad (16)$$

In the case where leveling unit 706 repeats the same beam for more than one instrument, leveling unit 706 can solve for g as follows:

$$g_b^2 = \frac{\langle \hat{T}_i - E_{i,main} \rangle}{\langle E_{ib} \rangle}, \quad (17)$$

where < > is an average, the average being over the various instruments assigned to the same beam b. Leveling unit 706 can designate the solution as a best guess, and increase and decrease the solution by X dB steps to find the best solution.

A note on the sign of this numerator. The only fact that is well guaranteed is the total target energy from all beams is greater or equal to the energy from the main microphones:

$$\sum_i \hat{T}_i = \sum_i rT_i \geq E_{main}, \quad (18)$$

$$\sum_i (\hat{T}_i - E_{main}) \geq 0.$$

However, some individual terms in the sum can be negative for some i. This means that, for some sound source i, there is already enough loudness in the main stereo channels to reach the target. In such cases, leveling unit 706 can set the gain of the corresponding beam to zero. In some implementations, leveling unit 706 can look for a range of possibilities, e.g., −15 dB.

Leveling unit 706 can use the same loudness model for the targets $T_i$. Instead of expressing loudness in dB, leveling unit 706 can express them in sones, and use a loudness model leveling unit 706 has been using to convert back to dB.

Automatic Panner

Figure 9:
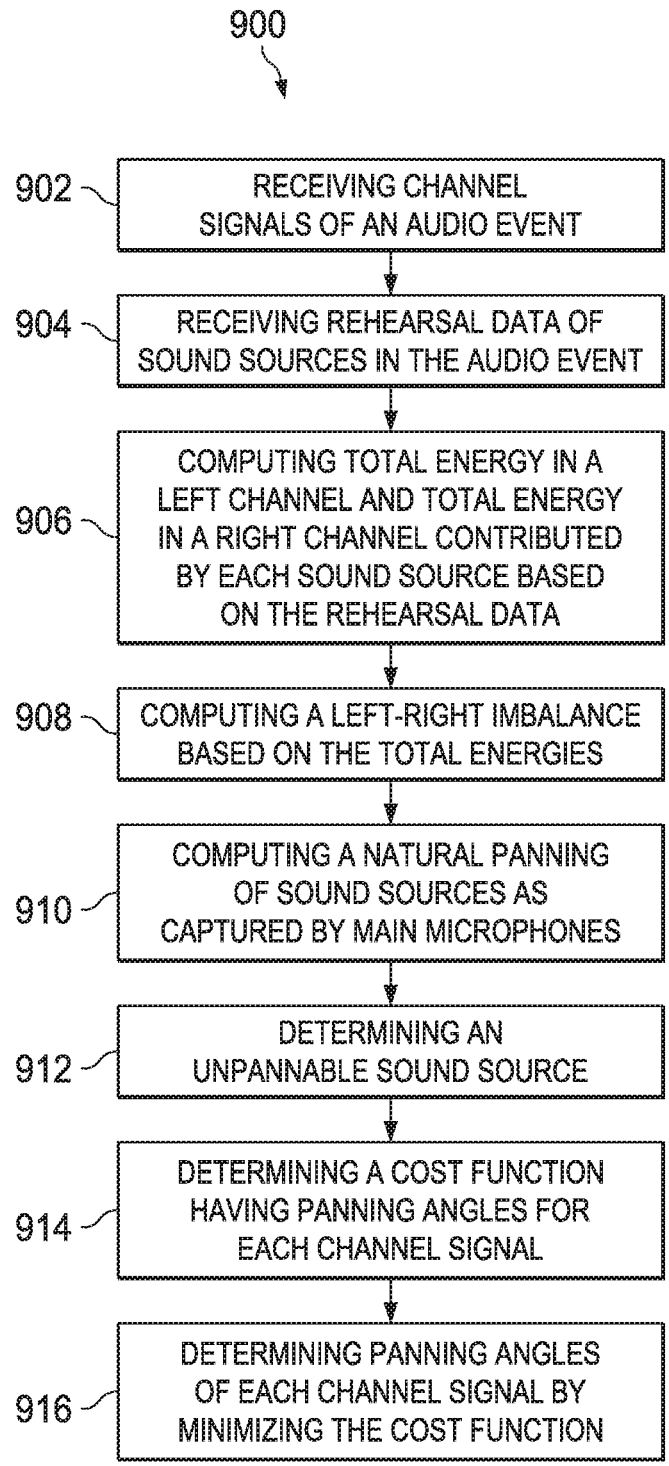
FIG. 9 is a flowchart illustrating an example process of automated panning.

FIG. 9 is a flowchart illustrating an example process 900 of automatic panning. Process 900 can be performed by panner 708 of FIG. 7. By performing process 900, panner 708 improves upon conventional panning technology by automatically placing instruments at their respective correct locations on a sound stage.

Panner 708 can receive (902) channel signals of event 100. The channel signals can be an output of leveling unit 706. Each channel signal can correspond to a microphone. Panner 708 can receive (904) reference audio data of sound sources in event 100. The reference audio data can be generated from signals recorded in a rehearsal session. Panner 708 can compute (906) total energy in a left channel and total energy in a right channel, as contributed by each sound source based on the reference audio data. Panner 708 can compute (908) a left-right imbalance based on the total energies. Panner 708 can determine a cost function to minimize the imbalance. Panner 708 can compute (910) a natural panning of sound sources as captured by main microphones. Panner 708 can determine a cost function that maximizes the natural panning. Panner 708 can determine (912) an unpannable sound source, e.g., according to an input designating the sound source as unpannable. Panner 708 can determine a cost function that respects the unpannable sound source.

Panner 708 can determine (914) a cost function having panning angles for each channel signal as variables. The cost function can have a first component corresponding to the imbalance, a second component corresponding to pannable sound sources, and a third component corresponding to the unpannable sound sources.

Panner 708 can determine (916) panning positions of each channel signal by minimizing the cost function. The panning positions can be parameterized as panning angles, ratios between left and right output channels, or percentage over left and right output channels. Panner 708 can apply the panning position to the channel signals to achieve an audio effect of placing sound sources between left and right of a stereo sound stage for output to speakers.

In some implementations, panner 708 can perform audio panning based on video data. Panner 708 can determine a location of a particular sound source, e.g., a vocalist or instrument, using facial tracking or instrument tracking on the video data. Panner 708 can then determine a panning position of that sound source based on the position.

Once leveling unit 706 has computed the gains needed for each beam ($g_b$), panner 708 can decide how to split each beam into left and right LIR in an energy preserving way. Panner 708 can compute the panning angles $\theta_b$ for each beam b:

$$l_b = \cos\theta_b g_b, r_b = \sin\theta_b g_b, \theta_b = 0, \ldots, \pi/2, \quad (19)$$

where $l_b$ is the left channel component of beam b, and $r_b$ is the right channel component of beam b. hard left is $\theta=0$, hard right is $\theta=\pi/2$, center is $\theta=\pi/4$.

Panner 708 may extend the indices to M, assuming panner 708 leaves the main stereo channels unchanged, where $l_L = r_L = 1$. The resulting mix, as a function of the angles, is:

$$L = \sum_M l_M s_M, \quad R = \sum_M r_M s_M, \quad (20)$$

where $s_M$ is the signal picked up by microphone M, L is the left component of the mix, and R is the right component of the mix.

Based on reference audio data, panner 708 can compute the total energy in the L/R channels due to each instrument:

$$E_i^{Ltot}(\theta_b) = \sum_{M',M} (C_i)_{M,M'} l_M l_{M'} E_{iM}^{\frac{1}{2}} E_{iM'}^{\frac{1}{2}}, \quad (21)$$

$$E_i^{Rtot}(\theta_b) = \sum_{M',M} (C_i)_{M,M'} r_M r_{M'} E_{iM}^{\frac{1}{2}} E_{iM'}^{\frac{1}{2}},$$

where $E_i^{Ltot}(\theta_b)$ is the total energy of sound source i in the left channel for panning angle $\theta_b$, and $E_i^{Rtot}(\theta_b)$ is the total energy of sound source i in the right channel for panning angle $\theta_b$. These expressions depend now only on $\theta_b$, as the gains $g_b$ has already been tuned by leveling unit 706.

One thing panner 708 can impose is that the overall mix is balanced between L and R. So panner 708 can minimize L-R imbalance cost function $H_{LR-balance}$:

$$H_{LR-balance}(\theta_b) = \left(dB_l\left[\frac{\sum_i E_i^{Ltot}}{\sum_i E_i^{Rtot}}\right]\right)^2 \quad (22)$$

On the other hand, panner 708 can be configured to respect the natural panning of sound sources as arranged in event 100 from the perspective of event 100. The natural panning is captured by the main stereo energies entirely: $E_{iL}$, $E_{iR}$. So panner 708 can also impose the following:

$$\frac{E_i^{Ltot}(\theta_b)}{E_{iL}} \approx \frac{E_i^{Rtot}(\theta_b)}{E_{iR}}. \quad (23)$$

In some implementations, panner 708 can receive desired positions as an external input, rather than determine the positions upon natural panning obtained by analyzing left and right channels. For example, panner 708 can determine the natural position from an image or a video. Additionally, or alternatively, panner 708 can determine the natural position from input by a user.

In addition, some sound sources should never be panned (e.g., lead vocals, bass, etc.). Panner 708 can be configured to respect this as much as possible. These sound sources can be designated as unpannable sound sources. Panner 708 can denote the pannable/unpannable sound source sets by $I_P/I_U$, respectively. Panner 708 can then generalize the previous to $$\frac{E_i^{Ltot}(\theta_b)}{E_i^{Rtot}(\theta_b)} \approx 1, \quad i \in I_U \quad (24)$$

$$\frac{E_i^{Ltot}(\theta_b)}{E_i^{Rtot}(\theta_b)} \approx \frac{E_{iL}}{E_{iR}}, \quad i \in I_P$$

Panner 708 can then determine cost function $H_{unpannable}$ for unpannable sources and dost function $H_{pannable}$ for pannable sound sources.

$$H_{unpannable}(\theta_b) = \frac{1}{N_U} \sum_{i \in I_U} \left(dB_l\left[E_i^{Ltot}(\theta_b)/E_i^{Rtot}(\theta_b)\right]\right)^2, \quad (25)$$

$$H_{pannable}(\theta_b) = \frac{1}{N_P} \sum_{i \in I_P} \left(dB_l\left[\frac{E_i^{Ltot}(\theta_b)/E_i^{Rtot}(\theta_b)}{E_{iL}/E_{iR}}\right]\right)^2$$

Panner 708 can control the amount of panning that indicates the tendency to pan instruments wider, as opposite to putting them in the center of the sound stage. In some implementations, panner 708 can introduce another term. In some implementations, panner 708 can exaggerate the estimation from the main microphones. Panner 708 can receive a parameter $d \in [0,1]$, which indicates divergence, as a preset or user input. Panner 708 can perform the following transformation on the perceived main channel energies that induces the transformation on the instruments angles:

$$E_{iL}E_{iR} \rightarrow (E_{iL}E_{iR})^{1+4d},$$

$$\theta_0 \rightarrow \theta_{final} = \tan^{-1}(\tan\theta_0)^{1+4d}, \quad (26)$$

where $\theta_0$ is an original panning angle, $\theta_{final}$ is a final panning angle. For d=0, nothing changes $\theta_{final} = \theta_0$. For the extreme case d=1, the warping is shown below in FIG. 10.

In terms of d, panner 708 can use the following pannable cost-function:

$$H_{pannable}(\theta_b) = \frac{1}{N_P} \sum_{i \in I_P} \left(dB_l\left[\frac{E_i^{Ltot}(\theta_b)/E_i^{Rtot}(\theta_b)}{(E_{iL}/E_{iR})^{1+4d}}\right]\right)^2. \quad (27)$$

Panner 708 can use final cost function is:

$$H[\theta_b] = H_{LR-balance} + \alpha_u H_{unpannable} + \alpha_p H_{pannable}. \quad (28)$$

where the weights $\alpha_u$ and $\alpha_p$ control the importance we want to give to each of cost functions for unpannable and pannable sound sources, respectively. Panner 708 can minimize cost function $H[\theta_b]$ by discretizing the possible values of $\theta_i$, for example, every 10 degrees from −50 to 50, and iterating the discretized values until a minimum value of the cost function is found.

Figure 10:
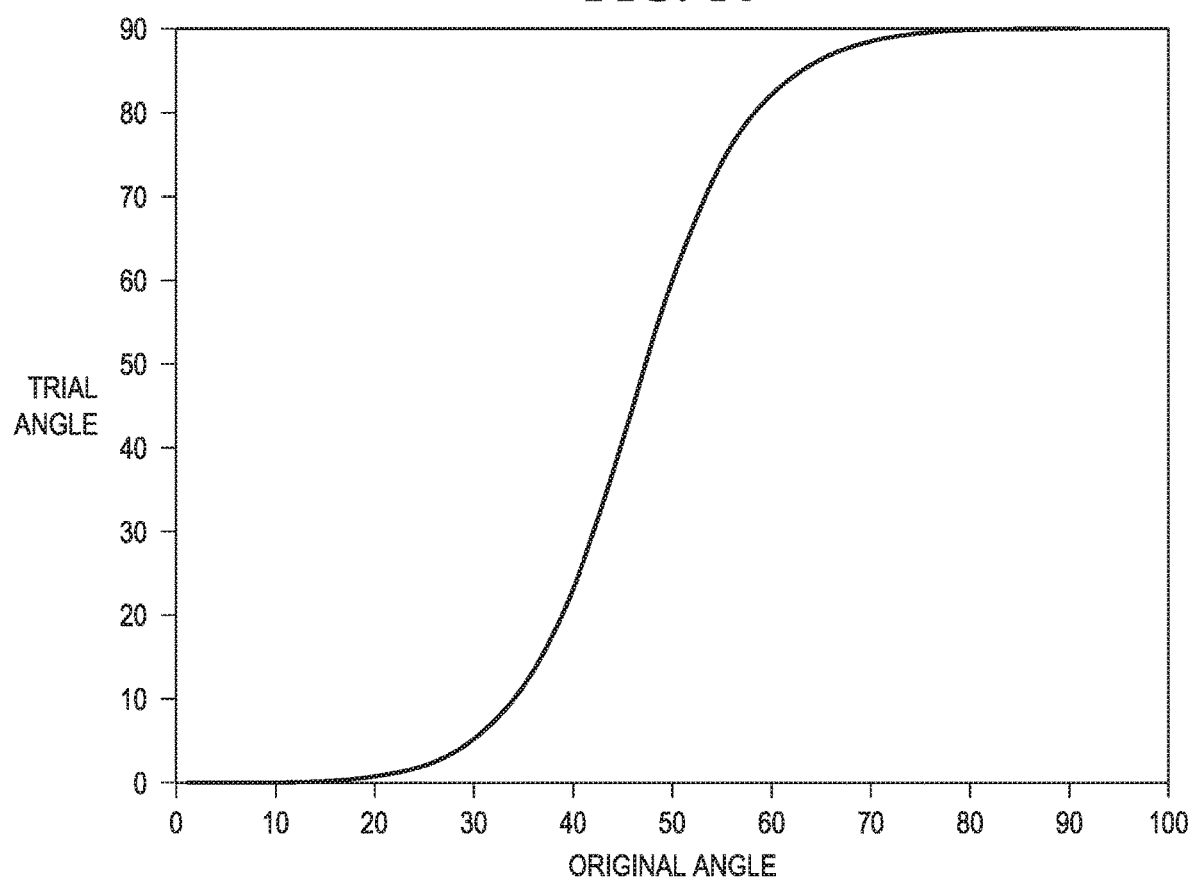
FIG. 10 illustrates an example angle transformation in maximum warping.

FIG. 10 illustrates an example angle transformation for maximum warping. The angle transformation for maximum warping can be performed by panner 708 (d=1). The horizontal axis represents original angles $\theta_0$ of one or more sound sources. The vertical axis represents final angles $\theta_{final}$ of one or more sound sources. Angle=45 is center panning.

Joint Minimization

Leveling unit 706 may use less spot microphones than it is capable of handling. For example, various configurations of input gains can compete, where all of the input gains lead to the same loudness. This can have a negative impact on panner 708, as range of possibilities for panner 708 can greatly reduced if only 1-2 spot microphones are used.

In some implementations, to reduce this indeterminacy in the auto-level stage and favour configurations with more spot microphones used, auto-level stage operations of leveling unit 706 can link to panning stage operations of panner 708.

In such implementations, a leveling and panning unit can combine the circuits and functions of leveling unit 706 and panner 708. The leveling and panning unit can receive reference audio data. The reference audio data can include a representation of channel signals from multiple channel signal sources recorded in a rehearsal of one or more sound sources. The leveling and panning unit can receive target level data, the target level data specifying a target level of each sound source. The leveling and panning unit can receive live audio data. The live audio data can include recorded or real time signals from the one or sound sources playing at live event 100. The leveling unit can determine a joint cost function for leveling the live audio data and panning the live audio data based on the reference audio data. The joint cost function can have a first component for leveling the live audio data and a second component for panning the live audio data. The first component can be based on the target level data. The second component can be based on a first representation of imbalance between a left channel and a right channel, a second representation of pannable sources among the sound sources, and a third representation of unpannable sources among the sound sources. The leveling and panning unit can compute a respective gain to apply to each channel signal and a respective panning position of each channel signal by minimizing the joint cost function. The leveling and panning unit can apply the gains and panning positions to signals of live audio data of an event to achieve an audio effect of leveling sound sources in the live audio data and placing sound sources in the live audio data between left and right of a stereo sound stage for output to a storage device or to a stereo sound reproduction system.

The joint cost function is shown below in Equation (29), where some of the terms appeared above are renamed:

$$H_{automixer}[g_b, \theta_b] = H_{level}[g_b] + \alpha_{panner} H_{panner}[g_b, \theta_b],$$

$$H_{level} = H_{targets} + \alpha_d H_{dedicated},$$

$$H_{panner} = H_{LR\text{-}balance} + \alpha_u H_{unpannable} + \alpha_p H_{pannable}, \quad (29)$$

where $H_{automixer}$ a cost function of combined leveling unit 706 and panner 708, $H_{level}$ is the cost function of leveling unit 706, $H_{panner}$ is the cost function of panner 708, $H_{targets}$ is the cost function when targets for important sound sources are respected, and $H_{dedicated}$ the cost function when dedicated beams are considered. In addition, $\alpha_d$ is a weight of dedicated microphones, $\alpha_n$ is a weight for unpannable sound sources, and $\alpha_p$ is a weight for pannable sound sources. Panner 708 can receive these weights as pre-set parameters or user inputs.

The cost functions in the joint cost function are defined below.

$$H_{targets} = \frac{1}{N_i} \sum_i w_i^{imp} \left( dB_l \left[ \frac{\hat{T}_i}{E_i} \right] \right)^2 \quad (30)$$

$$H_{dedicated} = \frac{1}{N_i} \sum_i w_i^{imp} D(i) \left( dB_l \left[ \frac{E_{ib(i)}}{E_{i,spots}} \right] \right)^2,$$

$$H_{LR\text{-}balance} = \left( dB_l \left[ \frac{\sum_i E_i^{Ltot}}{\sum_i E_i^{Rtot}} \right] \right)^2,$$

$$H_{unpannable} = \frac{1}{N_U} \sum_{i \in I_U} \left( dB_l \left[ E_i^{Ltot}(\theta_b) / E_i^{Rtot}(\theta_b) \right] \right)^2,$$

$$H_{pannable} = \frac{1}{N_P} \sum_{i \in I_P} \left( dB_l \left[ \frac{E_i^{Ltot}(\theta_b) / E_i^{Rtot}(\theta_b)}{(E_{iL}/E_{iR})^{1+4d}} \right] \right)^2,$$

where $$E_i = \sum_{M,M'} (C_i)_{M,M'} g_M g_{M'} E_{iM}^{\frac{1}{2}} E_{iM'}^{\frac{1}{2}}, \quad (31)$$

$$E_{i,spots} = \sum_{b,b'} (C_i)_{b,b'} g_b g_{b'} E_{ib}^{\frac{1}{2}} E_{ib'}^{\frac{1}{2}},$$

$$E_i^{Ltot}(\theta_b) = \sum_{M',M} (C_i)_{M,M'} l_M l_{M'} E_{iM}^{\frac{1}{2}} E_{iM'}^{\frac{1}{2}},$$

$$E_i^{Rtot}(\theta_b) = \sum_{M',M} (C_i)_{M,M'} r_M r_{M'} E_{iM}^{\frac{1}{2}} E_{iM'}^{\frac{1}{2}},$$

$$l_b = \cos\theta_b g_b, \quad r_b = \sin\theta_b g_b, \quad \theta_b = 0, \ldots, \pi/2.$$

Here, the auto-level processing of leveling unit 706 does not depend on the panning angles. It measures the overall loudness of the mono downmix. The auto-panning processing of panner 708 depends on the gains of the beams $g_b$, besides the panning angles.

Inference of Instrument RMS from Microphone Signals

Figure 11:
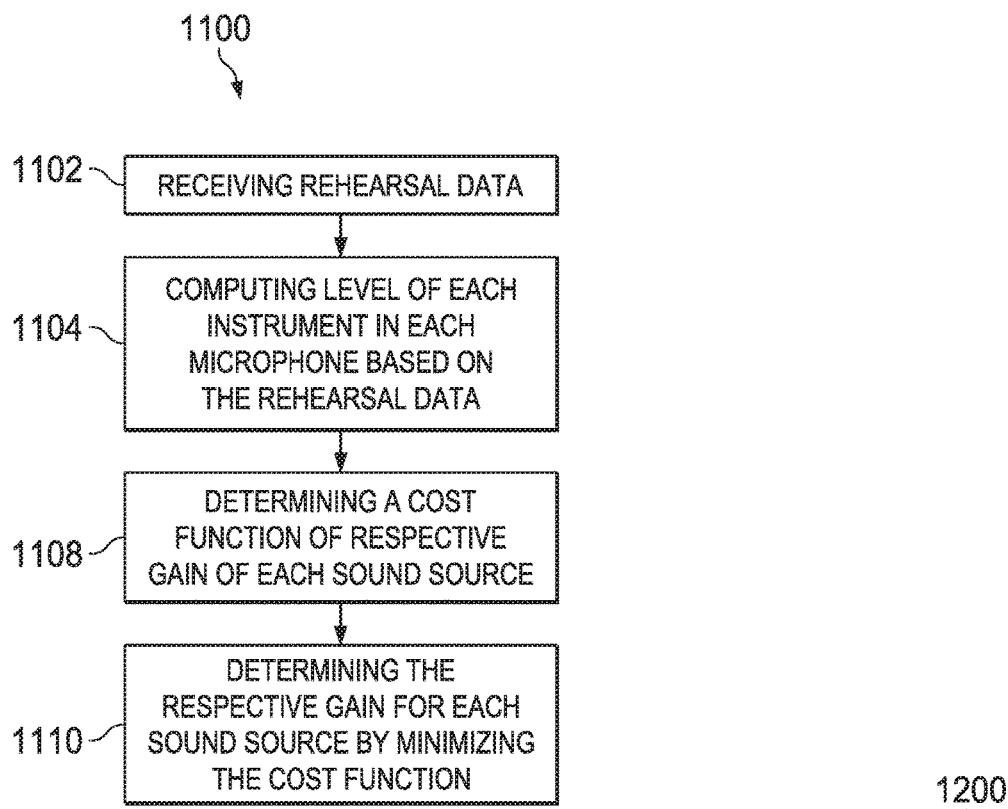
FIG. 11 is a flowchart illustrating an example process of inferring energy level from microphone signals.

FIG. 11 is a flowchart illustrating example process 1100 of inferring energy level from microphone signals. Estimator 522 of FIGS. 5 and 7 can perform process 1100 to measure instrument RMS. The instrument RMS can be root mean square representations of energy levels of various sound sources.

Estimator 522 can receive (1102) reference audio data. The reference audio data can include channel signals from m=1, . . . , M microphones on i=1, . . . , $N_i$ sound sources recorded in a rehearsal.

Estimator 522 can compute (1104) a respective level (e.g., loudness level, energy level, or both) of each instrument in each microphone based on the reference audio data.

Estimator 522 can determine (1108) a cost function on a respective gain of each sound source. In the cost function, estimator 522 can give less weight to signals from main microphones than to spot microphones. In the cost function, estimator 522 can penalize estimating instrument loudnesses in live data that are significantly above those represented in reference audio data. In the cost function, estimator 522 can scale a cost function by an average across microphone difference between the level measured between performance and rehearsal.

Estimator 522 can determine (1110) the respective gain for each sound source by minimizing the cost function. Estimator 522 can provide the respective gain in an energy matrix or loudness matrix to a processor (e.g., video editor 530) for processing video signals, e.g., for identifying which instrument is playing at a level that is more than a threshold of other instruments, and for focusing on that instrument or a player of that instrument. Additional details and examples of process 1100 are described below.

An audio scene of event 100 can contain m=1, . . . , M microphones, and i=1, . . . , N sound sources. In rehearsal stage, each instrument is played separately. Estimator 522 is a component of server 408 (of FIG. 4) configured to compute loudness of each instrument in each microphone $E_{i,m}$, and convert that number into energy. In some implementations, loudness measures can be based on, for example, R128 standard of the European Broadcast Union (EBU), and we convert to energy via $10^{L/10}$. Accordingly, in rehearsal, estimator 522 can compute matrix $e_{i,m}$ from the following relation:

$$E_{i,m}^{rehearsal} = e_{i,m} E_i^{rehearsal}, \text{(no sum)}, \tag{32}$$

where $E_{i,m}^{rehearsal}$ is the measured loudness in each microphone when instrument i rehearsed, and $E_i^{rehearsal}$ is the loudness of each instrument when playing in rehearsal stage (unknown, not measurable).

When all the band performs together, estimator 522 may have access only to measuring $E_m^{performance}$, the total loudness in each microphone. If the transfer functions from instruments and microphones remain constant, and equal to rehearsal stage, and the signals of all instruments are mutually statistically independent, then the following relation would hold:

$$E_m^{performance} \approx \sum_i e_{i,m} E_i^{performance}. \tag{33}$$

Estimator 522 can use gains $g_i$ to compare the level of each instrument against their levels when they rehearsed:

$$E_i^{performance} = g_i^2 E_i^{rehearsal}. \tag{34}$$

In some implementations, estimator 522 can use cost function C, which can be a function of the gains $g_i$, to make sure that estimator 522 estimates the performance levels so that the model is best satisfied in a least square sense:

$$C_1(g_i) = \frac{1}{M} \sum_m \left[ E_m^{performance} - \sum_i g_i^2 e_{i,m} E_i^{rehearsal} \right]^2, \tag{35}$$

$$= \frac{1}{M} \sum_m \left[ E_m^{performance} - \sum_i g_i^2 E_{i,m}^{rehearsal} \right]^2,$$

where $C_1(g_i)$ is a first component of the cost function C.

In some implementations, estimator 522 can improve the results by giving less importance to the main stereo microphones, as the main stereo microphones may be much less discriminative than spot microphones. Estimator 522 can apply a set of weights each respectively for every microphone $w_m$, such that $w_m = w_{main} < 1$, for main signals $w_m = 1$, otherwise, (36)

and hence:

$$C_1(g_i) = \frac{1}{M} \sum_m w_m \left[ E_m^{performance} - \sum_i g_i^2 E_{i,m}^{rehearsal} \right]^2. \tag{37}$$

The problem of estimating energy levels may be underdetermined, where there are less microphones than instruments. Indeterminacy may correspond to obtaining the same overall loudness in each microphone by simultaneously boosting the estimation of some instruments while dimming others. To decrease this indeterminacy, in some implementations, estimator 522 can introduce terms that penalize estimating instrument loudnesses that are significantly above those measured in rehearsal. One possible term is defined below.

$$C_2(g_i) = \alpha_2 \sum_i g_i^n, \tag{38}$$

where $C_2(g_i)$ is a second component of the cost function C, $\alpha_2$ and n are parameters for the penalty.

If, for example, $\alpha_2=0.1$, and n=6, then there is basically no penalty if gains are below rehearsal g<1 ⇒$C_2$<0.1, but the penalty becomes 6.4 when the level inferred is 6 dB above rehearsal. When adding this term $C_2$, its scale may be different from $C_1$. Estimator 522 can introduce the scale A as follows:

$$C_2(g_i) = \alpha_2 \Delta \sum_i g_i^n, \tag{39}$$

$$\Delta = \frac{1}{M} \sum_m w_m \left[ E_m^{performance} - \sum_i E_{i,m}^{rehearsal} \right]^2,$$

where $\Delta$ is the average (across microphones) squared difference between the level measured between performance and rehearsal.

Accordingly, estimator 522 can apply the following cost function:

$$C(g_i) = \frac{1}{M} \sum_m w_m \left[ E_m^{performance} - \sum_i g_i^2 E_{i,m}^{rehearsal} \right]^2 + \alpha_2 \Delta \sum_i g_i^n. \tag{40}$$

In some implementations, estimator 522 can make the measurements in dB. Measuring everything in dB may provide better performance when estimating low levels.

$$C(g_i) = \frac{1}{M} \sum_m \left( dB \left[ E_m^{performance} \sum_i g_i^2 E_{i,m}^{rehearsal} \right] \right)^2 + \alpha_2 \Delta \sum_i g_i^n, \tag{41}$$

$$\Delta = \frac{1}{M} \sum_m w_m \left( dB \left[ E_m^{performance} \sum_i E_{i,m}^{rehearsal} \right] \right)^2,$$

where $dB[\cdot]=10\log_{10}[\cdot]$. Example values for the parameters are: $\alpha_2=0.001$, $n=4$, $w_{main}=0.2$. In some implementations, estimator 522 can ignore all the 1/M factors above when minimizing the cost function.

In some implementations, estimator 522 can apply an initial filtering stage before minimisation of the cost functions. In the initial stage, estimator 522 can use the degree of dedication D (i) of a sound source i to determine sound sources for which a given channel signal has small leakage from other instruments. For example, estimator 522 can determine if the degree of dedication D (i) of a sound source i is above a given threshold. For each such sound source, estimator 522 can obtain the corresponding gain by restricting the above cost functions to only include the corresponding dedicated channel signal. For example, if estimator 522 determines that a pair of $(\hat{i}, \hat{m})$ for instrument $\hat{i}$ and dedicated microphone $\hat{m}$ satisfies a threshold, then estimator 522 can determine the gain $g_{\hat{i}}$ by minimizing a reduced cost function. In the case where estimator 522 chooses the cost function in Equation (40), the reduced cost function would be Equation (40.1) below.

$$C_1(g_{\hat{i}}) = [E_{\hat{m}}^{performance} - g_{\hat{i}}^2 E_{\hat{i},\hat{m}}^{rehearsal}]^2. \tag{40.1}$$

Equation (40.1) allows estimator 522 to perform minimization using Equation (40.2) below.

$$g_{\hat{i}}^2 \frac{E_{\hat{m}}^{performance}}{E_{\hat{i},\hat{m}}^{rehearsal}}. \tag{40.2}$$

Estimator 522 can use other cost functions described above by applying simplification that is similar to the operations described in reference to Equations (40.1) and (40.2) to include only one pair of signal source—dedicated microphone at a time, and to determine each of the gains of the pairs.

Upon determining these gains in the initial filtering stage, estimator 522 reduces the problem of minimizing the cost function to determining only the gains of instruments that do not have dedicated channel signals. Estimator 522 can fix these gains to those found in the initial filtering stage. Estimator 522 can then minimize the cost functions with respect to the remaining gains.

Inference of Instrument RMS in Frequency Bands

Figure 12:
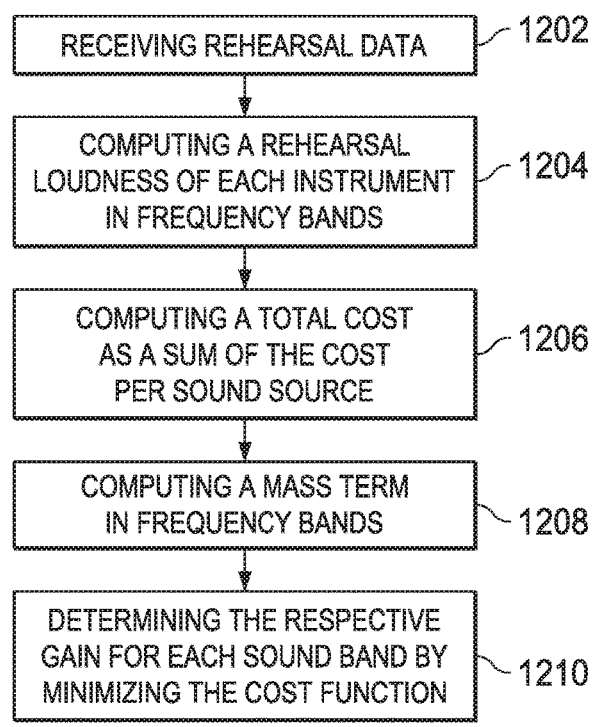
FIG. 12 is a flowchart illustrating an example process of inferring energy levels in frequency bands.

Inferring signal RMS using estimator 522 as described above can be extended in a frequency-dependent way, to improve estimation in cases where different instruments contribute to different parts of the overall frequency spectrum. FIG. 12 is a flowchart illustrating an example process 1200 of inferring energy levels in a frequency band. Estimator 522 can perform the operations of process 1200.

Estimator 522 can receive (1202) reference audio data. The reference audio data can include audio signals recorded from a rehearsal, where sound sources and microphones are placed in a same arrangement as an arrangement during a live performance.

In a first stage, estimator 522 can compute (1204) a respective rehearsal loudness of each sound source in frequency bands $E_{i,m,f}^{rehearsal}$, where the frequency bands can be octave bands centered on frequencies $f=\{32,65,125,250,500,1000,2000,4000,8000\}$, obtained with standard filters following the ANSI (American National Standard Institute) specification.

In a next stage, estimator 522 can compute (1206) a total cost as a sum of the cost per sound source using a cost function as follows:

$$C_1(g_i) = \frac{1}{M}\sum_m w_m \sum_f \left[E_{m,f}^{performance} - \sum_i g_i^2 E_{i,m,f}^{rehearsal}\right]^2, \tag{42}$$

where $C_1(g_i)$ is a first component of the cost function across microphones and frequency bands.

Estimator 522 can compute (1208) a mass term in frequency bands:

$$C_2(g_i) = \alpha_2 \Delta \sum_i g_i^n, \tag{43}$$

$$\Delta = \frac{1}{M}\sum_m w_m \sum_f \left[E_{m,f}^{performance} - \sum_i E_{i,m,f}^{rehearsal}\right]^2,$$

where $C_2(g_i)$ is a second component of the cost function across microphones and frequency bands.

Estimator 522 determines (1210) respective gains in the frequency bands by minimizing the costs. Estimator 522 can provide the gains to a processor for processing live data of event 100. For example, estimator 522 can provide the gains to video editor 530 for identifying a sound source that plays above levels of other sound sources to allow video editor 530 to focus or zoom in on that sound source.

In some implementations, estimator 522 can bias towards estimating that an instrument is either on or off. This can be done by modifying the second term in Equation (43) so that it has minima at g=0,1. For example, estimator 522 can apply the function $f$ to $g_i$:

$$f(x) = \frac{4p}{27a^6}x^2(x^2-a^2)^2. \tag{44}$$

Here, p is a control value, a is the desired point at which the term has a minimum value. Here, a=1.

This function is symmetric under $x \leftrightarrow -x$, in that the only minima are at x=0, x=±a, and that it only has maxima at $$x = \frac{a}{\sqrt{3}},$$

where $f=p$. Accordingly, estimator 522 can use the value of p to control the value at the maxima (hence, the size of the wall between the minima at x=0, a). More generically, $$f(x) = \frac{4p}{427a^{6n}}x^{2n}(x^{2n}-a^{2n})^2, \tag{45}$$

has the same properties, only that now the maximum is at $x=3^{-2n}$ a. The second term in the cost function becomes:

$$C_2(g_i) = \alpha_2 \Delta \sum_i f(g_i). \tag{46}$$

Example settings of the parameters in equation (45) are a=1, n=1, p=5.

In some implementations, estimator 522 can implement the following function.

$$f(x) = p \frac{x^{2n}(x^{2m} - a^{2m})^2}{a^{4m+2n}\left(\frac{n}{2m+n}\right)^{n/m}\left(\frac{2m}{2m+n}\right)^2},  \quad (47)$$

where m, and n are control values. Example settings of the parameters in equation (45) are n=1.2, m=1e−5, a=1.

In some implementations, estimator 522 can implement a 6th order polynomial, symmetric under x-parity, which hits the points (0,0), $(x_p, y_p)$, $(x_a, 0)$, $(x_1, y_1)$:

$$f(x) = \frac{x^2(x^2 - x_a^2)}{x_l^2 - x_p^2}\left[\frac{y_p(x^2 - x_l^2)}{x_p^2(x_a^2 - x_p^2)} + \frac{y_l(x^2 - x_a^2)}{x_l^2(x_l^2 - x_a^2)}\right]. \quad (48)$$

Automated EQ in Loudness Domain

Figure 13:
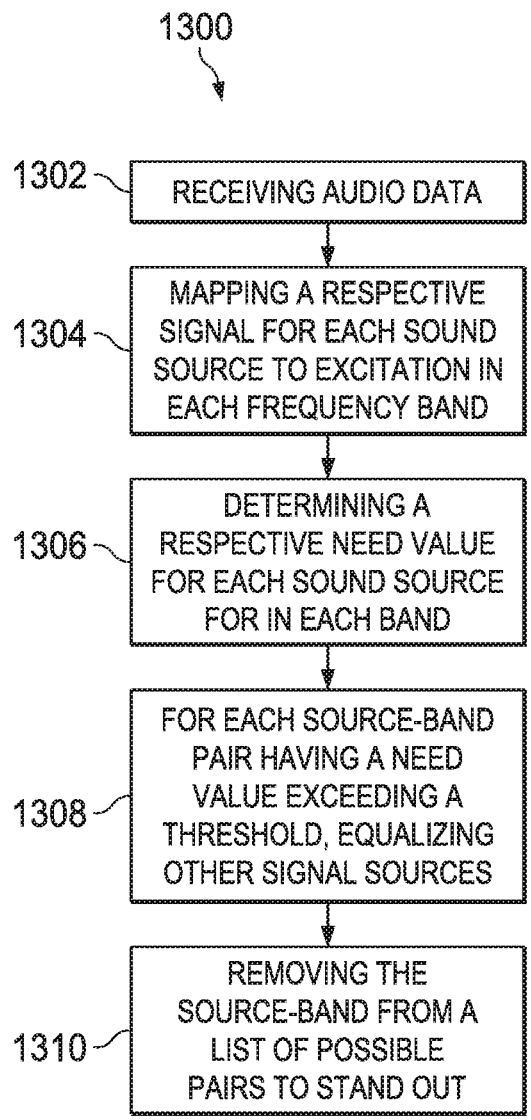
FIG. 13 is a flowchart illustrating an example process of automatically equalizing individual sound sources.

FIG. 13 is a flowchart illustrating an example process 1300 of automatically equalizing individual sound sources. Process 1300 can be performed by, for example, sound source equalizer 710 of FIG. 7. Sound source equalizer 710 is configured to apply equalization (EQ) at the level of individual sound sources (as opposite to the overall stereo mix) for the particular purpose of cleaning, emphasizing, or deemphasizing instruments in an automated manner.

Sound source equalizer 710 can receive (1302) audio data. The audio data can be live audio data of event 100 or rehearsal data. The audio data can include channel signals from sound sources.

Sound source equalizer 710 can map (1304) a respective signal for each sound source to an excitation in each frequency band. Sound source equalizer 710 can sum up sounds from different sources in the excitation space, and sum up the effect from different frequency bands in the loudness space.

Sound source equalizer 710 then automatically equalizes one or more sound sources. Sound source equalizer 710 can generate a list of source-band pairs that maps each sound source with each band. Sound source equalizer 710 can determine (1306) a respective need value for each source-band pair in the list. The need value can indicate a relative importance of the sound source represented in the pair being equalized in the frequency band in the pair relative to other sound sources and other frequency bands. The need value can be a product of a value of the relative importance and a masking level of the source by other sound sources, or any mathematically-representable relation that verifies that the need increases or decreases when either relative importance or masking level are increased or decreased, respectively.

Sound source equalizer 710 can compare the need value to a threshold. If all need values are below the threshold, sound source equalizer 710 can terminate process 1300.

Upon determining that a need value of a source-band pair exceeds the threshold, sound source equalizer 710 can equalize (1308) for the sound source represented in the pair to stand out the source-band pair. The equalizing can include, for example, lowering other sound sources in the frequency band.

Sound source equalizer 710 can remove (1310) the source-band from a list of possible pairs to stand out, and go back to stage 1306.

Sound source equalizer 710 can apply process 1300 to the reference audio data only. Sound source equalizer 710 can then use a fixed setting for event 100. Alternatively or additionally, sound source equalizer 710 can run these operations and features adaptively during the live event 100, optionally after using the reference audio data as a seed.

Sound source equalizer 710 can use the index $i \in \{1, \ldots, N_i\}$ to represent sound sources (e.g. i=1 is the bass, etc). In some scenarios, all instruments to mix are well separated. Sound source equalizer 710 can map from each instrument signal $s_i$ to the excitation in each frequency band b:

$$s_i \to E(i,b), \quad (49)$$

where E(i,b) is the excitation for sound source i in band b. Frequency band b can be an ERB (equivalent rectangular bandwidth) frequency band.

This map can be represented in Glasberg-Moore loudness models. By performing this mapping, sound source equalizer 710 considers the effect of the head for frontal incidence (or alternatively, in diffuse field), and the inverse filter of the threshold-in quiet. Similarly, sound source equalizer 710 can map from excitation space to specific loudness L[E(i,b)]:

$$s_i \to E(i,b) \to L[E(i,b)], \quad (50)$$

which models the compression applied by the basilar membrane. An example of such function is $L = \alpha(E+1)^{0.2}$ above 1 KHz. The term "specific loudness" can denote loudness per frequency band, and "loudness" can denote the sum over all frequency bands. The dependence on b as shown in the equations indicates specific loudness. Independence from b indicates the sum.

Sound source equalizer 710 can sum up sounds from different sources in excitation space, and sum up the effect from different bands in loudness space:

$$E_{sources}(b) = \sum_i^{sources} E(i, b), \quad L_{all\text{-}bands}(i) = \sum_b^{bands} L(i, b). \quad (51)$$

where $E_{sources}(b)$ is excitation of all sound sources in band b, and $L_{all\text{-}bands}(i)$ is loudness of sound source i in all frequency bands.

An important quantity is the partial loudness of a signal in the presence of noise (or in the presence of a few other signals). Sound source equalizer 710 can split all sound sources into one designated as signal pL with index i, and all others, with indices i:

$$pL(i, b) = L\left[E(i, b) + \sum_{i'} E(i', b)\right] - L\left[\sum_{i'} E(i', b)\right]. \quad (52)$$

The maximum value it can have is, precisely, the loudness of that sound source i, pL(i,b)=L(i,b), where L(i,b) is loudness of sound source i in band b. This value occurs when there is no masking at all between sound sources, and so, the compressor acts separately: L(ΣE)=ΣL(E). Masking can decrease this value.

Sound source equalizer 710 then automatically equalizes some sound sources. In some implementations, the equalization can avoid masking of some sound sources by others.

Sound source equalizer 710 therefore assumes that an initial pre-mix stage has tuned all sound sources so that they sound with a given target loudness. For example, all sound sources can have equal loudness except for lead vocals, which sound source equalizer 710 can leave at 3 dB above all others.

The pre-mix stage may only focus on sound sources separately. However, when all sound sources play at the same time, masking may occur. Sound source equalizer 710 can perform the equalization operations to emphasize some sources, e.g., help some sound sources to stand out. A typical example is bass. When the bass plays together with an organ, or other broadband instruments, sound source equalizer 710 can high-pass those broadband instruments, and leave the bass as more prominent in the low end. Conversely, in an organ solo audio event, sound source equalizer 710 does not apply equalization for this reason. Hence, this problem is an across-instruments problem.

One way for sound source equalizer 710 to proceed is to detect which sound source, or which band of which sound source, has a greater need to by equalized. Sound source equalizer 710 can designate this quantity as Need(i,b), for instrument i and band b. This need can depend on the following factors: i) how important is that frequency band to the sound source; and ii) how masked is that sound source by all other sound sources. Sound source equalizer 710 can use I(i,b),M(i,b) to quantify degrees of importance and masking, respectively.

The importance of an instrument's frequency band depends only on that instrument (unlike masking). For example, the low-end bands of the bass can be important to the bass. By comparison, the low-end bands of an organ may not be as important, as the organ extends much more in frequency. Sound source equalizer 710 can measure importance, which is bounded to [0,1] as follows:

$$I(i, b) = \frac{L(i, b)}{\sum_b L(i, b)}. \quad (53)$$

where I(i,b) represents a level of importance of instrument i being equalized in frequency band b.

To measure masking by all other instruments, sound source equalizer 710 can designate all other sound sources as noise. Sound source equalizer 710 can use partial loudness for the others. To obtain an indicator bounded to [0,1]:

$$M(i, b) = 1 - \frac{pL(i, b)}{L(i, b)} \quad (54)$$

$$= \frac{L[E(i, b)] + L\left[\sum_{i'} E(i', b)\right] - L[E_{total}]}{L[E(i, b)]},$$

where M(i,b) represents a level of masking of instrument i by other instruments in frequency band b.

Accordingly, sound source equalizer 710 can implement the need function as follows:

$$\text{Need}(i, b) = I(i, b) \times M(i, b) \quad (55)$$

$$= \frac{L(i, b)}{\sum_b L(i, b)} \left[1 - \frac{pL(i, b)}{L(i, b)}\right]$$

-continued $$= \frac{L[E(i, b)] + L\left[\sum_{i'} E(i', b)\right] - L[E_{total}]}{\sum_b L[E(i, b)]},$$

where Need(i,b) is the need value indicating a relative importance of the sound source i being equalized in the frequency band b relative to other sound sources and other frequency bands.

Sound source equalizer 710 can simplify notation for the loudness of all sound sources other than i: L({i'}, b)=L[$\Sigma_i$E(i',b)]. The final implementation can be expressed as follows:

$$\text{Need}(i, b) = \frac{L(i, b) + L(\{i'\}, b) - L_{total}(b)}{\sum_b L(i, b)}. \quad (56)$$

Sound source equalizer 710 can implement the following algorithm to achieve automatic equalization. An improvement is described in the next section. For convenience, the quantity Need(i,b) is simplified as N(i,b).

Step 1: sound source equalizer 710 can find the sound sources and frequency bands with the highest N(i,b). Sound source equalizer 710 can designate this as source-band pair: (î,b̂), for example: (bass, 3rd frequency band). Sound source equalizer 710 can compare this highest N(i,b) to a threshold t∈[0,1]. If N(i,b)>t, continue to step 2, otherwise, stop (no need to equalizing anything else).

Figure 14A:
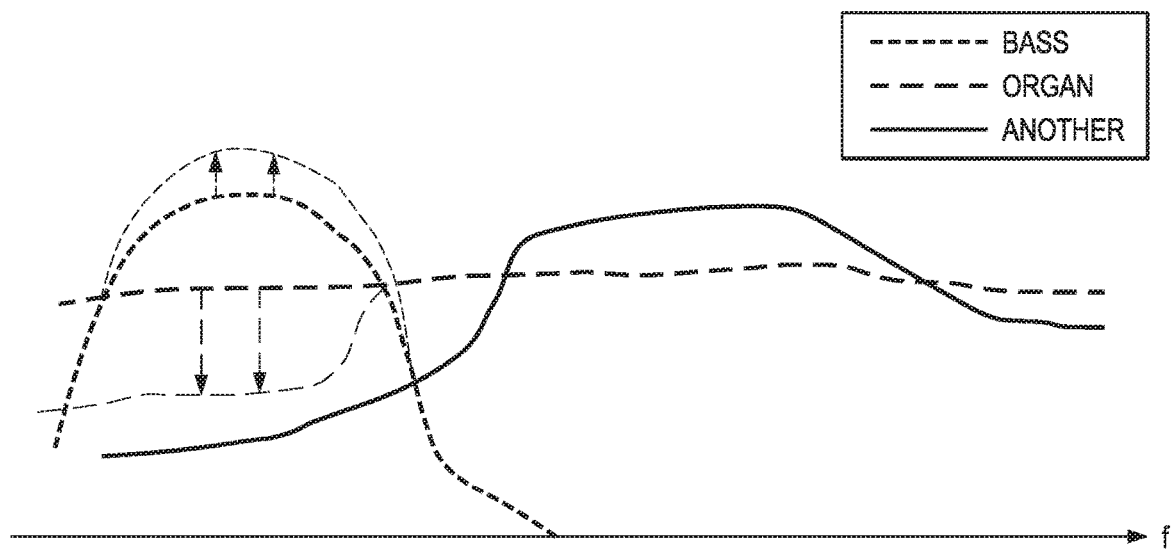
FIG. 14A is a diagram representing an example three-instrument mix to be equalized.
Figure 14B:
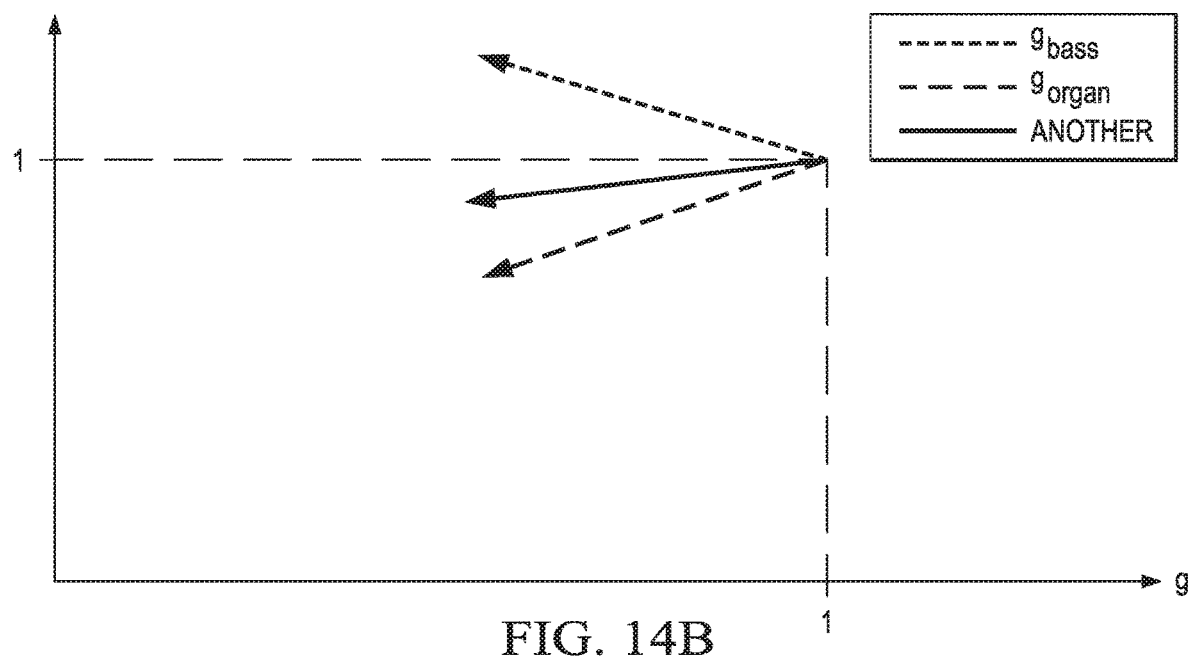
FIG. 14B is a diagram illustrating example gains in automatic equalization.

Step 2: sound source equalizer 710 can equalize the rest of instruments to stand out the selected pair. Sound source equalizer 710 can use i' to denote all sound sources other than î. Sound source equalizer 710 can share responsibility among each sound source i', in a manner that is proportional to the masking they cause on î. The way to do it is by defining a gain reduction to each instrument's band:

$$g(i', \hat{b}) = 1 - (1-g)M(i' \to \hat{i}, \hat{b}), g \leq 1., \quad (57)$$

where g is the only unknown to be fixed by requiring to stand out enough. The behaviour of the gains of each instrument as a function of g is shown in FIGS. 14A and 14B.

All gains are 1 if g=1, and each source-band pair reduces its excitation proportional to how much they mask î. The masking that i' causes on î is obtained from the same equation (54), but considering i' as noise and î as signal:

$$M(i' \to \hat{i}, b) = 1 - \frac{pL(i' \to \hat{i}, b)}{L(\hat{i}, b)} \quad (58)$$

$$= \frac{L[E(\hat{i}, b)] + L[E(i', b)] - L[E(\hat{i}, b) + E(i', b)]}{L[E(\hat{i}, b)]}.,$$

where M (i' →î, b) represents a degree of making that sound source i' causes on sound source î in frequency band b.

At the same time, sound source equalizer 710 can also boost the selected instrument-band î,b̂:

$$g(\hat{i}, \hat{b}) = 1 + (1-g)\alpha, g \leq 1, \alpha > 0, \quad (59)$$

where α is a parameter that controls how much relative boost we provide to (î,b̂) with respect to how much sound source equalizer 710 attenuates all other (i', b̂). For example, if α=0, sound source equalizer 710 never boosts. If α=1, sound source equalizer 710 boosts as much as sound source equalizer 710 attenuates the rest.

Finally, sound source equalizer 710 solves for g by defining a target masking level for that source-band pair, so that it is unmasked enough M $(\hat{i}, \hat{b})<M_{threshold}$, where $M_{threshold}$ is a masking threshold. This is an implementation represented by an equation for one unknown (g). Equation (54) shows that the equation is non-linear. Sound source equalizer 710 can solve for g by decreasing g in discrete steps, for example, of a fraction of dBs, until the bound is satisfied. Sound source equalizer 710 can invert the gain-to-loudness map, and hence, going back from loudness domain to linear domain.

In this context sound source equalizer 710 can impose a maximum level of tolerable equalization, by setting a minimum value of g allowed, or, to have better control, by directly bounding the allowed values of g $(\hat{i}, \hat{b})$ and g(i', $\hat{b}$).

Step 3: Sound source equalizer 710 can remove the pair $(\hat{i},\hat{b})$ from the list of possible pairs to stand out. Go back to step 1.

The algorithm described above selects a candidate pair $(\hat{i}, \hat{b})$ only by examining the pair that has maximum need. The algorithm does not guarantee that the benefit is global across all instruments. A global approach, is to mimic spatial coding: find the pair which, upon enhancement, minimises the global need; then iterate.

For example, sound source equalizer 710 can define the global need of the mix to be equalized as:

$$\text{Need(global)} = \frac{1}{N_i N_b} \sum_{i,b} \text{Need}(i, b). \quad (60)$$

Here, Need(global) is the global need.

Sound source equalizer 710 then performs the following operations. First, sound source equalizer 710 can compute the initial global need Need(global). Second, sound source equalizer 710 then takes all possible pairs (i,b), or selects a number of pairs with higher N(i,b) (e.g., 10 pairs). For each pair, sound source equalizer 710 designates it as a candidate to be enhanced, and run the previous algorithm to find the gains g(i,b) to be applied to boost it and attenuate the others. For each pair thus considered, sound source equalizer 710 can re-compute a new global need. Third, sound source equalizer 710 selects the pair that minimizes the global need and apply its enhancement gains. Sound source equalizer 710 then replaces Need(global) by its new value and go back to first step.

Sound source equalizer 710 can terminate the iterations above if either of the following happens. 1. Need(global) is already below a given threshold; 2. No choice of (i,b) has led to a decrease in Need(global); or 3. Sound source equalizer 710 has iterated more than a given maximum number of times.

FIG. 14A is a diagram representing a three-instrument mix to be equalized. The horizontal axis represents frequency $f$. The three-instrument mix includes a bass, an organ, and other instruments. The vertical axis represents energy. As shown, energy of the bass is concentrated in lower ERB bands. Accordingly, Sound source equalizer 710 can determine that, compared to the organ and other instruments, the bass a higher need for equalization in the lower ERB bands.

FIG. 14B is a diagram illustrating gains in automatic equalization. Starting decreasing from g=1, we increase gain of the bass in the lower ERB bands, while attenuating all other instruments in the lower ERB bands. The organ masks the bass more than the "another" instrument, and hence, the organ is more attenuated.

Segmentation Based on Novelty

Figure 15:
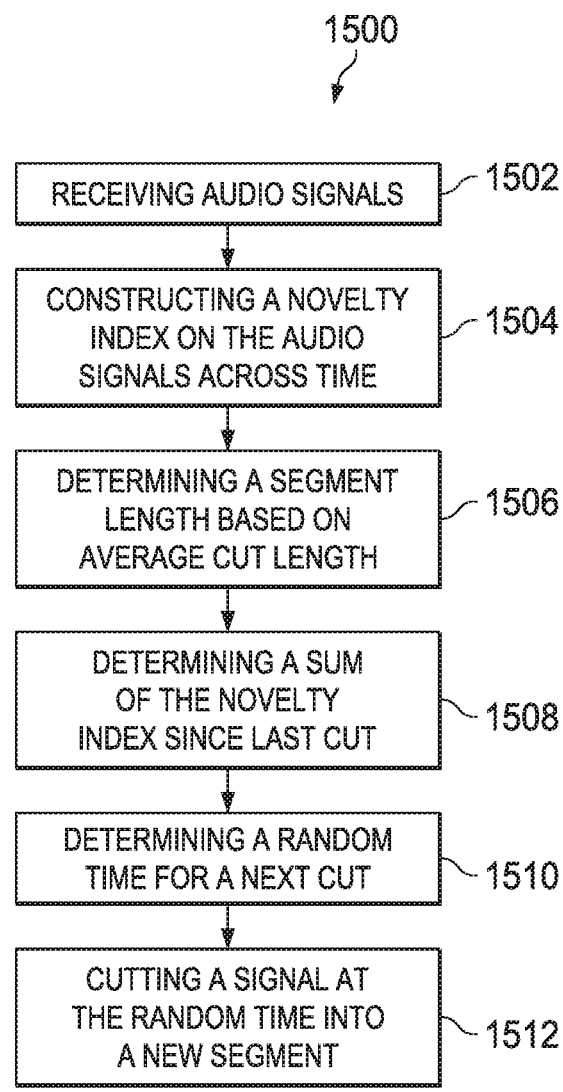
FIG. 15 is a flowchart illustrating an example process of segmenting video based on novelty buildup in audio data.

FIG. 15 is a flowchart illustrating an example process 1500 of segmenting video based on novelty buildup in audio data. Process 1500 can be performed by segmenting unit 714 of FIG. 7. In some implementations, segmenting unit 714 can be implemented by video editor 530 of FIG. 5.

Segmenting unit 714 can receive (1502) audio signals. Segmenting unit 714 can construct (1504) a novelty index on the audio signals across time. Segmenting unit 714 can determine a peak of the audio signals that is above a threshold value. Segmenting unit 714 can determine (1506) a segment length based on average cut length. The cut length can be an input, a preset value, or derived from past cuts (e.g., by averaging past X cuts). Segmenting unit 714 can determine (1508) a sum of the novelty index since a last cut. The sum can be an integral of the novelty index over time.

Upon determining that the sum is above a novelty threshold, segmenting unit 714 can determine (1510) a random time for a next cut, where randomness of the time to next cut averages to the average segment length. Segmenting unit 714 can cut (1512) the audio signal, or a corresponding video signal that is synchronized with the audio signal, at the random time into a new segment, and begin to sum the novelty index for the next cut. Segmenting unit 714 can provide the new segment to user devices for streaming or for download, and for playing on a loudspeaker. Additional details and examples of process 1500 are described below.

Video editing can be based on novelty, which can indicate a point where audio or video changes significantly. Segmenting unit 714 can build an index measuring novelty, referred to as a novelty index. Segmenting unit 714 can build the novelty index by comparing a set of extracted features across different segments of an audio recording. Segmenting unit 714 can build a similarity index, and convolves it with a checker-board kernel to extract novelty.

Segmenting unit 714 can compute the novelty index across time. Segmenting unit 714 can first select peaks that are above a certain threshold. The size of the segments used to extract features can determine a scale at which novelty operates. Short segments allow to discriminate individual notes. Long segments allow to discriminate coarser concepts, e.g., an introduction from a chorus. The threshold for a segment to be considered novel can affect the frequency of cuts, and hence, it can be set as a function of the desired average cut length, which can in turn be set as a function of tempo. Accordingly, segmenting unit 714 can perform the operations as follows:

retrieve tempo→set avg cut length→set threshold.

Segmenting unit 714 can properly handle sections of songs with crescendos. These are characterised by a prolonged smooth increase of the novelty index, that does not lead to prominent peaks, and therefore, it leads to absence of cuts for very long times. Segmenting unit 714 can include a buildup processing module that quantifies the need to have a cut over sustained periods, independent from the fact that peaks may occur. Segmenting unit 714 can characterize this need to the integral of the novelty index since the last cut $t_{last}$:

$$N(t)=\int_{t_{last}}^{t} \text{novelty}(t)dt, \quad (61)$$

where N(t) is the need, novelty(t) is the novelty index at time t.

Upon determining that N(t) is above a threshold $N_{thr}$, segmenting unit 714 starts random drawings with the probability tuned so that there will be, on average, a cut during the next T seconds. Segmenting unit 714 can assign $N_{thr}$ to a value that is considered as large need, e.g., a sustained value of novelty=0.6 during at least 3 seconds. Likewise, the value of T can be linked to the required average cut length, as described above.

FIG. 16 is a diagram illustrating example novelty buildup processing. Novelty buildup processing effects on a song with crescendo are shown in FIG. 16. X-axis represents time in seconds. Y-axis represents value of the integral. There is a long crescendo between second 150 and second 180, as shown by the curve 1602. Curve 1602 shows an integral of novelty without buildup postprocessing. No events would be detected in this segment if only peaks of the index were used. Curve 1604 shows the integral after buildup postprocessing, revealing both the presence of new cuts, as well as the controlled randomness in their appearance. The appearance can be based on a hard threshold, or preferrably, on a probability.

Synchronizing

Figure 17:
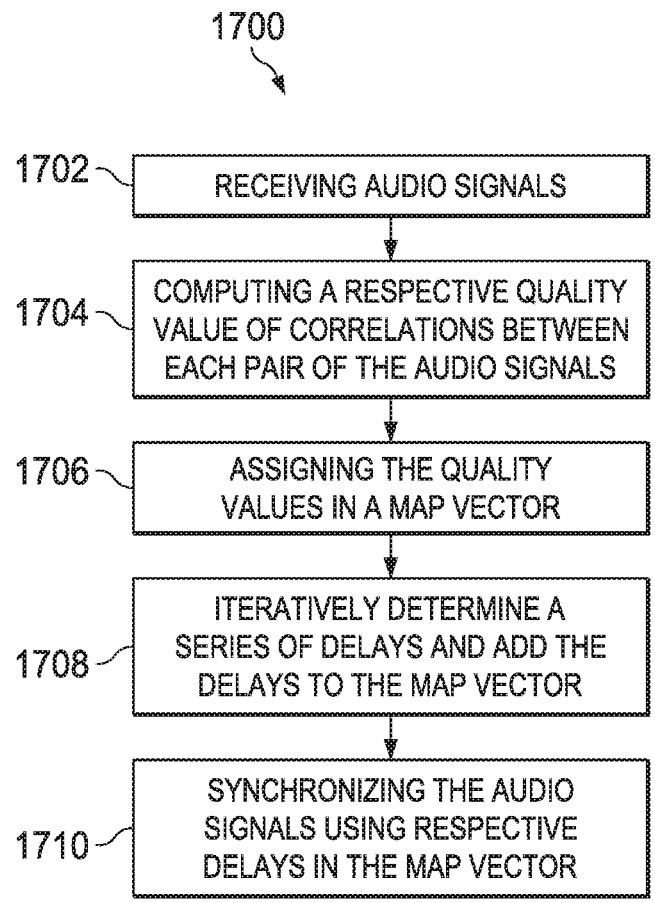
FIG. 17 is a flowchart of an example process of synchronizing signals from multiple microphones.

FIG. 17 illustrates example process 1700 of synchronizing audio signals from multiple microphones. Process 1700 can be performed by synchronizer 502 of FIG. 5. Synchronizer 502 performing process 1700 improves upon conventional synchronization technology in that synchronizer can synchronize audio signals based only on the audio signals.

Synchronizer 502 can synchronize microphones used in and audio scene just by analysing the audio. In some implementations, synchronizer 502 can synchronize all microphones to main stereo channels using various correlation determination techniques, e.g., a cross-correlation algorithm.

Synchronizer 502 can receive (1702) audio signals. The audio signals can be channel signals from microphones. Synchronizer 502 can compute (1704) a respective quality value of correlations between each pair of the audio signals. Synchronizer 502 can assign (1706) the quality values in a map vector.

Synchronizer 502 can iteratively determine a series of delays and insert the delays into the map vector (1708) as follows. Synchronizer 502 can identify a pair of signals in the map vector that has the highest quality value. Synchronizer 502 can align the audio signals in the pair and downmix the pair to a mono signal, and append a delay of the alignment to the map vector. Synchronizer 502 can replace a first audio signal in the pair with the downmixed mono signal, and remove a second audio signal from a list of indices for maxima. Synchronizer 502 can keep the downmixed mono signal fixed and recompute the quality values. Synchronizer 502 can re-iterate from the identifying stage until only one signal is left.

Upon finishing the iterations, synchronizer 502 can synchronize (1710) the audio signals using the respective delays in the map vector according to the order of the delays inserted into the map vector. Synchronizer 502 can then submit the synchronized signals to other components (e.g., source separator 504 of FIG. 5) for additional processing and streaming. Additional details and examples of process 1700 are described below.

In some implementations, synchronizer 502 executes an algorithm that synchronizes globally, giving more importance to delays computed from cross-correlations with strong peaks. Synchronizer 502 can label m=1, . . . , M the set of microphones at the scene. If one of the microphones is stereo, it has previously been polarity-checked and downmixed to mono. Synchronizer 502 can determine their correlations over time $C_{m,m'}(t)$ as follows:

$$C_{m,m'}(t) = \frac{F^{-1}\{F(s_m)F^*(s_{m'})\}(t)}{|s_m||s_{m'}|}, \qquad (62)$$

where $s_m$ represents signals from microphone m, $|s|=\sqrt{\Sigma_t s(t)^2}$. For t=0, this coincides with the normalized correlations used above in equation (3).

For each pair, synchronizer 502 can obtain the values of $t_{max}$, $t_{min}$ that respectively lead to higher and lower correlations, $C_{m,m'}^{max/min}$. A figure of merit describing how good a correlation is (or quality Q of the correlation) will be:

$$Q_{m,m'} = C_{m,m'}^{max} \times [C_{m,m'}^{max} - |C_{m,m'}^{min}|], \qquad (63)$$

where Q can be negative if the minimum is stronger than the max. This will not affect the result as synchronizer 502 can seek the maximum values of Q.

Synchronizer 502 can execute a recursive algorithm as follows. First, synchronizer 502 can initialize an empty map vector Map, that will have (M−1) entries. Synchronizer 502 will only consider the upper diagonal of Q (due to its symmetry), and hence, $Q_{m_1,m_2}$ with $m_1 < m_2$.
1. Find the pair $m_1$, $m_2$ that has largest $Q_{m_1, m_2}$.
2. Align $s_{m_2}$ to $s_{m_1}$ and downmix to mono. Append $(t_{m_1,m_2})$ to Map.
3. Replace $s_{m_1}$ with this downmix. Remove $m_2$ from list of indices to scan for maxima of Q.
4. Re-compute all $Q_{m,m_1}$ for all m, and with $m_1$ fixed.
5. Repeat first step until only 1 microphone is left.

Synchronizer 502 is left with a set of M−1 delays $t_{m,m'}$, where the second index appears only once for every microphone except for the first one (which is typically the downmix of the main stereo). To reconstruct the delay needed for a microphone m to be in synchronization with, for example, the first microphone, synchronizer 502 can follow the chain that leads to the first mic:

$$t_m = t_{m',m} + t_{m'',m'} + \ldots + t_{1,m'''}. \qquad (64)$$

In some implementations, synchronizer 502 can improve speed of the computation by avoiding recomputing all correlations after each downmix to mono. Assuming synchronizer 502 is already computed, in a 1st stage, all $C_{m,m'}$, which means synchronizer 502 computed all $C_{m,m'}(T) = \langle s_m(t) s_{m'}(t+T) \rangle$. After aligning m' to m, and downmixing, synchronizer 502 can get a new signal (check sign of $t_{m,m'}$):

$$s_{\tilde{m}}(t) = s_m(t) + s_{m'}(t + t_{m,m'}). \qquad (65)$$

To compute the new correlations wrt $s_{\tilde{m}}$:

$$C_{n,\tilde{m}} = \frac{\langle s_n(t) s_{\tilde{m}}(t+T) \rangle}{|s_n||s_{\tilde{m}}|} = \frac{\langle s_n(t) s_m(t+T) \rangle + \langle s_n(t) s_{m'}(t + t_{m,m'} + T) \rangle}{|s_n||s_m + s_{m'}|} \qquad (66)$$

The numerator has two terms. Synchronizer 502 can derive the first one from $C_{n,m}$. Synchronizer 502 can derive the second one from a circular shift by $t_{m,m'}$ units of the term known from $C_{n,m'}$. The denominator has two terms too. Synchronizer 502 can derive the second one from $|s_m|$ and $|s_{m'}|$, and their correlation:

$$|s_m + s_{m'}|^2 = |s_m|^2 + |s_{m'}|^2 + 2 C_{m,m'}^{max} |s_m||s_{m'}|. \qquad (67)$$

Accordingly, synchronizer 502 only needs to compute the initial correlation matrices.

Noise Reduction

Figure 24:
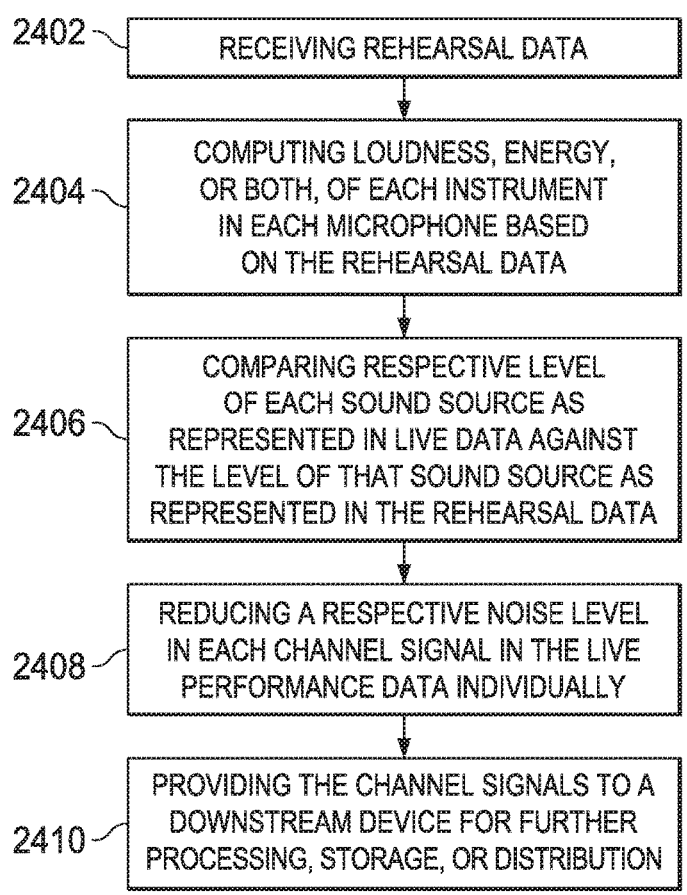
FIG. 24 is a flowchart illustrating example process 2400 of noise reduction.

FIG. 24 is a flowchart illustrating example process 2400 of noise reduction. Process 2400 can be performed by noise reduction unit 711 of FIG. 7. Noise reduction unit 711 can apply noise reduction to each channel signal. The advantages of the disclosed approach include, for example, that by applying various gains to each channel individually, noise reduction unit 711 can reduce noises when a particular channel has an audio level sufficiently high to mask channel signals from other channels. In addition, channel signals can come from different channel signal sources (e.g., microphones having different model, pattern) that may be located at separate points of a venue (e.g., more than two to three meters apart).

Noise reduction unit 711 can receive (2402) reference audio data. The reference audio data including channel signals recorded during a silent period of a rehearsal session. The silent period can be a period (e.g., of X seconds) in which no instrument plays.

Noise reduction unit 711 can include a noise estimator component. The noise estimator can estimate (2404) a respective noise level in each channel signal in the reference audio data. The noise estimator can designate the estimated noise level as a noise floor. Estimating the respective noise level in each channel signal in the reference audio data can be performed over multiple frequency bands, referred to as frequency bins.

Noise reduction unit 711 can receive (2406) live performance data. The live performance data including channel signals recorded during event 100, in which one or more instruments that were silent in the rehearsal session play.

Noise reduction unit 711 can include a noise reducer component. The noise reducer can reduce (2408) a respective noise level in each channel signal in the live performance data individually. The noise reducer can apply a respective suppression gain in each channel signal in the live performance data upon determining that a difference between a noise level in the channel signal in the live performance data and the estimated noise level satisfies a threshold. Reducing the respective noise level in each channel signal in the live performance data can be performed in each of the frequency bins.

After reducing the noise levels, noise reduction unit 711 can provide (2410) the channel signals to a downstream device for further processing, storage, or distribution to one or more end user devices. The downstream device can be, for example, distribution frontend 508 of FIG. 5 or mastering unit 704 of FIG. 7.

The estiming (2404) and reducing (2408) stages can be performed according to noise reduction parameters including the threshold, a slope, an attack time, a decay time, and an octave size. Example values of the parameters are, that the threshold is 10 dB; the slope is 20 dB per dB; the attack time is the same as decay time, which is 50 milliseconds (ms). Additional details and examples of noise reduction operations are described below.

During the estimating (2404) stage, the noise estimator can perform the following operations on each channel signal in the reference audio data individually. The noise estimator can segment a channel signal in buffers of X samples (e.g., 2049 samples). The buffers can have half length overlap. The noise estimator can apply a square root of a discrete window function (e.g., Hann window) to each buffer. The noise estimator can apply a Discrete Fourier Transform. The noise estimator can compute a noise level using Equation (68) below.

$$n(f) = 10 * \log 10(|\sim|^2), \quad (68)$$

where $n(f)$ is the noise level for a particular frequency bin $f$.

The noise estimator can determine a noise floor by averaging the noise level over the buffers using Equation (69) below.

$$n_{estimate}(f) = <n(f)>_{buffers}, \quad (69)$$

where $n_{estimate}(f)$ is a noise level designated as a noise floor for frequency bin $f$, $<>$ is an average. As a result, the noise estimator can determine a number $n_{estimate}(f)$ for every frequency bin for every channel signal.

During noise reducing (2408) stage, a noise reducer can suppress noise level in each channel signal in live performance data of event 100 by performing the following operations on each channel signal individually. The noise reducer can segment a channel signal in the live performance data in buffers of X samples (e.g., 2049 samples). The buffers can have half length overlap. The noise reducer can apply a square root of a discrete window function (e.g., Hann window) to each buffer. The noise reducer can apply a Discrete Fourier Transform. The noise reducer can compute a noise level $n(f)$ using Equation (68) above.

The noise reducer can compute a difference between the noise level $n(f)$ in the live performance data with the noise floor using Equation (70) below.

$$d(f) = n(f) - n_{estimate}(f), \quad (70)$$

where $d(f)$ is the difference.

The noise reducer can then apply a supression gain to the channel signal in the live performance data in an expander mode. Apply the supression gain in the expander mode can include determining if the difference $d(f)$ is less than a threshold. Upon determining that $d(f)$ is less than the threshold, the noise reducer can apply a gain that suppresses a number of dBs ever dB of difference according to the slope parameter.

The noise reducer can smoothen all suppression gains across frequence bins or on a given bandwidth as specified in the octave size parameter. The noise reducer can smooth all suppression gains over time, using the attack time and decay time parameters. The noise reducer can apply an inverse Discrete Fourier Transform, apply the square root of the discrete window function again. The noise reducer can then overlap and add the results.

Figure 18:
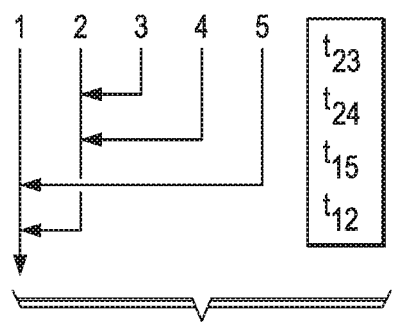
FIG. 18 illustrates an example sequence of synchronizing five microphones.

FIG. 18 illustrates an example sequence of synchronizing five microphones. First, synchronizer 502 aligns signals from microphone 3 to signals from microphone 2. Synchronizer 502 can determine a delay $t_{23}$, and add the delay $t_{23}$ to a list. Synchronizer 502 downmixes the aligned signals to a mono signal. Synchronizer 502 then replaces the signal from microphone 2 with the mono signals. Synchronizer 502 can continue the process by aligning the mono signals with signals from microphone 4, then to align the signals from microphone 1 to microphone 5. Finally, synchronizer 502 aligns signals from microphone 1 with signals from microphone 2. Synchronizer 502 can end up obtaining the list $\{t_{23}, t_{24}, t_{15}, t_{12}\}$. In this case $t_2 = t_{12}$, $t_3 = t_{23} + t_{12}$, $t_4 = t_{24} + t_{12}$, $t_5 = t_{15}$.

Video Editing

Figure 19A:
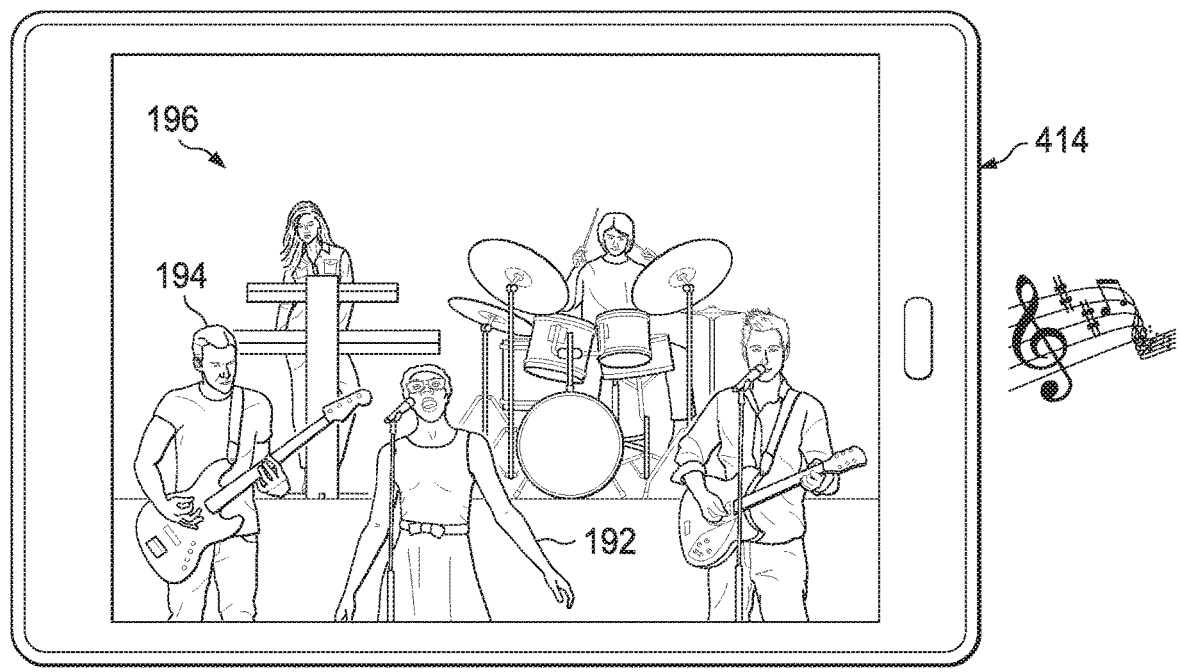
FIGS. 19A and 19B illustrate example user interfaces displaying results of automated video editing.
Figure 19B:
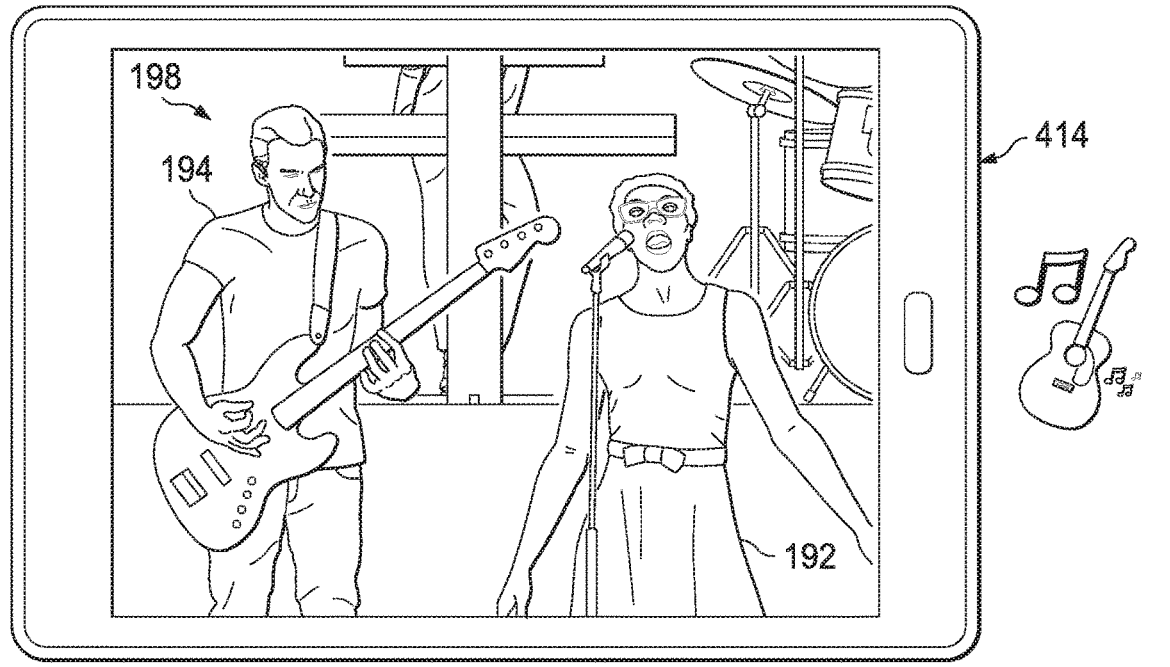

FIGS. 19A and 19B illustrate example user interfaces displaying results of automatic video editing. The user interfaces can be presented on a display surface of a user device, e.g., video device 414. The features described in FIGS. 19A and 19B can be implemented by video editor 530 (of FIG. 5).

FIG. 19A illustrates a user interface displaying a first video scene of event 100 (of FIG. 1). In the example shown, a band plays in event 100. A video camera captures live video of the band playing. Each sound source in the band, e.g., vocalist 192 and guitar 194 and other sound sources, plays at a similar level. Video editor 530 can receive the live video, as well as audio data of the band playing. The live video can include real time video or pre-stored video of event 100. Video editor 530 can determine, from the audio data, that differences between energy (or loudness) levels of each of the sound sources are less than a threshold. In response, video editor 530 can determine that entire video scene 196 of event 100 can be presented. Video editor 530 can then provide entire video scene 196 in the live video for streaming. Video device 414 can receive entire video scene 196, and present the scene for display.

FIG. 19B illustrates a user interface displaying a second video scene of event 100 (of FIG. 1). During the live play as described in reference to FIG. 19A, for a period of time, video editor 530 can determine from audio data that one or more sound sources play at significantly higher level than other instruments. For example, video editor 530 can determine that the loudness levels or energy levels of vocalist 192 and guitar 194 are more than a threshold level higher than loudness levels or energy levels of other instruments. In response, video editor 530 can determine panning angles of the one or more sound sources, and focuses on and zooms into a portion of the video data to obtain partial video scene 198. In the example shown, video editor 520 focuses on and zooms into the location of vocalist 192 and guitar 194. Video editor 530 can then provide partial video scene 198 in the live video that includes vocalist 192 and guitar 194 for streaming. Video device 414 can receive partial video scene 198, which includes vocalist 192 and guitar 194. Video device 414 can present partial video scene 198 for display.

Figure 20:
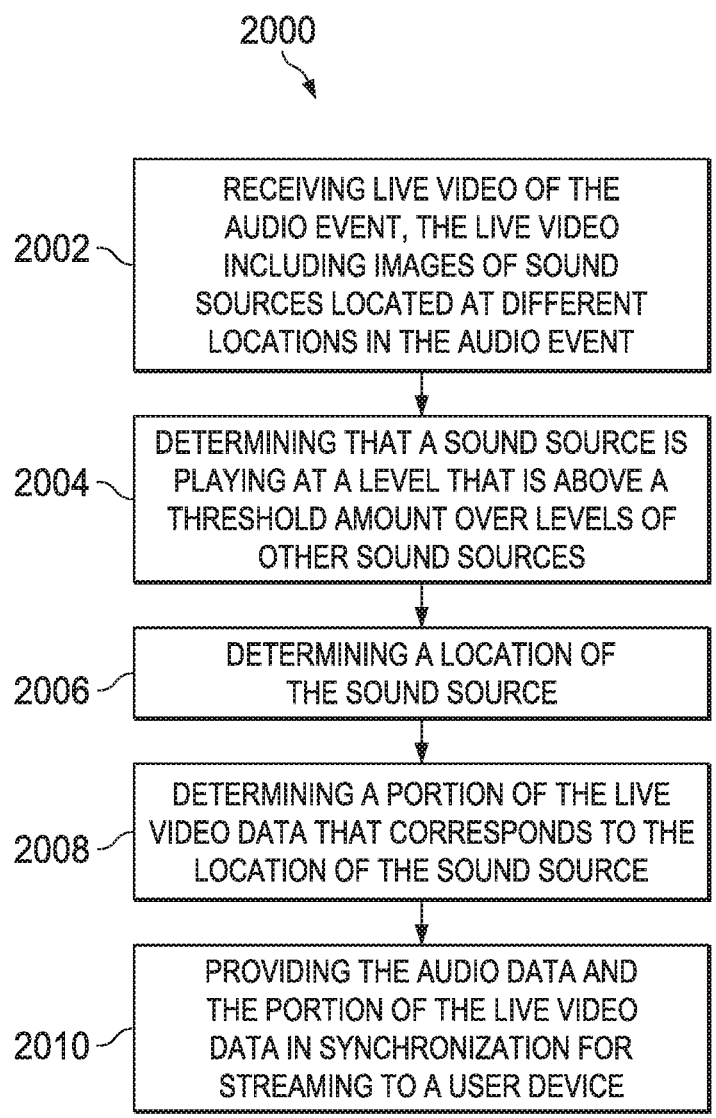
FIG. 20 is a flowchart of an example process of automated video editing.

FIG. 20 is a flowchart of an example process 2000 of automatic video editing. Process 2000 can be performed by video editor 530 (of FIG. 5). Video editor 530 is a component of the server that is configured to receive live video recordings of event 100.

Video editor 530 can receive (2002) video data of event 100 (of FIG. 1) and audio data of event 100. The video data and audio data can be live data. The live data can be real time data or pre-stored data. The video data can include images of sound sources located at different locations in event 100. The audio data can include energy levels or loudness levels of sound sources and panning angles of the sound sources.

Video editor 530 can determine (2004), from the audio data, that a particular sound source is a dominant sound source. For example, video editor 530 can determine that signals of a sound source represented in the audio data indicates that the sound source is playing at a volume level that is above a threshold amount over volume levels of other sound sources represented in the audio data.

Video editor 530 can determine (2006) a location of the sound source in the video data. In some implementations, video editor 530 can determine the location based on panning angles of the sound sources in the audio data. For example, video editor 530 can determine an angular width of the entire scene in the video data, and determine a location that corresponds to an angle in the entire scene that corresponds to the panning angle of the sound source. Video editor 530 can determine a panning position of the sound source based on audio data. Video editor 530 can designate the panning position of the sound source as the location of the sound source in the video data. In some implementations, video editor 530 can determine the location based on the video data, e.g., by using face tracking or instrument tracking.

Video editor 530 can determine (2008) a portion of the live video data that corresponds to the location of the sound source. For example, video editor 530 can zoom in on a portion of the live video data according to the panning angle of the sound source.

Video editor 530 can provide (2010) the audio data and the portion of the live video data in synchronization for streaming to a storage device or to the end user device. As a result, for example, if a vocalist or guitarist is playing solo, live video playing on the end user device can automatically zoom in on the vocalist or guitarist, without interference and control of a camera operator.

In addition, in some implementations, video editor 530 can receive input that identifies locations of various sound sources in event 100. For example, video editor 530 can include, or be coupled to, a client-side application having a user interface. The user interface can receive one or more touch inputs on a still image or video of event 100 inputs, each touch input can associate a location with a sound source. For example, a user can specify "guitar" with a guitar player in the still image or video by touching the guitar player in the still image or video. During rehearsal, the user can specify "guitar" and then record a section of guitar playing. Accordingly, the sound that is labeled as "guitar" can be associated with a location in the still image or video.

While event 100 is ongoing, video editor 530 can receive live video recordings as well as receive, from source separator 504, Ns signals for Ns sound sources. Video editor 530 can identify one or more dominant signals from the multiple signals. For example, video editor 530 can determine a signal from a particular sound source (e.g., a vocalist) is X dB louder than each other signal, where X is a threshold number. In response, video editor 530 can identify a label (e.g., "vocalist") and identify a location of the live video recordings that corresponds to the label. Video editor 530 can focus on that location, e.g., by clipping a portion of the original video recording or zooming into the portion of the original video recording corresponding to the location. For example, if the original video recording is in 4K resolution, the video editor 530 can clip a 720p resolution video corresponding to the location. Video editor 530 can provide the clipped video to distribution frontend 508 for streaming to end user devices.

Rehearsal-Based Video Processing

Figure 25:
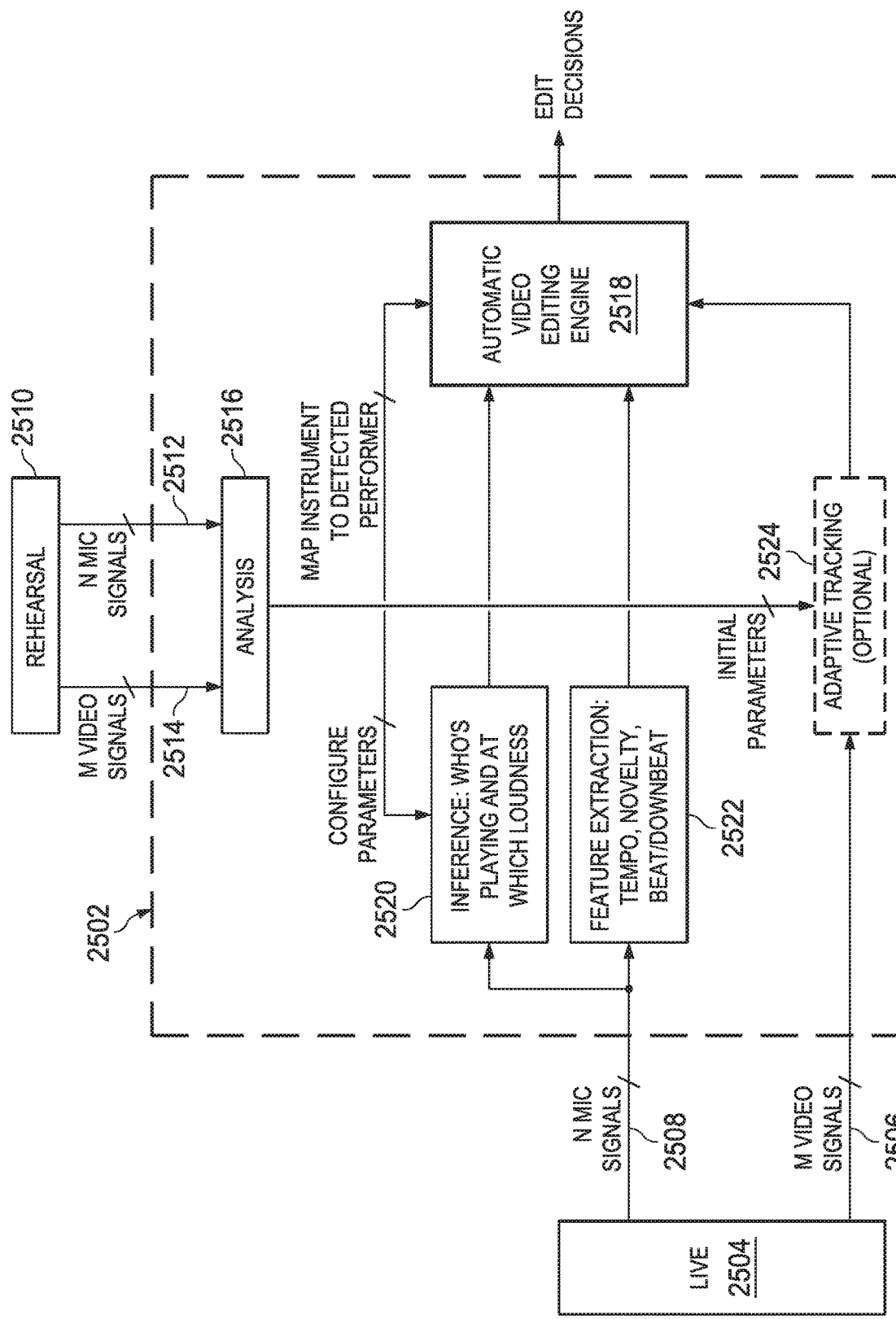
FIG. 25 is a block diagram illustrating example techniques of video editing based on rehearsal data.

FIG. 25 is a block diagram illustrating example techniques of video editing based on rehearsal data. An example server system 2502 is configured to provide editing decisions on live video data based on rehearsal video data. The server system 2502 can include one or more processors.

The server system 2502 is configured to automatically edit live data 2504, e.g., live audio and video of a musical performance or live audio and video of any event, based on rehearsal video data and rehearsal audio data. The live data includes M video signals 2506 of the performance captured by M video capturing devices, e.g., one or more video cameras. The audio data 2508 includes N audio signals from N audio capturing devices, e.g., one or more microphones. The number and positions of the audio capturing devices can be arbitrary. Accordingly, respective input gains of the audio capturing devices may be unknown. Due to arrangement of the audio capturing devices, levels of audio signals may not directly correlate to natural or perceived levels at which the performers are playing.

The server system 2502 can determine approximate values of which performer is playing, and at what level, based on the live data 2504 and rehearsal data 2510. Each performer can be an instrument, a person playing an instrument, a person performing as vocalist, a person operating a device that generates electronic or physical sound signals otherwise. As indicated earlier, the instruments, vocalists and devices are referred to as sound sources. For example, in the live data 2504, a feed corresponding to a first sound source (e.g., a bass) of a first performer can be low compared to a second sound source (e.g., a guitar) of a second performer, even when in the actual performance, the first sound source plays much louder than the second instrument. This discrepancy can be caused by a recording configuration where various input level stages involved in each sound source's chain, as well as physical distances between audio capturing devices and sound sources, can be different.

Conventionally, a human operator (e.g., a sound engineer, cinematographer, or video director) uses knowledge of who is playing and at what level to determine how to edit video. The server system 2502 can derive the knowledge from the rehearsal data 2510, and apply one or more editing rules specifying user preferences, e.g., artistic settings, to perform the editing that simulates the editing of a human operator.

The server system 2502 can determine, in a rehearsal phase and using the rehearsal data 2510, where each performer is located in a camera feed. The server system 2502 then creates a map between sounds of sound sources and the performers, without requiring the performers or the operator to enter the mapping manually.

At the rehearsal phase, a band positions sound sources at various locations on a stage, in a same layout as in a live performance. One or more audio capturing devices and one or more video capturing devices are also positioned at the rehearsal in a same layout as in a live performance. Each audio capturing device can be an air-pressure (air-pressure gradients) microphone, a direct input feed (e.g., from an electronic keyboard), or a device capturing in the digital domain signals produced by digital sound sources (e.g. laptops running music production software). At least one video capturing device is a video camera positioned such that all sound sources and performers in the band can be captured in a single video frame. The server system 2502 can use audio and video recordings of the rehearsal as rehearsal data 2510 to configure parameters for editing live data 2504.

The rehearsal data 2510 includes rehearsal audio data 2512 and rehearsal video data 2514. An analysis module 2516 of the server system 2502 relates a loudness range of an sound source to digital loudness range present in the final digital streams. The analysis module 2516 thus calibrates multiple level stages involved between the capture of the signal and the final digital representation. In some implementations, the analysis module 2516 determines a respective average digital range of each sound source, as captured by each of the audio capturing devices. The average can be a weighted average between the EBU loudness levels between a soft play at low level and a loud play at high level.

The analysis module 2516 can analyze the rehearsal video data 2514 to determine where each performer is located in the video frame. The analysis module 2516 can make this determination using human detection, face detection algorithms, torso detection algorithms, pre-filtering via background subtraction, and any combination of the above and other object recognition algorithms. Some example algorithms include principal component analysis (PCA), linear discriminant analysis (LDA), local binary patterns (LBP), facial trait code (FTC), ensemble voting algorithm (EVA), deep learning networks (DLN), among others.

In some implementations, the analysis module 2516 includes an sound source detector. The sound source detector is configured to analyze the rehearsal audio data 2512 to identify each individual sound source, apply media intelligence to determine what type of sound source it is at low level (e.g., bass, piano, or vocals), high level (e.g., harmonic, percussive) or both. In some implementations, one or more musical instrument recognition (MIR) processes executing in the analysis module 2516 can retrieve global descriptors of an event that, for example, indicate whether the genre of a music piece played is rock, classical, jazz, etc. The analysis module 2516 can provide the sound source type and global descriptors to an automatic video editing engine (AVEE) 2518 for editing live data 2504.

The analysis module 2516 relates each performer detected by the analysis module 2516 with a respective sound of an sound source. For example, the analysis module 2516 can map a face recognized by the analysis module 2516 with a particular sound, e.g., the sound of a guitar. In some implementations, the analysis module 2516 determines the mapping by ordering the sounds and the faces. For example, the rehearsal audio data 2512 can include the sound sources playing in order, e.g., from left to right as seen from video. The analysis module 2516 then relates the left-most face detected with the first sound source that played at the rehearsal. In another example, the data is gathered by direct human input via a customized graphical interface, for example, by showing a still frame of the band as captured by one of the video devices, and prompting the user to tap on each performer to then select which sound sources he plays from a pre-populated menu.

After the band finishes rehearsal, the band my start live performance. The server system 2502 captures live data 2504 the same way as during the rehearsal. The sound sources, e.g., the performers, can be positioned at approximately the same locations in the live performance and in the rehearsal. The audio and video capturing devices are placed at the same positions as in the rehearsal. The server system 2502 feeds the live audio data 2508 into an inference module 2520 and a feature extraction module 2522. The inference module 2520 is configured to determine loudness, at a given moment of time, of each sound source or each group of sound sources. The output of the inference module 2520 can include a sound level of each sound source or group of sound sources, for example, in dBs referencing to the loudness played at during the rehearsal, e.g., X dBs from the low level, from the high level, or from the average. Referencing to the loudness during rehearsal can eliminate ambiguities related to the potentially different level stages used during analog to digital conversion of each sound source.

The feature extraction module 2522 is configured to retrieve time-varying features of the live audio data 2508, for example, by using an MIR algorithm. The feature extraction module 2522 can perform operations including, for example, beat detection, including down-beat detection, computation of novelty index, tempo, harmonicity, among others.

The server system 2502 can feed the live video data 2506 into an adaptive tracking module 2524. The adaptive tracking module 2524 is configured to perform adaptive face tracking, performer tracking or other object tracking. The adaptive tracking module 2524 thus accounts for performers who may leave stage, and hence should not be focused on. The adaptive tracking module 2524 is also configured to track performers that move significantly from original positions, e.g., when a singer walks and dances on stage.

The analysis module 2516, inference module 2520, and feature extraction module 2522 provides output to the AVEE 2518. The AVEE 2518 is a component of the system 2502 configured to perform operations including framing of performers. Conventional face detection algorithms may pinpoint where each person's face is but not how to frame it for zooming and cropping. The AVEE 2518 uses a respective size and a respective location of each face to derive a respective size and respective location of a corresponding sub-frame of the original high definition video frame that provides a focused view of the corresponding performer. A sub-frame can be a lower resolution (e.g., 720p) frame that the AVEE 2518, or a video capturing device, crops from a higher resolution (e.g., 4K) frame. The AVEE 2518 can present the sub-frame as an image of the event. The AVEE 2518 can determine sizes and locations of frames in sized-based, location-based, and prominence-based cut decision making.

In size-based cut decision making, the AVEE 2518 determines the size of a sub-frame using a facial proportion framing algorithm, where the AVEE 2518 determines the size of a sub-frame to be proportional to a recognized face of a performer. For example, the AVEE 2518 can determine that a height of a performer's sub-frame is X (e.g., five) times the face diameter. The AVEE 2518 can determine that a width of the sub-frame is a multiple of the height that achieves a pre-specified aspect ratio. Likewise, the AVEE 2518 can determine that a width of a performer's sub-frame is Y (e.g., eight) times the face diameter. The AVEE 2518 can determine that a height of the sub-frame is a multiple of the weight that achieves the aspect ratio. The AVEE 2518 can determine that the face is centered horizontally in the sub-frame, and ⅓ of the way down from the top of the sub-frame.

Alternatively, or in addition, in some implementations, the AVEE 2518 determines the size of a sub-frame using a hand proportion algorithm, where the AVEE 2518 determines the size of a sub-frame to be proportional to a recognized hand, or recognized hands, of a performer. Alternatively or in addition, in some implementations, the AVEE 2518 determines the size of a sub-frame using a sound source proportion algorithm, where the AVEE 2518 determines the size of a sub-frame to be proportional to a recognized musical sound source, or recognized sound source, or other area or areas of interest.

In location-based cut decision making, the AVEE 2518 can determine a location of the sub-frame in the high resolution frame using movement tracking. For example, when the adaptive tracking module 2524 notifies that a performer is moving across the stage, and provides a path of movement, the AVEE 2518 can follow the performer, identified by a face, and move a sub-frame of focus view along the path.

In prominence-based cut decision making, the AVEE 2518 places the sub-frame on a prominent performer or a group of prominent performers. The AVEE 2518 can determine prominence of performers based on various strates from the live audio data 2508. For example, from outputs of the inference module 2520 and the feature extraction module 2522, the AVEE 2518 can determine a likelihood that a performer is prominent in the performance at a particular moment. The AVEE 2518 can select a performer in a next video cut based on the likelihood, the higher the likelihood, the higher the probability that it will be select for the next cut. The likelihood that the AVEE 2518 selects a sub-frame that covers that performer positively correlates to the likelihood that a performer is prominent, e.g., the higher the likelihood that a performer is prominent, the higher the likelihood that the AVEE 2518 selects a sub-frame that covers that performer. The AVEE 2518 can determine the likelihood that a performer is prominent based on audio traits including, for example, energies (e.g., RMS energies) of respective audio signals of corresponding performers, RMS energy delta (increase or decrease) compared to the last N seconds of the performance, note onset frequency, tempo changes, among other traits. Additionally, or alternatively, the AVEE 208 can use various video traits to determine prominence. The video traits can include, for example, motion within the sub-frame boundaries.

The AVEE 2518 can create video edits that match the pace and flow of the music. For example, the AVEE 2518 can determine cuts in a manner such that the average frequency of cuts correlates with tempo of the music, as estimated by the feature extraction module 2522. The AVEE 2518 can determine precise timing of each particular cut by aligning the cut with changes in the novelty of the live audio data 2508 that lie above a given threshold, the threshold optionally being related to the tempo of the music. A higher the tempo corresponds to a lower threshold, and hence, a higher frequency of the cuts. The changes can include, for example a change in overall loudness or timbre, or one or more performers' beginning or stopping to play. The AVEE 2518 can time the cuts based on evaluation of a musical structure of the performance. For example, the AVEE 2518 can align the cuts in time with musical measures or phrases.

The AVEE 2518 can determine a choice of sub-frame to cut based on a performance metric that includes outputs from the analysis module 2516, the inference module 2520, the feature extraction module 2522, and optionally, the adaptive tracking module 2524. The performance metric can include a respective prominence metric for each performer, a respective specification of a sub-frame for each performer, the sized-based, location-based, and prominence-based cut decision making as described above. The AVEE 2518 can determine the choice of which sub-frame to cut using an example process as follows.

The AVEE 2518 can detect a next peak of the novelty index. The AVEE can define a peak using a maximum loudness followed by a decay that exceeds a predefined and/or configurable threshold time, threshold level, or both.

The AVEE 2518 can determine an elapsed time since the last cut and an elapsed time since a full-frame shot showing all performers. Upon determining that the elapsed time since last cut is less than a predefined and/or configurable minimum cut length, the AVEE 2518 can go back to the first stage to detect the next peak of the novelty index. Upon determining that the elapsed time since a full-frame shot exceeds a threshold, the AVEE 2518 can cut to the full frame. The AVEE 2518 can define the threshold in terms of a number of cuts or a duration of time derived from the tempo.

The AVEE 2518 can eliminate one or more performers from potential selection if their sub-frames have been showing for a time exceeding a threshold time. The AVEE 2518 can determine this threshold tame based on tempo. For example, a faster tempo can correspond to a shorter threshold time.

The AVEE 2518 can boost the prominence of a performer designated as having a lead role, to match the maximum prominence among all performers. The AVEE 2518 can designate one or more performers as having a lead role based on input received from a user interface.

The AVEE 2518 can construct a list of performers whose prominence values are within X (e.g., three) dB of the maximum prominence among all performers. The AVEE 2518 can add extra entries to this list for lead performers. The AVEE 2518 can determine the number of extra entries to add to the list. For example, the number of extra entries can correlate with the number of total performers. The AVEE 2518 can select a performer randomly from the manners of selecting performers as described above.

Based on the decisions on video editing, the AVEE 2518 can edit the live video data 2506 real time, e.g., when the performance is ongoing. The AVEE 2518 can provide edited video data for storage or for streaming to one or more user devices. In the streaming case, the AVEE 2518 can use a look-ahead time in the AVEE 2518 for buffering to perform the processing as described above. The look-ahead time can be pre-configured to be X seconds, e.g., above 1 second, 5-10 seconds, etc. The AVEE 2518 can determine the look-ahead time based on the amount of buffering needed in cloud serving applications receiving the streaming. In the off-line case where the content is stored rather than streamed, the AVEE 2518 can set the look-ahead time to infinity, or any large enough time period which causes the whole performance, or the whole song to be covered.

For convenience, tracking is described in reference to performers. In various implementations, tracking need not be limited to performers. For example, it is possible to track instruments (e.g., a guitar), or parts of instruments (e.g., a guitar neck), or parts of the performers (piano player hands). The AVEE 2518 can designate these areas as potential candidates to be focused to and to frame.

In FIG. 25, the analysis module 2516, the AVEE 2518, the inference module 2520, the feature extraction module 2522 and the adaptive tracking module 2524 are shown as separate modules for convenience. In various implementations, the modules can be combined or subdivided. For example, in some implementations, the functions of the analysis module 2516, the inference module 2520, the feature extraction module 2522 and the adaptive tracking module 2524 can be implemented by the AVEE 2518. In some implementations, the AVEE makes video editing decisions, and provide the decisions as instructions to one or more video capturing devices. The one or more video capturing devices then carry out implementing the decisions.

Figure 26:
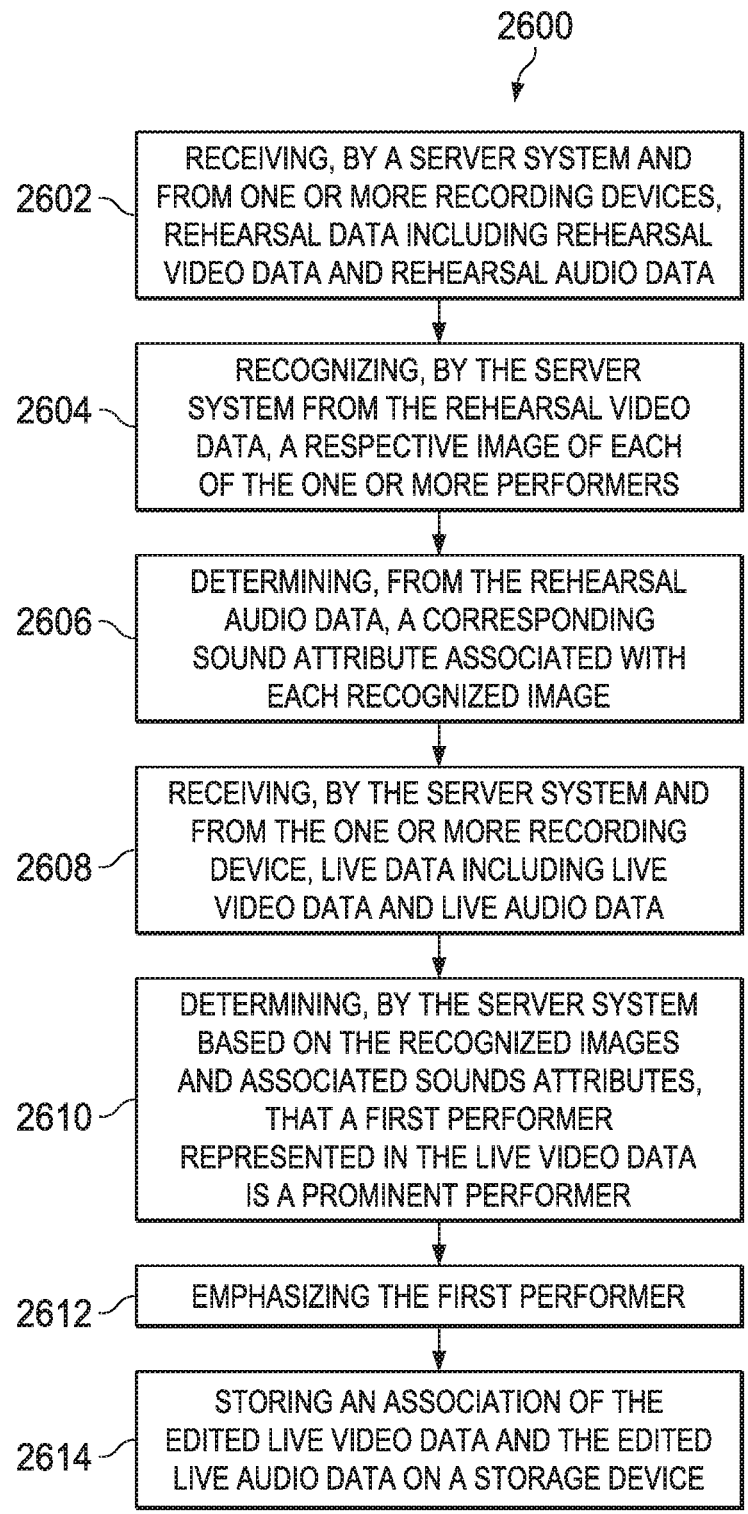
FIG. 26 is a flowchart illustrating an example process of video editing based on rehearsal data.

FIG. 26 is a flowchart illustrating an example process 2600 of video editing based on rehearsal data. The process 2600 can be performed by a server system, e.g., the server system 2502 of FIG. 25.

The server system receives (2602), from one or more recording devices, rehearsal data including rehearsal video data and rehearsal audio data. The rehearsal data represents a rehearsal of an event by one or more performers of the event. The one or more recording devices include one or more microphones and one or more video cameras. The one or more video cameras can include at least one video camera designated as high-resolution video camera, e.g., a 4K-capable video camera.

The server system recognizes (2604), from the rehearsal video data, a respective image of each of the one or more performers. Recognizing the respective image can be based on video-based tracking of at least one of a performer or an instrument played by the performer. For example, the recognition can be based on facial recognition, instrument recognition, or other object recognition.

The server system determines (2606), from the rehearsal audio data, a corresponding sound attribute associated with each recognized image. The sound attribute can include a sound type, a sound level, or both. The sound type can indicate a type of instrument used by a performer, e.g., a guitar, a drum, or vocal.

The server system receives (2608), from the one or more recording device, live data including live video data and live audio data of the event. In some implementations, the live data can be buffered on the one or more recording device, on the server system, or both, for a period of time corresponding to processing time of the data and corresponding to whether result will be stored or streamed to a user device.

The server system determines (2610), based on the recognized images and associated sounds attributes, a respective prominence of each performer. The system can derive a respective level at which each performer plays relative to rehearsal, as well as a respective location of each performers during rehearsal as captured by the one or more video cameras. The server system can determine a prominent performer using the techniques of determining a dominant sound source as described above. In some implementations, determining that the first performer is a prominent performer can include the following operations. The server system normalizes each loudness level among performers based on the live rehearsal audio data. The service system determines that, in the live audio data, at least one performer is performing at a level that, after normalization, is at least a threshold amount over normalized loudness levels of other performers. The service system can then determine that the first performer is the prominent performer.

In some implementations, normalizing each loudness level can include the following operations. The server system can determine, from the rehearsal audio data, a first level sound of each performer and a second level sound of each performer. The first level is lower than the second level. The server system then normalizes each loudness level by scaling and aligning the first level and scaling and aligning the second level.

In some implementations, determining that the first performer is a prominent performer can include the following operations. The server system determines, based on the live video data, that an amount of movement of the first performer exceeds amounts of movement of other performers by at least a threshold value. The server system then determines that the first performer is the prominent performer based on the amount of movement.

The server system edits (2612) the live video data and the live audio data according to one or more editing rules. In editing the live data, the server system emphasizes at least one performer based on the respective prominences. For example, the editing can emphasize on a vocalist, an instrument, or a section of a band or an orchestra that includes multiple performers (e.g., a brass section or a woodwind section). The editing can be performed by the server system on the live video data. In some implementations, the editing can be performed by a recording device. For example, the server system can provide editing instructions to the recording device, causing the recording device to perform the editing operations.

Editing the live video data and the live audio data can include determining pace and tempo of the event based on the live audio data. The server system can then cut the live video data according to the pace and tempo. Editing the live video data and the live audio data can include determining that a performer, e.g., the first performer, has started or stopped playing. The server system can then cut the live video data in response, e.g., at time that the perform started or stopped playing.

In some implementations, editing the live video data and the live audio data includes the following operations. The server system determines that a time elapsed since a full-frame shot showing all performers exceeds a threshold time. The server system can cut the live video data in response. The server system can determine the threshold time based on a number of cuts or a duration of the time derived from a tempo of the live audio data.

The server system then provides (2614) the edited data for playback. The server system can store an association of the edited live video data and the edited live audio data on a storage device, or stream the association of the edited live video data and the edited live audio data to a user device.

Frame Region Selection

Figure 27:
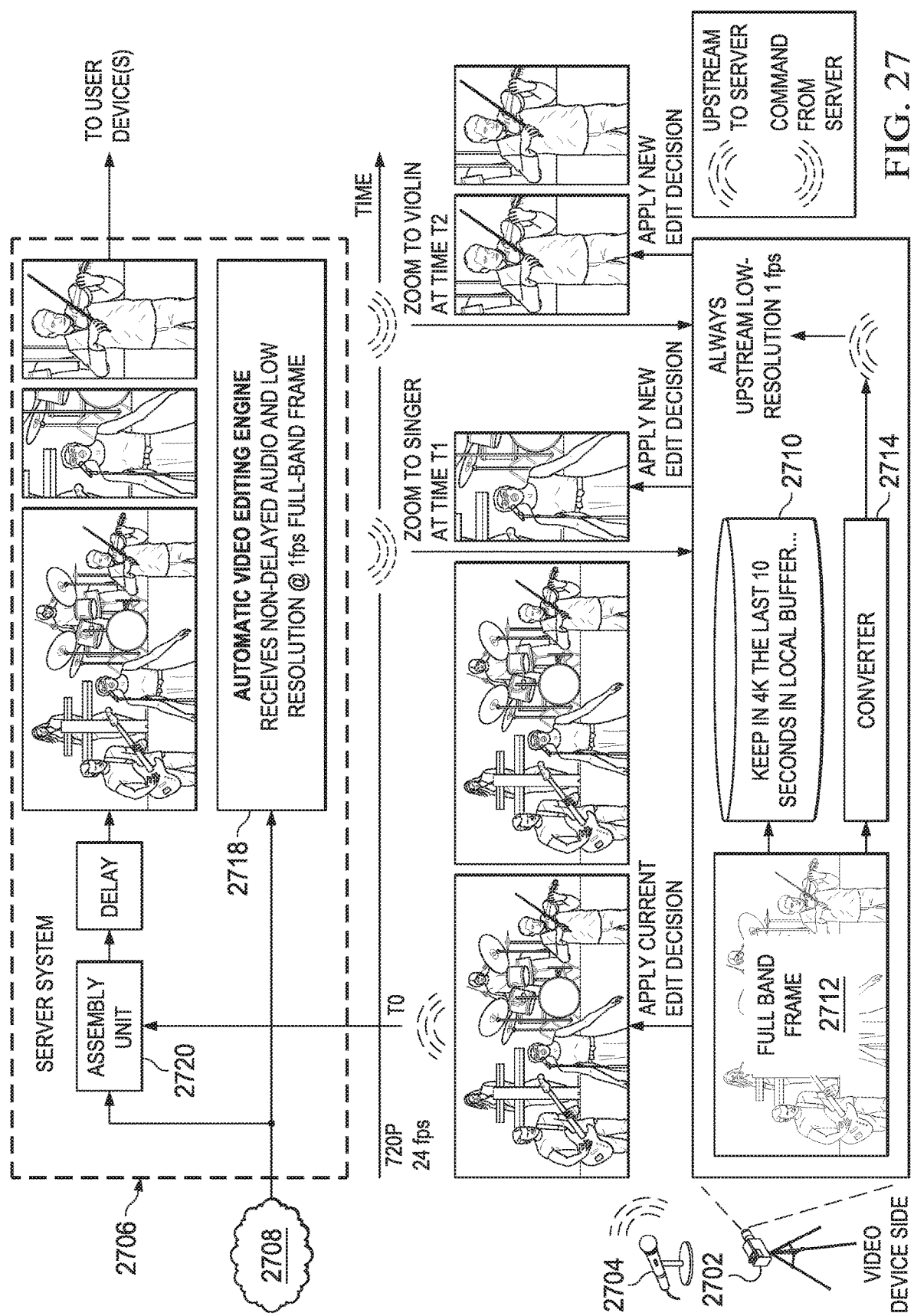
FIG. 27 is a block diagram illustrating example techniques of selecting a sub-frame region from full-frame video data.

FIG. 27 is a block diagram illustrating example techniques of selecting a sub-frame region from full-frame video data. At a live event, e.g., a concert, at least one video capturing device 2702 captures video of the event. At least one audio capturing device 2704 captures audio of the event. The devices 2702 and 2704 submit live video data and live audio data to a server system 2706 through a communication network 2708, e.g., the Internet. The video capturing device 2702 may record video at high resolution, e.g., 4K. The high-resolution video may consume too much bandwidth of the communications network 2708 to upload to the server system 2706 or to download from the server system 2706 to a user device.

The server system 2706 can be the same as, or different from, the server system 2502 described in reference to FIG. 25. The server system 2706 can store or stream to the user device video of medium resolution, e.g., 720p. The video capturing device 2702 can be configured as a slave of the server system 2706. As a slave of the server system 2706, the video capturing device 2702 follows commands from the server system 2706 to zoom, crop, and select focal points of the video data. The server system 2706, which receives live audio data from the audio capturing device 2704, identifies performers and corresponding instruments, makes decisions on selecting sub-frames, and directs the video capturing device 2702 to submit the selected sub-frames to the server system 2706.

The server system 2706 receives at least one video frame of the full band at the event. The video frame includes all performers, and need not be in full resolution, and can be optionally compressed using a lossy codec. The server system 2706 then makes decisions on where to focus based on live audio data and which sub-frame to select. The server system 2706 directs the video capturing device 2702 to submit medium resolution live video of only the selected sub-frame to the server system 2706.

The video capturing device 2702 can include a video buffer 2710. The video buffer 2710 is a data store configured to store X seconds (e.g., ten seconds) of video data at full resolution. The video data can include a series of full band frames 2712 and associated time information. The video capturing device 2702 includes a video converter 2714. The video converter 2714 converts the full band frames 2712 from full resolution to a series of lower resolution (e.g., 720p or 640×480) images. The video converter 2714 submits the lower resolution images to the server system 2706 at reduced frame rate (e.g., 1 fps). In the mean time, the video capturing device 2702 converts the video stream in the video buffer 2710 into medium resolution video, and submits the medium resolution video to the server system 2706 at standard frame rate (e.g., 24 fps).

At an initial time t0, the submitted video may be video covering the full band, having a frame that coincides with the lower resolution images. The video capturing device 2702 then waits for instructions from the server system 2706 on editing decisions, while continuing submitting the medium-resolution video data and the images to the server system 2706.

The server system 2706 includes AVEE 2718. The AVEE 2718 can be the same as, or different from, the AVEE 2518 of FIG. 25. The AVEE 2718 receives full frame images and live audio data. The AVEE 2718 is configured to determine, based on the full frame images and live audio data received from the audio capturing device 2704, which performer or instrument to focus on. For example, the AVEE 2718 can determine that a singer, at time t1, is a prominent performer. The AVEE 2718 can then issue an instruction to zoom to the prominent performer, in this example, the singer, in video starting from time t1. The instruction can be associated with sensor pixel coordinates, e.g., X pixels from left, Y pixels from bottom, size and the time t1.

In response to the instruction, the video capturing device 2704 implements the editing according to the instruction. The video capturing device 2704 retrieves video data from the video buffer 2710 of the corresponding time t1. The video capturing device 2704 crops to the location according to the coordinates. The video capturing device 2704 adjusts the cropped video data to the specified size, and submits the adjusted video data to the server system 2706, while continuing submitting the converted full frame images to the server system 2706. The video capturing device 2704 can submit the adjusted video data at standard frame rate, e.g., 24 fps. Thus, the server system 2706 will receive video that, from the time t1, focuses on the prominent performer, e.g., a singer.

Based on live audio data and images submitted to the server system 2706, the server system 2706 can determine that, at a second time t2, a second performer, e.g., a violinist, becomes the prominent performer. The server system 2706 then provides instructions to the video capturing device 2704 to focus on a portion of the live video that includes video of the violinist. Upon receiving the instructions specifying location and size of the sub-frame and the time t2, the video capturing device 2704 changes cropping coordinates, and submits cropped and optionally, resized video including the violinist to the server system 2706. Accordingly, the server system 2706 receives medium-resolution video of the violinist from time t2.

The server system 2706 includes an assembly unit 2720. The assembly unit 2720 is configured to assemble medium-resolution video data from the video capturing device 2702 and the live audio data from the audio capturing device 2704 for storage or for streaming to user devices. For live streaming, the assembly unit 2720 can add a delay to the beginning of the assembled video stream. Both the video buffer 2710 and the delay can compensate for latency in the decision making and in data transmission. For example, the server system 2706 can decide to zoom on the drummer when the drummer kicks in, command the video capturing device 2702 to focus on the drummer at the place of the buffer kept in memory that corresponds to the time the drummer kicks in. This time may be X (e.g., 0.2) seconds before the video capturing device 2702 receives the command. The server system 2706 then receive the new edited video, and serve it to the audience, using the delay to mask the time of making the decision and transmitting the command.

Figure 28:
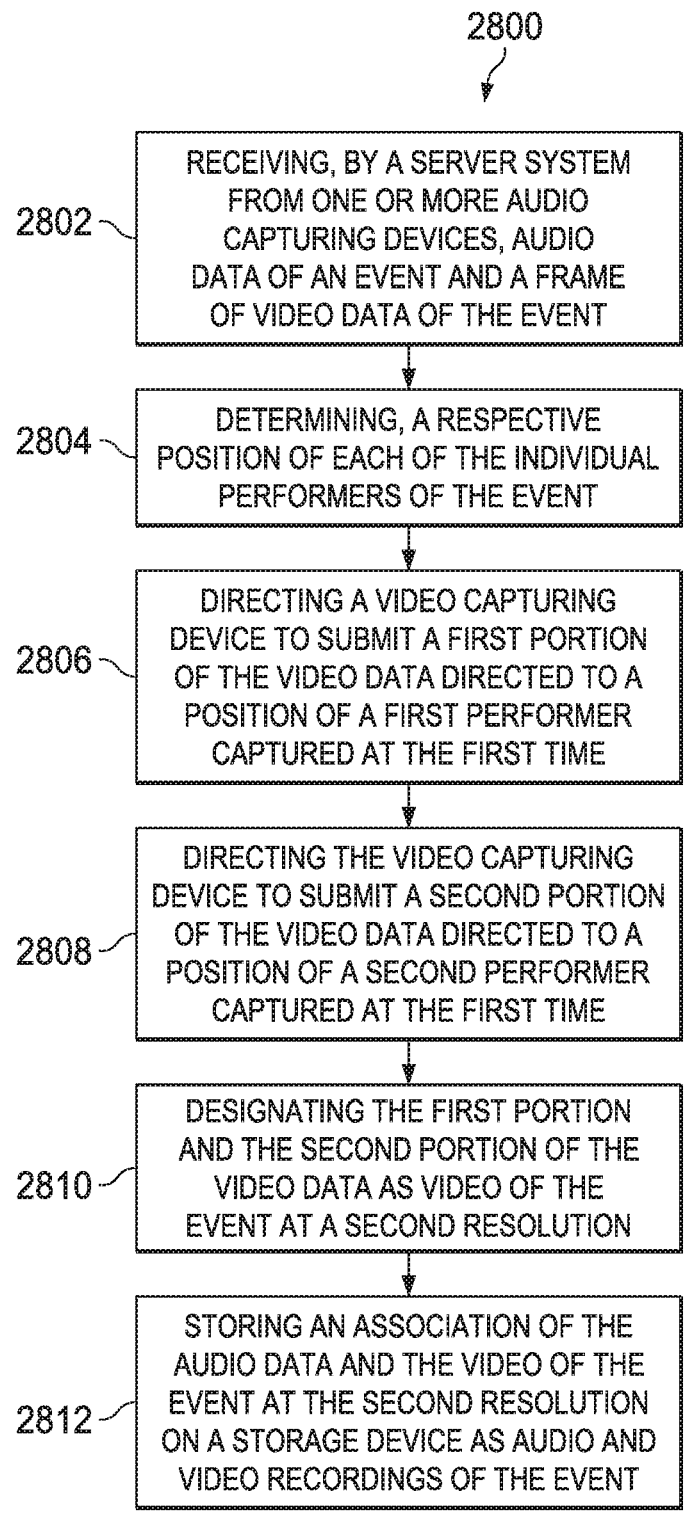
FIG. 28 is a flowchart of an example process of selecting a sub-frame region from full-frame video data performed by a server system.

FIG. 28 is a flowchart of an example process 2800 of selecting a sub-frame region from full-frame video data performed by a server system. The server system can be server system 2706 of FIG. 27.

The server system receives (2802) from one or more audio capturing devices, audio data of an event and at least one frame of video data of the event. The video data is captured by a video capturing device configured to record video at a first resolution. The first resolution can be 4K or above. The frame can have a resolution that is the same as, or lower than, the first resolution. The frame of video data of the event can be a frame among a series of frames of the video data. The series of frames can be received at the server system at a frame rate (e.g., 1 fps or below) that is lower than a frame capture rate (e.g., 24 fps or above) of the video capturing device. In some implementations, a single frame capturing all performers of the event is sufficient. In some implementations, the video capturing device submits multiple frames to the server system, to cover performers that may have moved during the event.

The server system determines (2804), based on the audio data and images of individual performers recognized from in the frame of the video data, a respective position of each of the individual performers of the event. The server system can make the determination based on rehearsal data.

Upon determining, by the server system from the audio data, that a first performer of the individual performers is a prominent performer at a first time, the server system directs (2806) the video capturing device to submit a first portion of the video data to the server system at a second resolution. The first portion of the video data is spatially directed to a position of the first performer captured at the first time. The second resolution can be 1080p or below.

Upon determining, by the server system from the audio data, that a second performer of the individual performer is a prominent performer at a second time, the server system directs (2808) the video recorder to submit a second portion of the video data to the server system at the second resolution. The second portion of the video data is spatially directed to a position of the second performer captured at the second time.

The server system designates (2810) the first portion and the second portion of the video data as video of the event at a second resolution. The server system then provides (2812), to a storage device or to a user device, an association of the audio data and the video of the event at the second resolution as audio and video recordings of the event. For example, the server system can add a delay of the video of the event at the second resolution. The server system then streams the delayed video and associated audio data to one or more user devices.

In some implementations, the video capturing device buffers a period of the video data at the first resolution. In response to a command from the server system, the video capturing device selects positions of frames of the buffered video data that correspond to the first performer and the second performer to submit to the server system.

Figure 29:
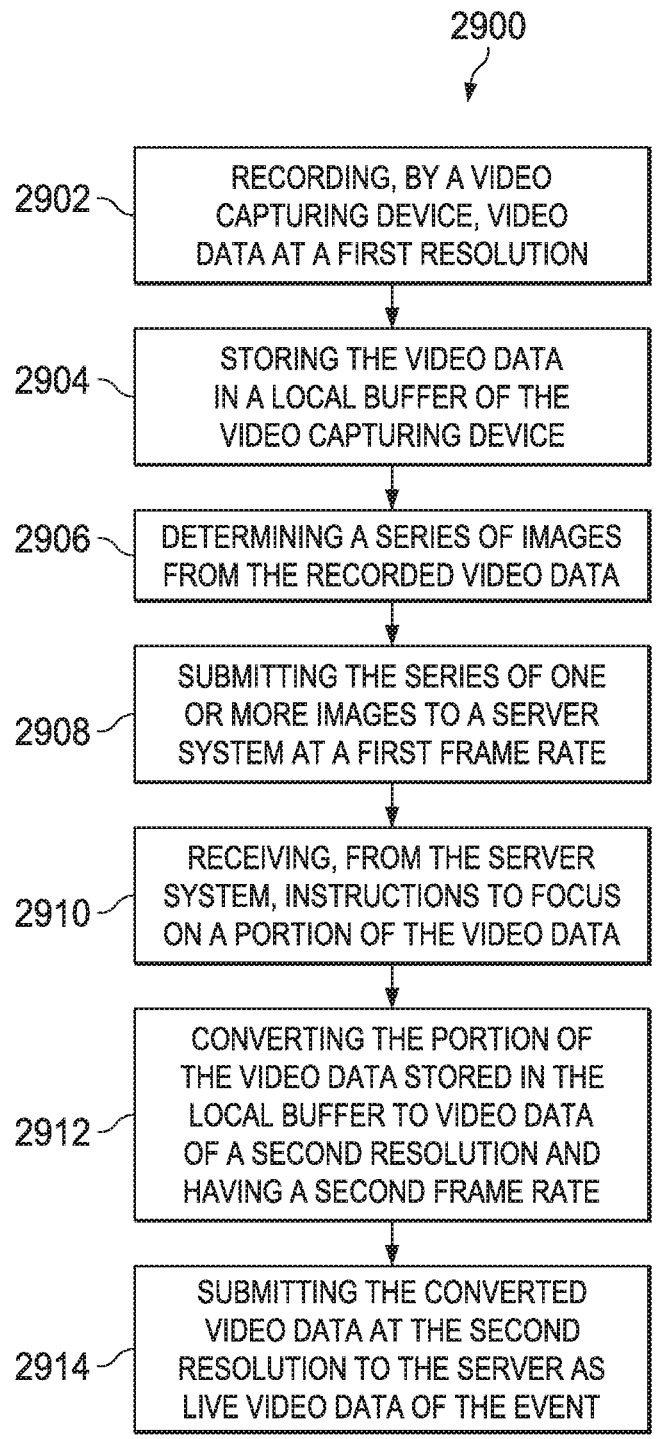
FIG. 29 is a flowchart of an example process of selecting a sub-frame region from full-frame video data performed by a video capturing device.

FIG. 29 is a flowchart of an example process 2900 of selecting a sub-frame region from full-frame video data performed by a video capturing device. The video capturing device can be video capturing device 2702 of FIG. 27.

The video capturing device records (2902) video data at a first resolution. The first resolution can be 4K or above. The video capturing device stores (2904) the video data in a local buffer of the video capturing device. The video capturing device determines (2906) a series of one or more images from the recorded video data. The video capturing device submits (2908) the series of one or more images to a server system at a first frame rate. The first frame rate can be one frame per second or below. The video capturing device receives (2910) from the server system, instructions to focus on a portion of the video data, the instructions indicating a temporal location and a spatial location of the portion in the recorded video data.

In response to the instructions, the video capturing device converts (2912), according to the indicated temporal location and spatial location, the portion of the video data stored in the local buffer to video data of a second resolution and having a second frame rate that is higher than the first frame rate. The second resolution can be 1080p or below. The second frame rate can be 24 frames per second or above. The video capturing device then submits (2914) the converted video data at the second resolution to the server as live video data of the event.

Exemplary Recording Device Architecture

Figure 21:
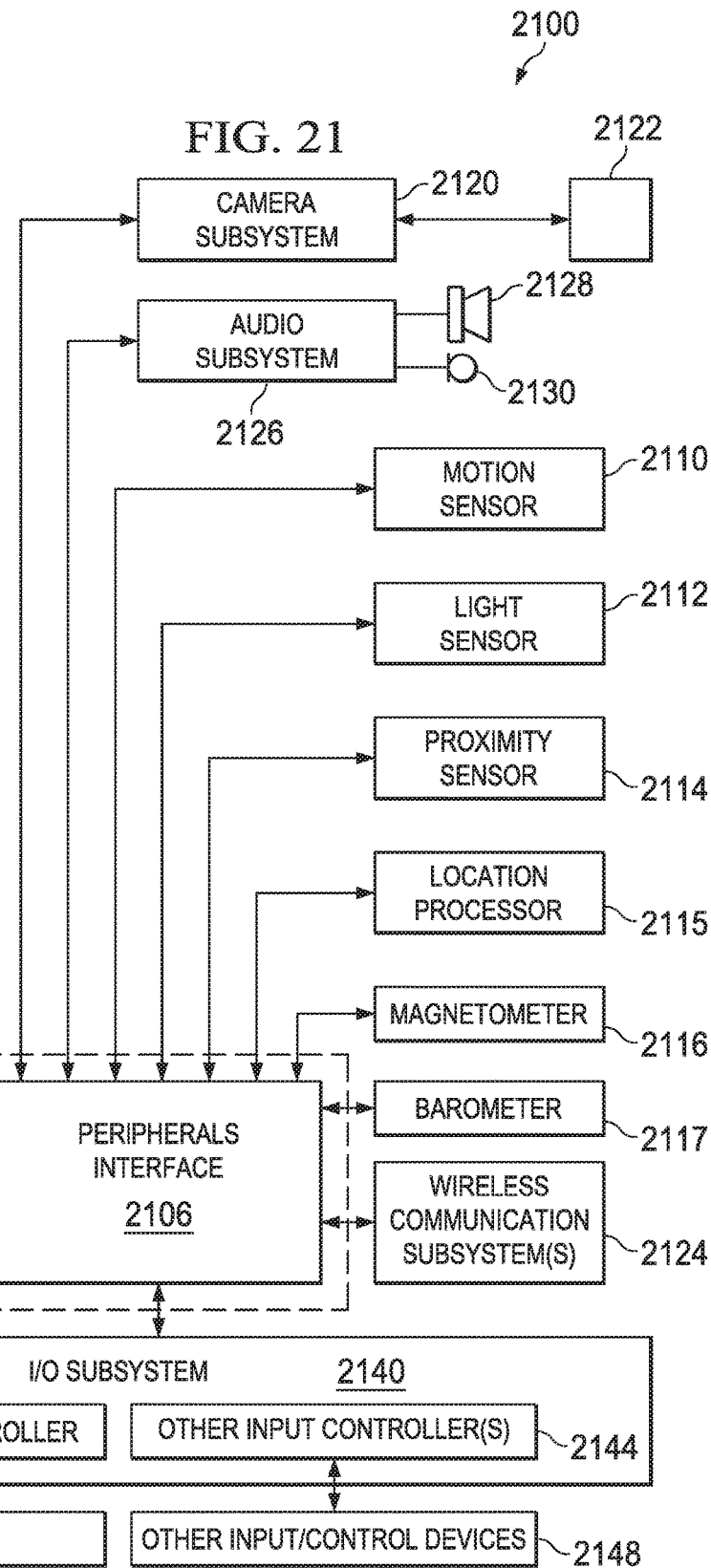
FIG. 21 is a block diagram illustrating an example device architecture of a mobile device implementing the features and operations described in reference to FIGS. 1-20 and 24-29.

FIG. 21 is a block diagram illustrating an exemplary device architecture 2100 of a device implementing the features and operations described in reference to FIGS. 1-20 and 24-29. The device can be, for example, recording device 102 or 104 of FIG. 1, or recording device 302 of FIG. 3. A device can include memory interface 2102, one or more data processors, image processors and/or processors 2104 and peripherals interface 2106. Memory interface 2102, one or more processors 2104 and/or peripherals interface 2106 can be separate components or can be integrated in one or more integrated circuits. Processors 2104 can include application processors, baseband processors and wireless processors. The various components in the mobile device, for example, can be coupled by one or more communication buses or signal lines.

Sensors, devices and subsystems can be coupled to peripherals interface 2106 to facilitate multiple functionalities. For example, motion sensor 2110, light sensor 2112 and proximity sensor 2114 can be coupled to peripherals interface 2106 to facilitate orientation, lighting and proximity functions of the mobile device. Location processor 2115 can be connected to peripherals interface 2106 to provide geo-positioning. In some implementations, location processor 2115 can be programmed to perform the operations of a GNSS receiver. Electronic magnetometer 2116 (e.g., an integrated circuit chip) can also be connected to peripherals interface 2106 to provide data that can be used to determine the direction of magnetic North. Thus, electronic magnetometer 2116 can be used as an electronic compass. Motion sensor 2110 can include one or more accelerometers configured to determine change of speed and direction of movement of the mobile device. Barometer 2117 can include one or more devices connected to peripherals interface 2106 and configured to measure pressure of atmosphere around the mobile device.

Camera subsystem 2120 and an optical sensor 2122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2124, which can include radio frequency receivers and transmitters and/or optical (e.g., infrared) receivers and transmitters. The specific design and implementation of the communication subsystem 2124 can depend on the communication network(s) over which a mobile device is intended to operate. For example, a mobile device can include communication subsystems 2124 designed to operate over a GSM network, a GPRS network, an EDGE network, a Wi-Fi™ or WiMax™ network and a Bluetooth™ network. In particular, the wireless communication subsystems 2124 can include hosting protocols such that the mobile device can be configured as a base station for other wireless devices.

Audio subsystem 2126 can be coupled to a speaker 2128 and a microphone 2130 to facilitate voice-enabled functions, such as voice recognition, voice replication, digital recording and telephony functions. Audio subsystem 2126 can be configured to receive voice commands from the user.

I/O subsystem 2140 can include touch surface controller 2142 and/or other input controller(s) 2144. Touch surface controller 2142 can be coupled to a touch surface 2146 or pad. Touch surface 2146 and touch surface controller 2142 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 2146. Touch surface 2146 can include, for example, a touch screen.

Other input controller(s) 2144 can be coupled to other input/control devices 2148, such as one or more buttons, rocker switches, thumb-wheel, infrared port, USB port and/or a pointer device such as a stylus. The one or more buttons (not shown) can include an up/down button for volume control of speaker 2128 and/or microphone 2130.

In one implementation, a pressing of the button for a first duration may disengage a lock of the touch surface 2146; and a pressing of the button for a second duration that is longer than the first duration may turn power to the mobile device on or off. The user may be able to customize a functionality of one or more of the buttons. The touch surface 2146 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 2102 can be coupled to memory 2150. Memory 2150 can include high-speed random access memory and/or non-volatile memory, such as one or more magnetic disk storage devices, one or more optical storage devices and/or flash memory (e.g., NAND, NOR). Memory 2150 can store operating system 2152, such as iOS, Darwin, RTXC, LINUX, UNIX, OS X, WINDOWS, or an embedded operating system such as VxWorks. Operating system 2152 may include instructions for handling basic system services and for performing hardware dependent tasks. In some implementations, operating system 2152 can include a kernel (e.g., UNIX kernel).

Memory 2150 may also store communication instructions 2154 to facilitate communicating with one or more additional devices, one or more computers and/or one or more servers. Memory 2150 may include graphical user interface instructions 2156 to facilitate graphic user interface processing; sensor processing instructions 2158 to facilitate sensor-related processing and functions; phone instructions 2160 to facilitate phone-related processes and functions; electronic messaging instructions 2162 to facilitate electronic-messaging related processes and functions; web browsing instructions 2164 to facilitate web browsing-related processes and functions; media processing instructions 2166 to facilitate media processing-related processes and functions; GNSS/Location instructions 2168 to facilitate generic GNSS and location-related processes and instructions; camera instructions 2170 to facilitate camera-related processes and functions; magnetometer data 2172 and calibration instructions 2174 to facilitate magnetometer calibration. The memory 2150 may also store other software instructions (not shown), such as security instructions, web video instructions to facilitate web video-related processes and functions and/or web shopping instructions to facilitate web shopping-related processes and functions. In some implementations, the media processing instructions 2166 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 2150. Memory 2150 can store audio processing instructions 2176 that, when executed by processor 2104, can cause processor 2104 to perform various operations including, for example, joining a group of recording services by logging into a user account, designating one or more microphones of the device as a spot microphone or as main microphones, recording audio signals for the group using the one or more microphones, and submitting the recorded signals to a server. In some implementations, audio processing instructions 2176 can cause processor 2104 to perform operations of server 408 as described in reference to FIG. 4 and other figures. Memory 2150 can store video processing instructions that, when executed by processor 2104, can cause processor 2104 to perform various operations described in reference to FIGS. 25-29.

Each of the above identified instructions and applications can correspond to a set of instructions for performing one or more functions described above. These instructions need not be implemented as separate software programs, procedures, or modules. Memory 2150 can include additional instructions or fewer instructions. Furthermore, various functions of the mobile device may be implemented in hardware and/or in software, including in one or more signal processing and/or application specific integrated circuits.

Figure 22:
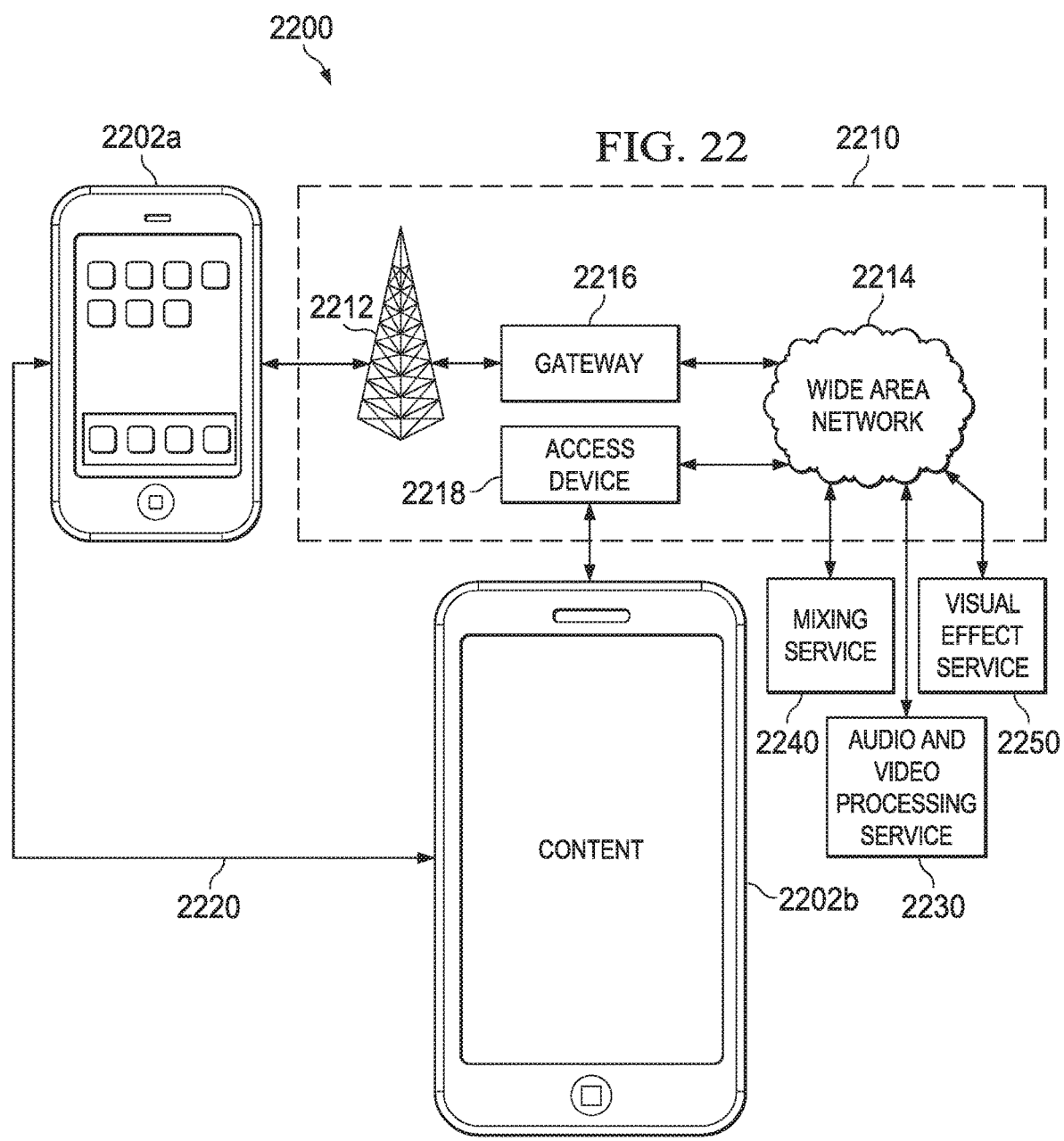
FIG. 22 is a block diagram of an example network operating environment for the mobile devices of FIGS. 1-20 and 24-29.

FIG. 22 is a block diagram of an example network operating environment 2200 for the mobile devices of FIGS. 1-20 and 24-29. Devices 2202*a* and 2202*b* can, for example, communicate over one or more wired and/or wireless networks 2210 in data communication. For example, a wireless network 2212, e.g., a cellular network, can communicate with a wide area network (WAN) 2214, such as the Internet, by use of a gateway 2216. Likewise, an access device 2218, such as an 802.11g wireless access point, can provide communication access to the wide area network 2214. Each of devices 2202*a* and 2202*b* can be device 102 or device 104 of FIG. 1, or recording device 302 of FIG. 3.

In some implementations, both voice and data communications can be established over wireless network 2212 and the access device 2218. For example, device 2202*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 2212, gateway 2216, and wide area network 2214 (e.g., using Transmission Control Protocol/Internet Protocol (TCP/IP) or User Datagram Protocol (UDP)). Likewise, in some implementations, the device 2202b can place and receive phone calls, send and receive e-mail messages, and retrieve electronic documents over the access device 2218 and the wide area network 2214. In some implementations, device 2202a or 2202b can be physically connected to the access device 2218 using one or more cables and the access device 2218 can be a personal computer. In this configuration, device 2202a or 2202b can be referred to as a "tethered" device.

Devices 2202a and 2202b can also establish communications by other means. For example, wireless device 2202a can communicate with other wireless devices, e.g., other mobile devices, cell phones, etc., over the wireless network 2212. Likewise, devices 2202a and 2202b can establish peer-to-peer communications 2220, e.g., a personal area network, by use of one or more communication subsystems, such as the Bluetooth™ communication devices. Other communication protocols and topologies can also be implemented.

The device 2202a or 2202b can, for example, communicate with one or more services 2230, 2240 and 2250 over the one or more wired and/or wireless networks. For example, one or more audio and video processing services 2230 can provide services of audio processing including automatic synchronizing, automatic leveling, automatic panning, automatic sound source equalizing, automatic segmentation, and streaming, as described above. Mixing service 2240 can provide user interfaces that allow a mixing professional to log in through a remote console to perform mixing operations on live audio data. Visual effect service 2250 can provide user interfaces that allow a visual effects professional to log in through a remote console to edit video data.

Device 2202a or 2202b can also access other data and content over the one or more wired and/or wireless networks. For example, content publishers, such as news sites, Really Simple Syndication (RSS) feeds, web sites, blogs, social networking sites, developer networks, etc., can be accessed by device 2202a or 2202b. Such access can be provided by invocation of a web browsing function or application (e.g., a browser) in response to a user touching, for example, a Web object.

Example System Architecture

Figure 23:
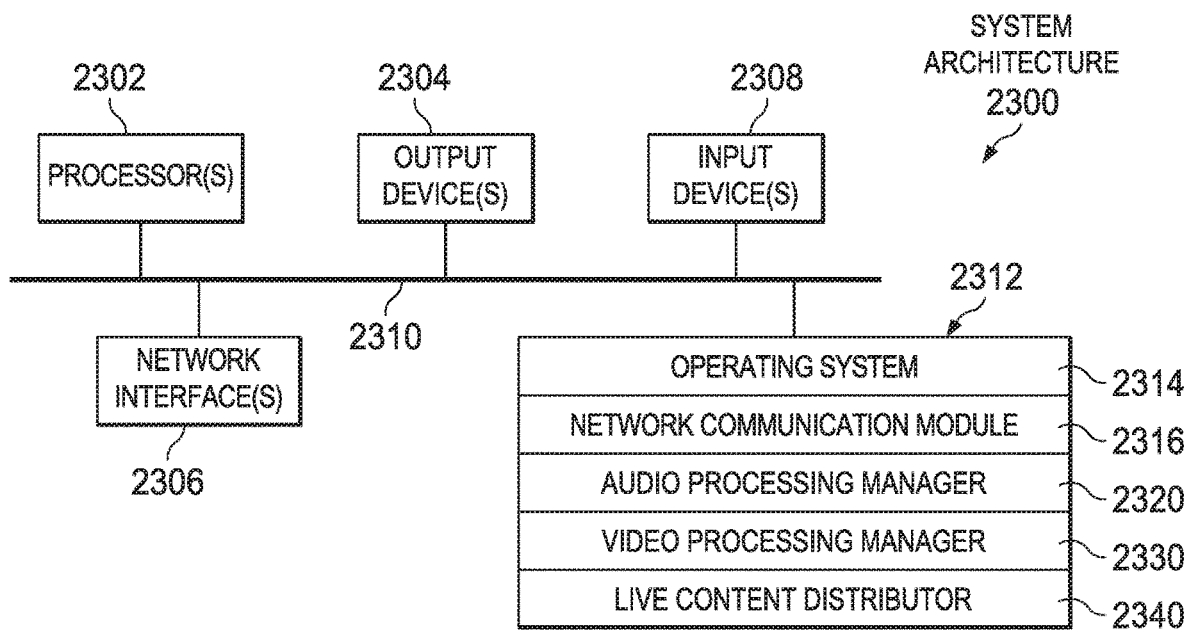
FIG. 23 is a block diagram of an example system architecture for a server system implementing the features and operations described in reference to FIGS. 1-20 and 24-29.

FIG. 23 is a block diagram of a system architecture for example server system implementing the features and operations described in reference to FIGS. 1-20 and 24-29. Other architectures are possible, including architectures with more or fewer components. In some implementations, architecture 2300 includes one or more processors 2302 (e.g., dual-core Intel® Xeon® Processors), one or more output devices 2304 (e.g., LCD), one or more network interfaces 2306, one or more input devices 2308 (e.g., mouse, keyboard, touch-sensitive display) and one or more computer-readable mediums 2312 (e.g., RAM, ROM, SDRAM, hard disk, optical disk, flash memory, etc.). These components can exchange communications and data over one or more communication channels 2310 (e.g., buses), which can utilize various hardware and software for facilitating the transfer of data and control signals between components.

The term "computer-readable medium" refers to a medium that participates in providing instructions to processor 2302 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 2312 can further include operating system 2314 (e.g., a Linux® operating system), network communication module 2316, audio processing manager 2320, video processing manager 2330 and live content distributor 2340. Operating system 2314 can be multi-user, multiprocessing, multitasking, multithreading, real time, etc. Operating system 2314 performs basic tasks, including but not limited to: recognizing input from and providing output to network interfaces 2306 and/or devices 2308; keeping track and managing files and directories on computer-readable mediums 2312 (e.g., memory or a storage device); controlling peripheral devices; and managing traffic on the one or more communication channels 2310. Network communications module 2316 includes various components for establishing and maintaining network connections (e.g., software for implementing communication protocols, such as TCP/IP, HTTP, etc.).

Audio processing manager 2320 can include computer instructions that, when executed, cause processor 2302 to perform various audio estimation and manipulation operations as described above, e.g., in reference to server 408. Video processing manager 2330 can include computer instructions that, when executed, cause processor 2302 to perform video editing and manipulation operations as described above, e.g., in reference to video editor 530, AVEE 2518, or AVEE 2718. Live content distributor 2340 can include computer instructions that, when executed, cause processor 2302 to perform operations of receiving reference audio data and live data of audio events, and after audio and visual data is processed, streaming the processed live data to one or more user devices.

Architecture 2300 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

Various aspects of the present invention may be appreciated from the following enumerated example embodiments (EEEs):

EEE 1. A method of leveling audio, comprising:
    receiving, by a leveling unit including one or more electronic circuits, reference audio data, the reference audio data including a representation of channel signals from a plurality of channel signal sources;
    receiving, by the leveling unit, target level data, the target level data specifying a target level of each sound source;
    determining, by the leveling unit, a cost function for rescaling audio signals to the target levels according to respective gains based on the reference audio data; and
    computing a respective gain to apply to each of the channel signals in live audio data by minimizing the cost function.

EEE 2. The method of EEE 1, wherein the representation of the channel signals includes original channel signals or processed channel signals, the processed channel signals include channel signals that have been processed by a noise reduction unit, an equalizer, a dynamic range correction unit, or a sound source separator.

EEE 3. The method of EEE 1 or EEE 2, comprising determining, by the leveling unit, a respective correlation between each pair of the channel signal source.

EEE 4. A method of panning audio, comprising:
    receiving, by a panner comprising one or more electronic circuits, reference audio data of sound sources, the sound sources including one or more sources designated as one or more pannable sources and one or more sources designated as one or more unpannable sources;
    receiving channel signals of an event in which the sound sources play;
    determining a cost function based on the reference audio data, the cost function having panning positions for each channel signal as variables, the cost function including a first component for representing imbalance between a left channel and a right channel, a second component representing the one or more pannable sources, and a third component representing the one or more unpannable sources among the sound sources;
    determining a respective panning position of each channel signal by minimizing the cost function; and applying the panning positions to the channel signals to achieve an audio effect of placing sound sources of the event between left and right of a stereo sound stage for output to a stereo sound reproduction system.

EEE 5. The method of EEE 4, wherein the panning positions include at least one of panning angles or a ratio between a left channel and a right channel, and wherein the stereo sound reproduction system includes headphones or loudspeakers.

EEE 6. A method of leveling and panning audio, comprising:
  receiving, by a leveling and panning unit including one or more electronic circuits, reference audio data, the reference audio data including a representation of channel signals from a plurality of channel signal sources recorded in a rehearsal of one or more sound sources;
  receiving, by the leveling and panning unit, target level data, the target level data specifying a target level of each sound source;
  receiving, by the leveling and panning unit, live audio data, the live audio data including recorded or real time signals from the one or sound sources playing at a live event;
  determining, by the leveling unit, a joint cost function for leveling the live audio data and panning the live audio data based on the reference audio data, the joint cost function having a first component for leveling the live audio data and a second component for panning the live audio data, the first component being based on the target level data, the second component being based on a first representation of imbalance between a left channel and a right channel, a second representation of pannable sources among the sound sources, and a third representation of unpannable sources among the sound sources;
  computing a respective gain to apply to each of the channel signals and a respective panning position of each channel signal by minimizing the joint cost function; and
  applying the gains and panning positions to signals of live audio data of an event to achieve an audio effect of leveling sound sources in the live audio data and placing sound sources in the live audio data between left and right of a stereo sound stage for output to a storage device or a stereo sound reproduction system.

EEE 7. The method of EEE 6, wherein each level is an energy level or a loudness level.

EEE 8. A method of determining audio levels, comprising:
  receiving, by an estimator including one or more electronic circuits, reference audio data, the reference audio data including channel signals each representing one or more sound sources playing during a rehearsal session;
  computing, by the estimator, a respective level of each sound source in each microphone based on the reference audio data;
  determining a difference in levels between live audio data and reference audio data, including comparing a respective level of each sound source as represented in the live audio data and the sound source as represented in the reference audio data;
  determining a cost function on a respective level of each sound source based on the difference;
  determining the respective levels by minimizing the cost function; and
  providing the level as input to an audio or video processor.

EEE 9. The method of EEE 8, comprising:
  computing, by the estimator, a respective level of each sound source in each frequency band of a plurality of frequency bands, wherein
  the cost function includes a respective sum of costs across frequency bands per sound source the respective levels are determined in each frequency band.

EEE 10. A method of equalizing audio, comprising:
  receiving, by an equalizer comprising one or more electronic circuits, audio data including signals from a plurality of sound sources;
  mapping, by the equalizer, a respective signal for each sound source to excitation in each frequency band;
  determining a need value for each source-band pair in a list of source-band pairs, each source-band pair representing a sound source and a frequency band, the need value indicating a relative importance of the sound source represented in the pair being equalized in the frequency band in the pair relative to other sound sources and other frequency bands and a masking level of the sound source represented in the pair by one or more other sound sources;
  iteratively equalizing signals of sound sources represented in the source-band pairs in the list having a highest need value and removing equalized source-band pairs from the list until a highest need value of remaining source-band pairs is below a threshold value; and
  providing the equalized signals for playback on one or more loudspeakers.

EEE 11. The method of EEE 10, where the need value is a product of one or more values representing the relative importance and one or more values representing a level masking of the sound source.

EEE 12. A method of segmenting video content, comprising:
  receiving, by a segmenting unit comprising one or more electronic circuits, audio signals;
  constructing, by the segmenting unit, a novelty index on the audio signals across time;
  determining a cut time for a next cut based on peaks in the novelty index;
  cutting the video content at the cut time; and
  provide the cut video content as a new video segment to a storage device or to one or more end user devices.

EEE 13. The method of EEE 12, wherein determining the cut time comprises:
  determining a segment length based on an average cut length, the segment length corresponding to length of an audio segment; and
  determining the cut time based on a segment length.

EEE 14. The method of EEE 13, wherein determining the cut time based on the segment length comprises:
  determining a sum of the novelty index over time since a last cut; and
  upon determining that the sum is above a novelty threshold, determining the cut time as a time from a time the sum of the novelty index satisfies the novelty threshold to a time of the next cut, and wherein randomness of the cut time averages to the segment length. EEE 15. A method of synchronizing audio, comprising:
  receiving audio signals from a plurality of microphones;
  determining a respective quality value of correletations between each pair of the audio signals and assigning the quality values in a map vector;
  iteratively determining a series of delays and inserting the delays to the map vector, wherein iteratively determining the series of delays comprises iteratively aligning and downmixing a pair of the audio signals having a highest quality value; and
  upon finishing the iterations, synchronizing the audio signal using the respective delays in the map vector according to an order the delays are inserted into the map vector.

EEE 16. A method of noise reduction, comprising:

receiving, by noise reduction unit including one or more electronic circuits, reference audio data, the reference audio data including channel signals recorded during a silent period rehearsal session;

estimating, by a noise estimator of the noise reduction unit, a respective noise level in each channel signal in the reference audio data;

receiving live performance data, the live performance data including channel signals recorded during an event in which one or more instruments that were silent in the rehearsal session play;

reducing a respective noise level in each channel signal in the live performance data individually by the noise reducer of the noise reduction unit, including applying a respective suppression gain in each channel signal in the live performance data upon determining that a difference between a noise level in the channel signal in the live performance data and the estimated noise level satisfies a threshold; and after reducing the noise levels, providing the channel signals to a downstream device for further processing, storage, or distribution to one or more end user devices.

EEE 17. The method of EEE 16, wherein:

estimating the respective noise level in each channel signal in the reference audio data is performed over a plurality of frequency bins, reducing the respective noise level in each channel signal in the live performance data is performed in the frequency bins, and the estimating and the reducing are performed according to noise reduction parameters including the threshold, a slope, an attack time, a decay time, and an octave size.

EEE 18. A method comprising:

receiving, by a server system and from one or more channel signal sources, reference audio data, the reference audio data comprises acoustic information of one or more sound sources playing individually in a rehearsal;

receiving, by the server system and from the one or more channel signal sources, one or more channel signals of a performance event, each channel signal from a respective channel signal source and comprising audio signals from the one or more sound sources playing at the performance event;

mixing, by the server system, the one or more channel signals, the mixing comprising automatically adjusting one or more audio attributes of one or more sound sources of the performance event based on the reference audio data;

providing a mixed recording of the performance event from the server system to a storage device or to multiple end user devices; and providing the one or more channel signals of the performance event, and a separate file describing at least the adjusting of one or more audio attributes, from the server system to a storage device.

EEE 19. A method comprising:

receiving, by a server system and from one or more channel signal sources, reference audio data, the reference audio data comprises acoustic information of one or more sound sources playing individually;

receiving, by the server system and from the one or more channel signal sources, one or more channel signals of a performance event, each channel signal from a respective channel signal source and comprising audio signals from the one or more sound sources playing at the performance event;

mixing, by the server system, the one or more channel signals, the mixing comprising automatically adjusting one or more audio attributes of one or more sound sources of the performance event based on the reference audio data; and providing a mixed recording of the performance event from the server system to a storage device or to multiple end user devices.

EEE 20. The method of any preceding EEE, wherein:

each channel signal source includes a microphone or a sound signal generator having a signal output, each sound source is a vocalist, an instrument, or a synthesizer, the server system includes one or more computers connected to the one or more channel signal sources through a communications network, and the one or more channel signal sources and the one or more sound sources have a same acoustic arrangement in the rehearsal and in the performance event.

EEE 21. The method of any preceding EEE, wherein:

the one or more channel signals include a first channel signal from a first channel signal source of the one or more channel signal sources and a second channel signal from a second channel signal source of the one or more channel signal sources, and the method comprises synchronizing, by the server system, the first channel signal and second channel signal in a time domain.

EEE 22. The method of any preceding EEE, comprising: separating a first sound source and a second source from the one or more channel signals, including separating the first sound source and the second sound source from plurality of sound sources represented in the one or more channel signals, wherein the one or more channel signals comprise a first signal representing the first sound source and a second signal representing the second sound source.

EEE 23. The method of any preceding EEE, wherein the mixing comprises leveling a first sound source and a second sound source and panning the first sound source and the second sound source by the server system.

EEE 24. The method of EEE 23, wherein leveling the first sound source and the second sound source comprises increasing or decreasing gains of the one or more sound sources according to a respective energy level of each sound source, each respective energy level being determined by the server system from the reference audio data.

EEE 25. The method of any preceding EEE, wherein the reference audio data comprises at least one of:

signals of each sound source playing at a first level designated as a low level and a second level designated as high level; or signals of each sound source playing at a single level.

EEE 26. The method of any preceding EEE, comprising determining a respective gain for each sound source in the event from the reference audio data, wherein determining the respective gains comprises, for each sound source:

receiving an input specifying a target level;

determining a respective level of the signals in the reference audio data; and determining each respective gain based on a difference between the level of the signals in the reference audio data and the target level.

EEE 27. The method of any preceding EEE, wherein mixing the one or more channel signals comprises adjusting gains of the one or more channel signals, the signals from the one or more sound sources, or both, according to input from a mixer device that is logged on to the server system.

EEE 28. The method of any preceding EEE, comprising performing video editing for the event, wherein performing the video editing comprises:

receiving, by a video editor of the server system, video data and audio data of the event, the video data including video in which sound sources are visibly located at different locations in the event, the audio data including energy levels of sound sources;

determining, from the audio data, that signals of a first sound source represented in the audio data indicate that the first sound source is playing at a level that is above a threshold amount over levels of other sound sources represented in the audio data;

determining a location of the first sound source in the video data;

determining a portion of the video data that corresponds to the location of the first sound source; and providing the audio data and the portion of the video data in synchronization to the storage device or to the end user device.

EEE 29. The method of EEE 28, wherein determining the location of the sound source in the video data comprises:

determining a panning position of the first sound source based on audio data; and designating the panning position of the first sound source as the location of the sound source in the video data.

EEE 30. The method of EEE 28, wherein determining the location of the sound source in the video data comprises determining the location of the sound source using face tracking or instrument tracking.

EEE 31. The method of any preceding EEE, comprising:

providing a command from the server system to the one or more channel signal sources based on the one or more channel signals, the command configured to adjust a recording parameter of the one or more channel signal sources, the recording parameter including at least one of a gain, a compression type, a bit depth or a data transmission rate.

What is claimed is:

1. A method comprising:
   receiving, by a server system, one or more rehearsal channel signals captured during a rehearsal event, the one or more rehearsal channel signals including one or more rehearsal sound source signals from one or more sound sources playing individually at the rehearsal event;
   automatically estimating, by the server system, a volume level of each rehearsal sound source signal;
   receiving, by the server system, one or more performance channel signals captured during a performance event, the one or more performance channel signals including one or more performance sound source signals from the one or more sound sources playing together at the performance event;
   mixing, by the server system, the one or more performance channel signals, the mixing comprising automatically leveling the one or more performance sound sources signals based on the estimated volume levels of the rehearsal sound source signals; and
   providing, by the server system, a mixed recording of the performance event from the server system to a storage device or to multiple end user devices.

2. The method of claim 1, wherein the one or more rehearsal sound source signals include a first audio signal having a first volume level and a second audio signal have a second volume level that is higher than the first volume level.

3. The method of claim 1, further comprising:
   automatically determining, by the server system, a gain for each performance sound source signal or group of performance sound source signals based on a difference between the estimated volume level of the rehearsal sound source signal and a target volume level for the performance sound source signal; and
   automatically rescaling each performance sound source signal by its corresponding gain to adjust the volume level of the performance sound source signal to its respective target volume level.

4. The method of claim 1, further comprising:
   determining a cost function on each gain, where less weight is given to performance channel signals from room microphones than to performance channel signals from spot microphones, and the performance sound source signals that have volume levels above estimated volume levels of their corresponding rehearsal sound source signals are penalized; and
   determining the gain for each performance sound source signal by minimizing the cost function.

5. The method claim 4, wherein the cost function is scaled by an average across microphone difference between a volume level of the performance sound source signal measured during the performance event and a volume level of the corresponding rehearsal sound source signal measured during the rehearsal event.

6. The method of claim 1, wherein the one or more rehearsal channel signals include noise samples captured by a microphone during the rehearsal event when no sound sources are playing, the method further comprising:
   estimating a noise floor in each rehearsal channel signal based on the noise samples; and
   performing noise reduction operations on each performance sound source signal based on the estimated noise floor during the performance event.

7. The method of claim 1, further comprising:
   obtaining, by the server system, information about which performance sound source signals are more important to reach their respective target volume level, and using that information to determine the gains for adjusting the volume levels of the performance sound source signals to their respective target volume levels during the performance event.

8. The method of claim 1, further comprising:
   determining, by the server system, a degree of dedication that a rehearsal channel signal has for a rehearsal sound source signal; and using the determined degree of dedication to determine the gain for adjusting the volume level of the corresponding performance sound source signal to its respective target volume level during the performance event.

9. The method of claim 1, further comprising:
   computing, by the server system, a total energy in a left rehearsal channel signal and a total energy in a right rehearsal channel signal contributed by each rehearsal sound source signal during the rehearsal event;
   computing, by the server system, a left-right balance based on the total energies; and
   automatically panning, by the server system during the performance event, the one or more performance sound source signals based on the left-right balance.

10. The method of claim 1, further comprising:
    automatically equalizing, by the server system during the performance event, one or more of the performance sound source audio signals based at least in part on the frequency content of the rehearsal sound source signals.

11. A server system comprising:
    a network interface configured to receive one or more rehearsal channel signals captured during a rehearsal event, the one or more rehearsal channel signals including one or more rehearsal sound source signals from one or more sound sources playing individually at the rehearsal event, and to receive one or more performance channel signals captured during a performance event, the one or more performance channel signals including one or more performance sound source signals from the one or more sound sources playing together at the performance event;

a leveling unit configured to automatically estimate a volume level of each rehearsal sound source signal; and a mixer configured to mix the one or more performance channel signals, including automatically leveling the one or more performance sound source signals based on the estimated volume levels of the rehearsal sound source signals.

12. The server system of claim 11, wherein the one or more rehearsal sound source signals include a first audio signal having a first volume level and a second audio signal have a second volume level that is higher than the first volume level.

13. The server system of claim 11, further comprising:
automatically determining, by the server system, a gain for each performance sound source signal or group of performance sound source signals based on a difference between the estimated volume level of the rehearsal sound source signal and a target volume level for the performance sound source signal; and
automatically rescaling, by the server system, each performance sound source signal by its corresponding gain to adjust the volume level of the performance sound source signal to its respective target volume level.

14. The server system of claim 11, further comprising:
determining, by the server system, a cost function on each gain, where less weight is given to signals from room microphones than to spot microphones, and the performance sound source signals that have volume levels above estimated volume levels of their corresponding rehearsal sound source signals are penalized; and
determining, by the server system, the gain for each performance sound source signal by minimizing the cost function.

15. The server system claim 14, wherein the cost function is scaled by an average across microphone difference between a volume level of the performance sound source signal measured during the performance event and a volume level of the corresponding rehearsal sound source signal measured during the rehearsal event.

16. The server system of claim 11, wherein the one or more rehearsal channel signals include noise samples captured by a microphone during the rehearsal event when no sound sources are playing, further comprising:
estimating, by the server system, a noise floor in each rehearsal channel signal based on the noise samples; and
performing, by the server system, noise reduction operations on each performance sound source signal based on the estimated noise floor during the performance event.

17. The server system of claim 11, further comprising:
obtaining, by the server system, information about which performance sound source signals are more important to reach their respective target volume level, and using that information to determine the gains for adjusting the volume levels of the performance sound source signals to their respective target volume levels during the performance event.

18. The server system of claim 11, further comprising:
determining, by the server system, a degree of dedication that a rehearsal channel signal has for a rehearsal sound source signal; and using the determined degree of dedication to determine the gain for adjusting the volume level of the corresponding performance sound source signal to its respective target volume level during the performance event.

19. The server system of claim 11, further comprising:
computing, by the server system, a total energy in a left rehearsal channel signal and a total energy in a right rehearsal channel signal contributed by each rehearsal sound source signal during the rehearsal event;
computing, by the server system, a left-right balance based on the total energies; and
automatically panning, by the server system during the performance event, the one or more performance sound source signals based on the left-right balance.

20. The server system of claim 11, further comprising:
automatically equalizing, by the server system during the performance event, one or more of the performance sound source audio signals based at least in part on the frequency content of the rehearsal sound source signals.

* * * * *